(12) United States Patent
Yamada et al.

(10) Patent No.: US 7,944,588 B2
(45) Date of Patent: May 17, 2011

(54) IMAGE CORRECTION PROCESSING APPARATUS, IMAGE CORRECTION PROCESSING METHOD, PROGRAM, AND STORAGE MEDIUM

(75) Inventors: Akitoshi Yamada, Yokohama (JP);
Yusuke Hashii, Kawasaki (JP);
Fumihiro Goto, Kawasaki (JP); Masao Kato, Kawasaki (JP); Tetsuya Suwa, Yokohama (JP); Mitsuhiro Ono, Tokyo (JP); Fumitaka Goto, Tokyo (JP); Arata Miyagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 526 days.

(21) Appl. No.: 11/772,346

(22) Filed: Jul. 2, 2007

(65) Prior Publication Data

US 2008/0123153 A1 May 29, 2008

(30) Foreign Application Priority Data

Jul. 7, 2006 (JP) .................................. 2006-188691

(51) Int. Cl.
*G06T 5/00* (2006.01)

(52) U.S. Cl. ........ 358/3.27; 358/1.9; 358/530; 358/532; 358/533; 358/534; 382/173; 382/224

(58) Field of Classification Search .................. 358/3.27, 358/1.9, 530, 532, 533, 534; 382/173, 224
See application file for complete search history.

(56) References Cited

U.S. PATENT DOCUMENTS

| | | | | |
|---|---|---|---|---|
| 5,291,309 A * | 3/1994 | Semasa | ........................ | 358/3.24 |
| 6,191,874 B1 | 2/2001 | Yamada et al. | ................ | 358/529 |
| 6,266,156 B1 | 7/2001 | Tanimura et al. | .............. | 358/1.9 |
| 6,292,621 B1 | 9/2001 | Tanaka et al. | ................... | 386/56 |
| 6,608,926 B1 | 8/2003 | Suwa et al. | .................... | 382/162 |
| 6,694,051 B1 | 2/2004 | Yamazoe et al. | .............. | 382/167 |
| 2004/0001632 A1* | 1/2004 | Adachi | ........................ | 382/224 |
| 2004/0196408 A1 | 10/2004 | Ishikawa et al. | .............. | 348/616 |
| 2005/0134892 A1 | 6/2005 | Goto et al. | .................... | 358/1.13 |

FOREIGN PATENT DOCUMENTS

| | | |
|---|---|---|
| JP | 3-99354 | 4/1991 |
| JP | 4-126461 | 4/1992 |
| JP | 11-69151 | 3/1999 |
| JP | 2002-77623 | 3/2002 |

* cited by examiner

*Primary Examiner* — Benny Q Tieu
*Assistant Examiner* — Paul F Payer
(74) *Attorney, Agent, or Firm* — Fitzpatrick, Cella, Harper & Scinto

(57) ABSTRACT

An image correction process that suppresses image deterioration in a printed image is provided. An image correction processing apparatus includes an area setting unit which sets an area comprising a plurality of pixels including an interest pixel, a first correction strength setting unit which adaptively sets a first correction strength for at least the interest pixel in the area based on the number of changes and the changing amount, a first correction unit which executes image correction for a pixel, for which the first correction strength is set, by the first correction strength, a second correction strength setting unit which adaptively sets a second correction strength for at least the interest pixel in the area based on the number of changes and the changing amount, and a second correction unit which executes image correction for a pixel, for which the first correction strength is set, by the second correction strength.

7 Claims, 41 Drawing Sheets

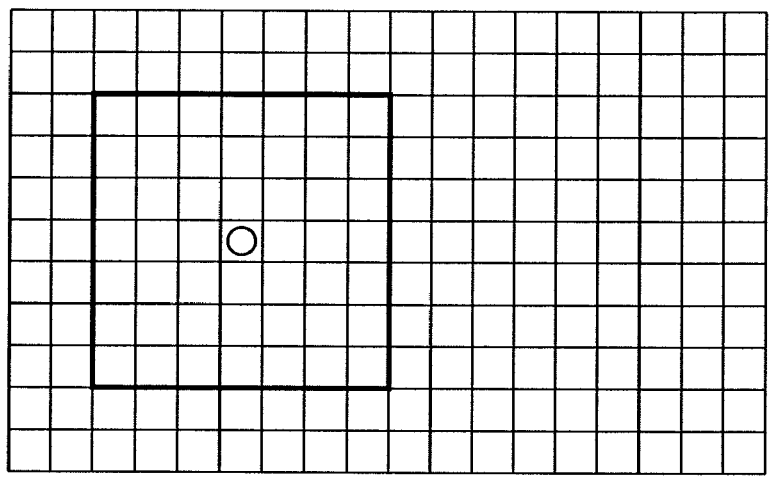
F I G. 4A
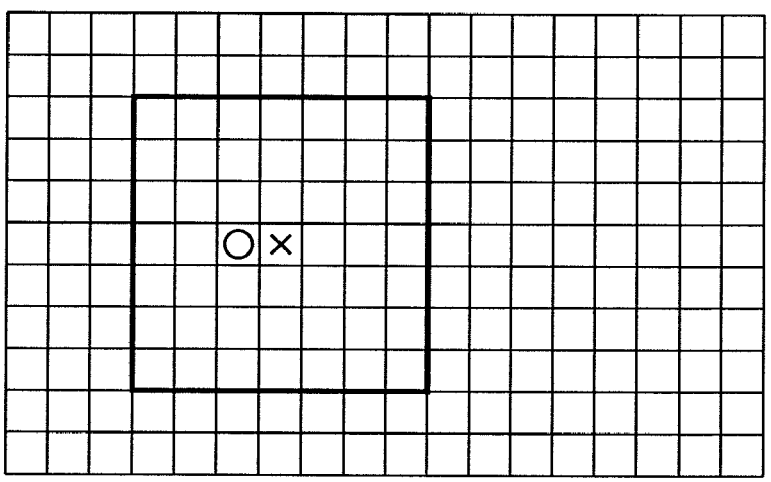
F I G. 4B
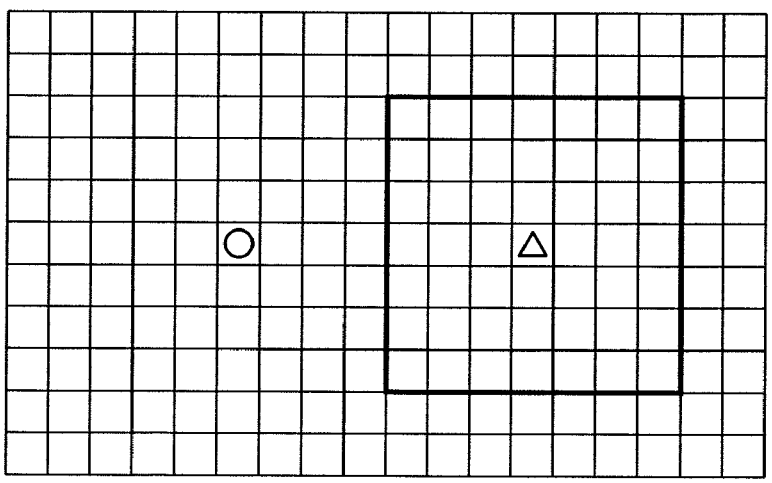
F I G. 4C

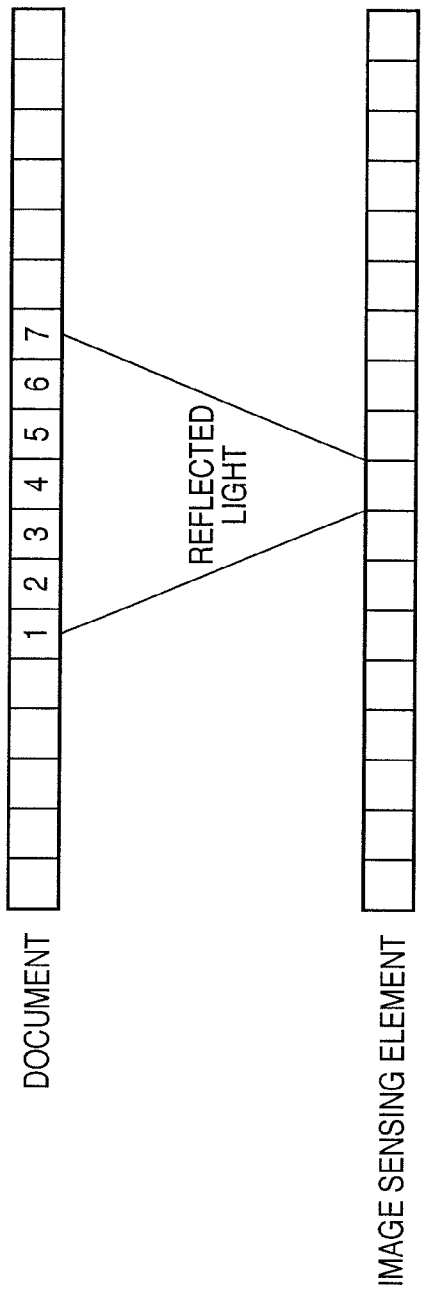
F I G. 6A
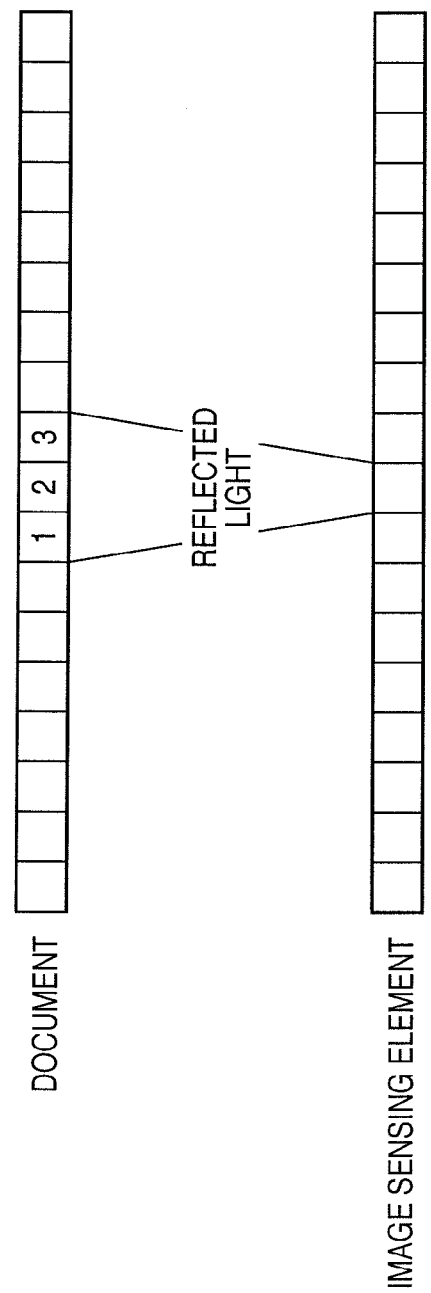
F I G. 6B

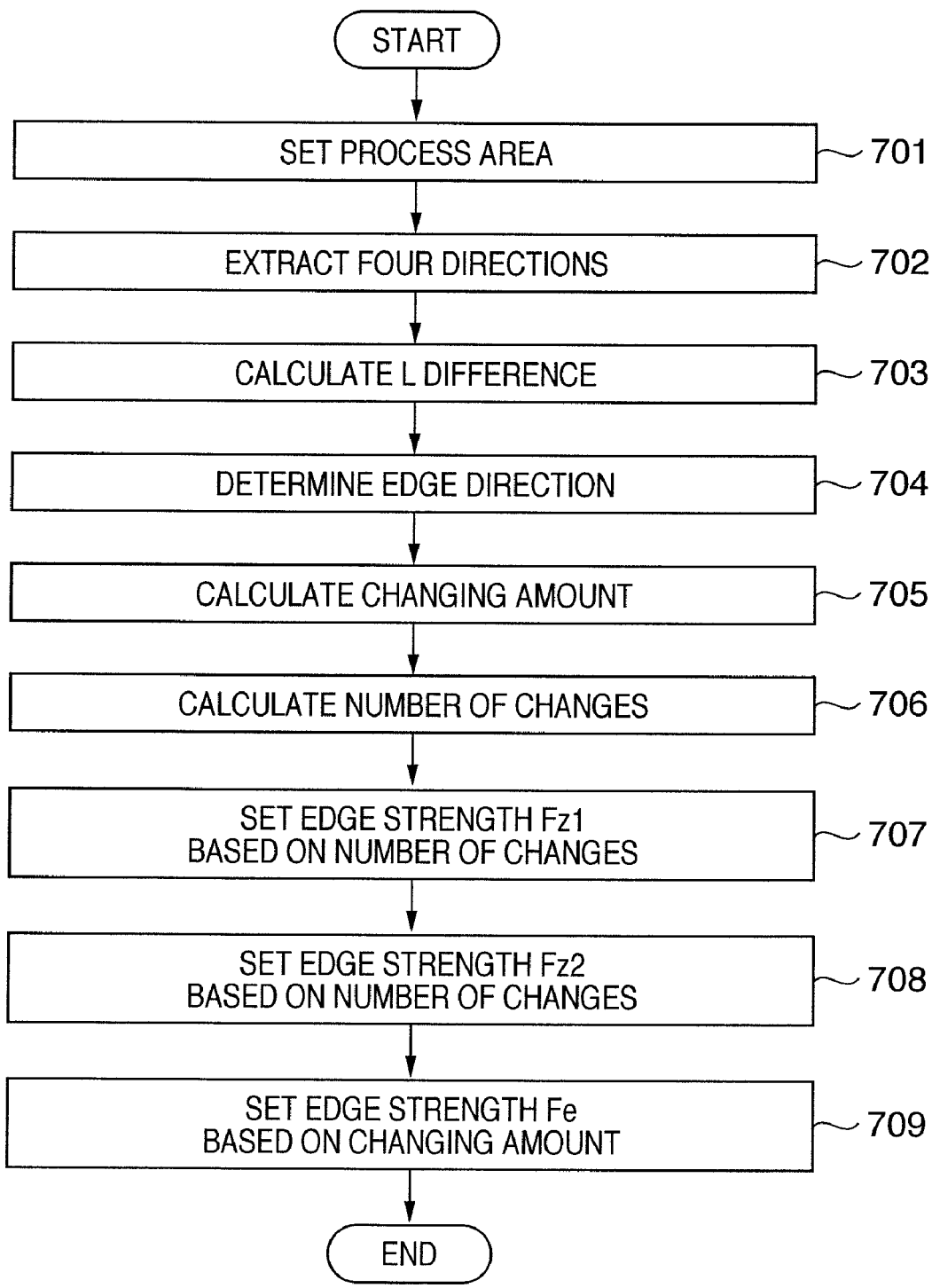

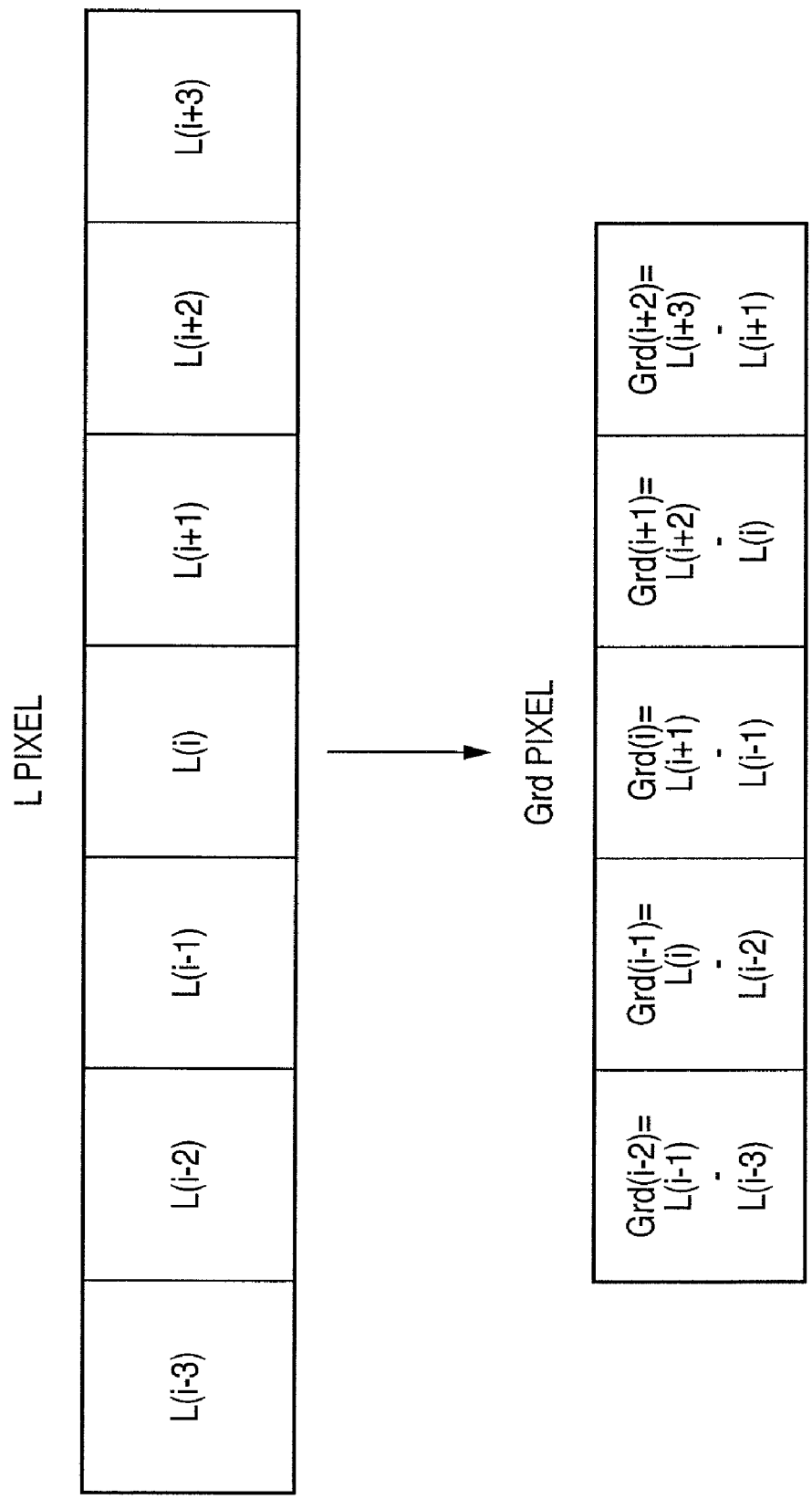

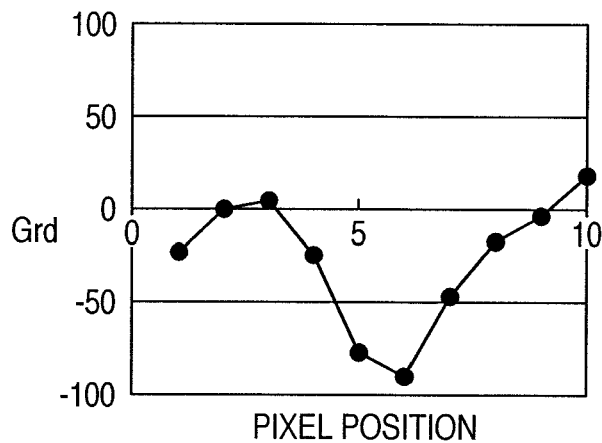
F I G. 12A
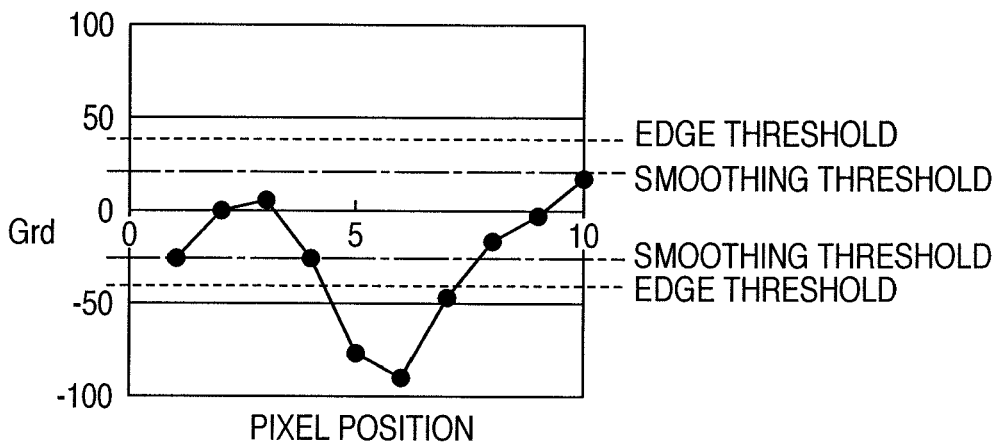
F I G. 12B
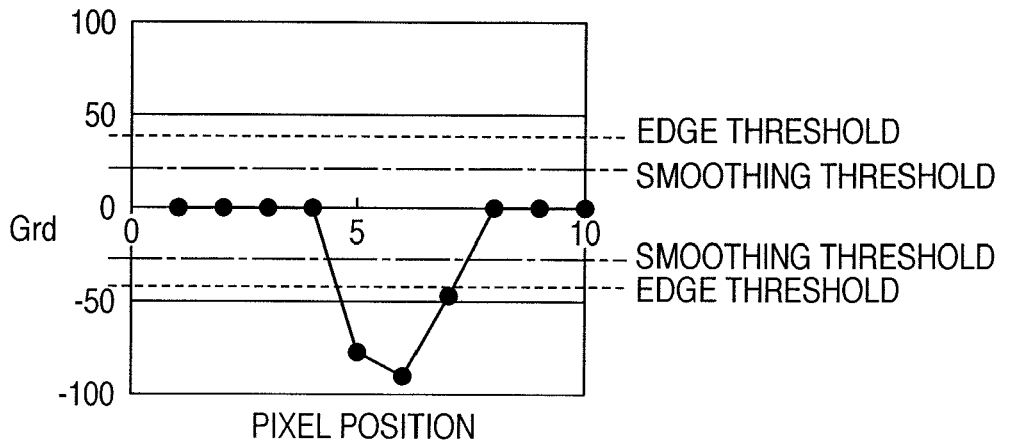
F I G. 12C

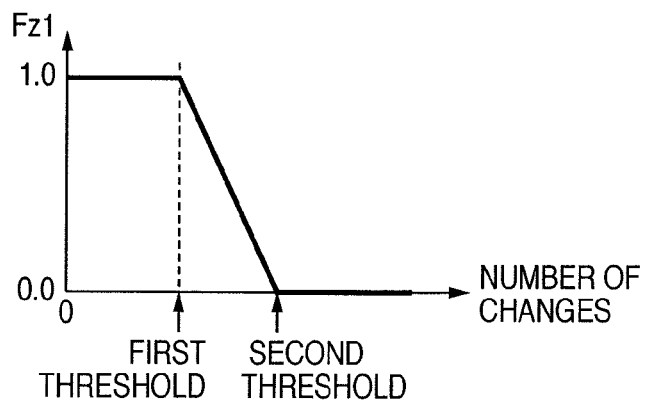
F I G. 13A
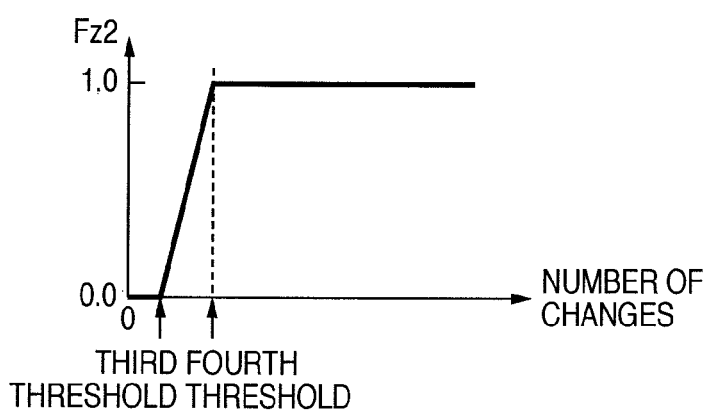
F I G. 13B
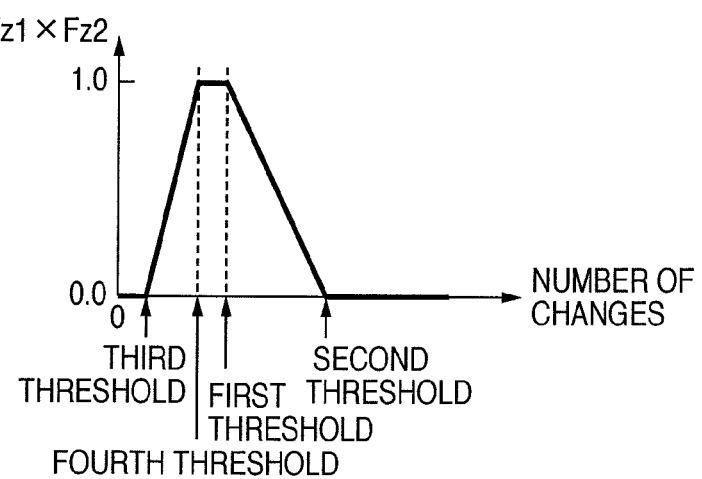
F I G. 13C
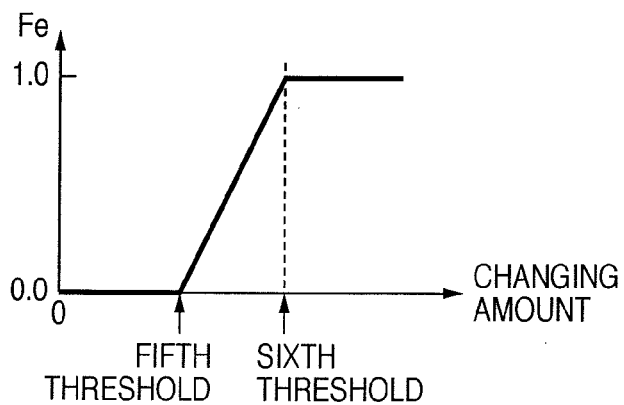
F I G. 13D

| -6 | -15 | -14 | -15 | -6 |
|---|---|---|---|---|
| -15 | 8 | 42 | 8 | -15 |
| -14 | 42 | 0 | 42 | -14 |
| -15 | 8 | 42 | 8 | -15 |
| -6 | -15 | -14 | -15 | -6 |

FIG. 15B

| -6 | -15 | -14 | -15 | -6 |
|---|---|---|---|---|
| -15 | 8 | 42 | 8 | -15 |
| -14 | 42 | 128 | 42 | -14 |
| -15 | 8 | 42 | 8 | -15 |
| -6 | -15 | -14 | -15 | -6 |

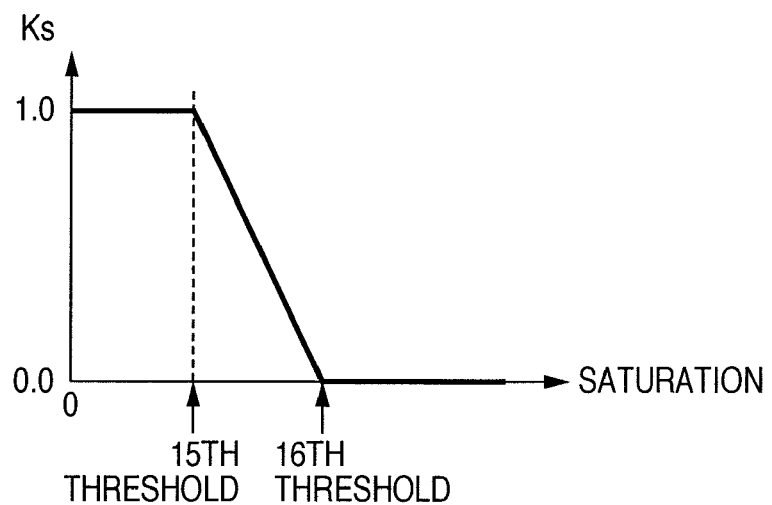
F I G. 29A
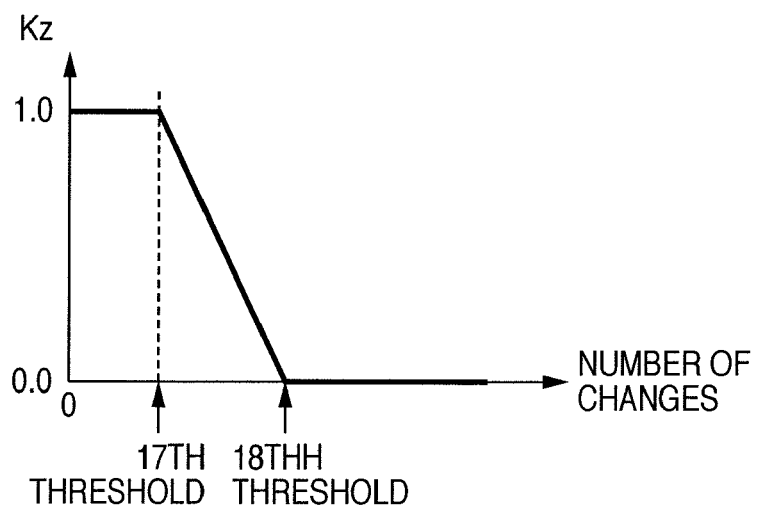
F I G. 29B
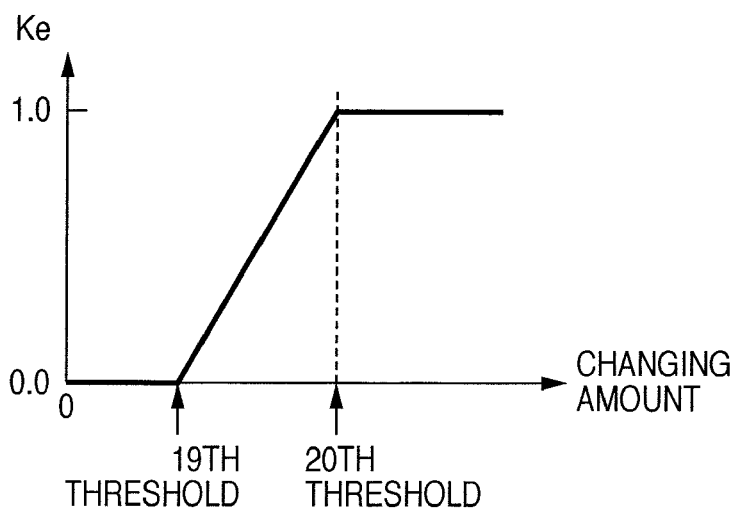
F I G. 29C

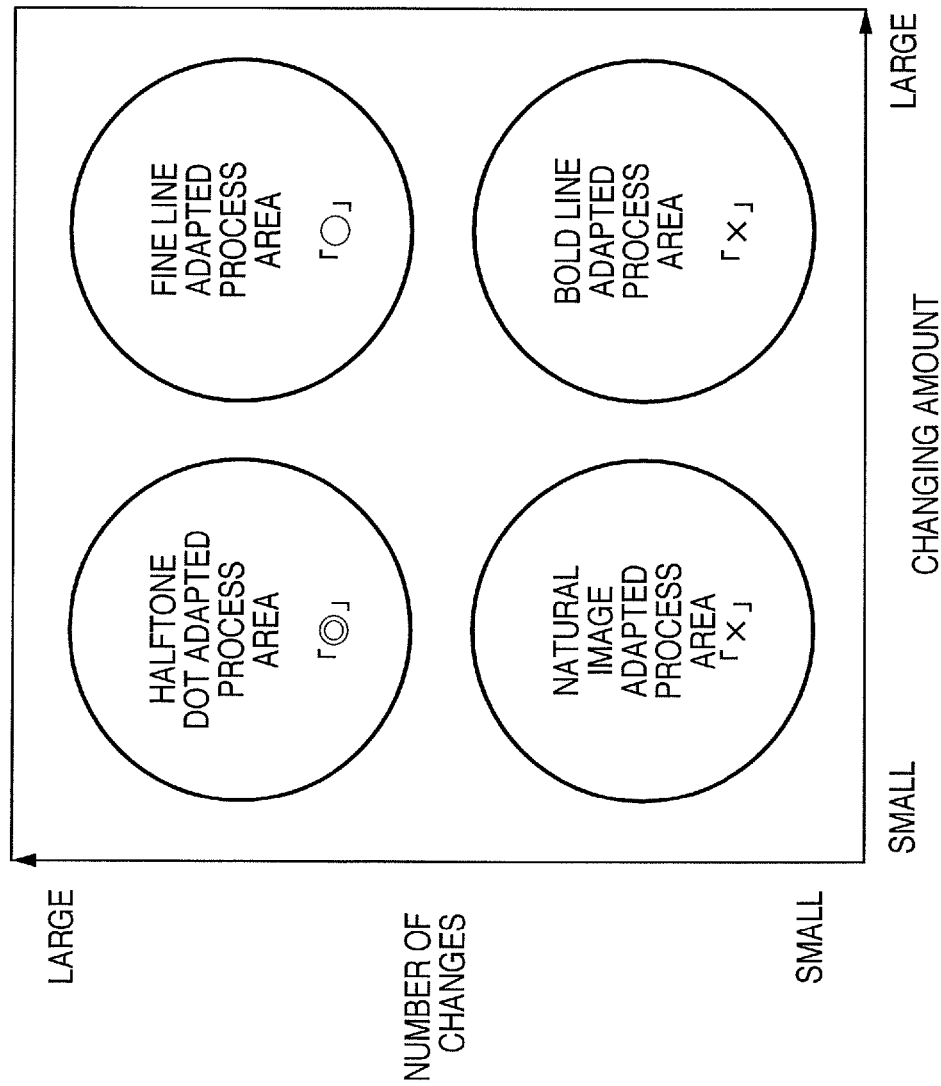

IMAGE CORRECTION PROCESSING APPARATUS, IMAGE CORRECTION PROCESSING METHOD, PROGRAM, AND STORAGE MEDIUM

BACKGROUND OF THE INVENTION

1. Field of the Invention

The present invention relates to an image correction processing apparatus, an image correction processing method, a program, and a storage medium, for applying correction processing suited to respective areas such as a text area, photograph area, halftone dot area, and the like.

2. Description of the Related Art

A copying machine which optically scans a document image and prints a scanned image on a print medium such as a paper sheet or the like has been proposed. However, the edge of an image optically scanned by a scanner of a copying machine is blurrier than that of the original document image, and only an image with decreased sharpness is obtained when the scanned image is printed on a print medium intact. Also, upon applying an edge enhancing process to image data after scanning for the purpose of enhancement of the sharpness of a printed image, moiré generated in a halftone dot area is also enhanced. To prevent this problem, a technique using image area segmentation has been proposed. The image area segmentation is a technique which segments, e.g., scanned image data into two areas such as a text area and halftone dot area, and applies an edge enhancing process to the text area and a smoothing process to the halftone dot area to attain enhancement of sharpness and a reduction of moiré at the same time.

However, if a judgment error occurs in the image area segmentation, the smoothing process may be applied to a text area, and the edge enhancing process may be applied to a halftone dot area, thus deteriorating an image. Depending on the precision of the image area segmentation, for example, a part of a character may be judged as a text area, and the remaining part of the character may be judged as a halftone dot area. In this case, upon printing an actual character, switching of the edge enhancing and smoothing processes occurs. Such switching of the edge enhancing and smoothing processes considerably impairs image quality. In order to prevent this, the following techniques have been proposed.

The first proposed technique in the past is a technique that continuously sets an edge enhancing amount according to an edge amount (e.g., Japanese Patent No. 03099354). With the first technique disclosed in Japanese Patent No. 03099354, adaptive edge enhancement according to the edge amount can be applied, and image deterioration of a printed image can be reduced.

The second technique is a technique that adaptively sets an edge enhancing amount according to an edge amount, and disables the adaptive setting for a halftone dot area (e.g., Japanese Patent Laid-Open No. 2002-077623). With the second technique disclosed in Japanese Patent Laid-Open No. 2002-077623, adaptive edge enhancement according to the edge amount can be applied, and edge enhancement of the halftone dot area can be reduced.

The third technique is a technique that segments an image into multiple areas including a text area, photograph area, and halftone dot area according to the continuity and density difference of black pixels (e.g., Japanese Patent No. 03472094). With the third technique disclosed in Japanese Patent No. 03472094, more flexible image area segmentation can be implemented.

In case of the first technique disclosed in Japanese Patent No. 03099354, an edge enhancing amount is set focusing on an edge amount (changing amount). However, since a halftone dot area also has an edge in the same way as a text area, it may have the similar edge amount (changing amount) as the text area. At this time, a large edge enhancing amount is also set for the halftone dot area in the same way as the text area, and moiré is also enhanced.

In case of the second technique disclosed in Japanese Patent Laid-Open No. 2002-077623, an edge enhancing amount is adaptively set focusing on an edge amount (changing amount) as in the first technique. However, this technique also focuses on a halftone dot cycle (the number of changes), and disables the adaptive edge enhancing amount setting based on the halftone dot cycle (the number of changes). For this reason, edge enhancement on a halftone dot area can be stopped, thus reducing moiré enhancement. However, although the edge enhancing amount is adaptively set up to a certain number of changes in accordance with the edge amount, when the predetermined number of changes is reached, the adaptive edge enhancing amount setting is disabled irrespective of the edge amount. Therefore, switching of the processes occurs when the predetermined number of changes is reached, thus deteriorating a printed image.

Furthermore, in case of the third technique disclosed in Japanese Patent No. 03472094, the image area segmentation that utilizes the continuity and density difference of black pixels is performed. In this case, this technique focuses on a halftone dot cycle (the number of changes), since the changing amount of an image signal decreases with increasing continuity of black pixels. Also, this technique focuses on the edge amount (changing amount) since the density difference of black pixels is the changing amount of an image signal. Three or more values are set for both the number of changes and changing amount to segment into multiple areas including at least a text area, photograph area, and halftone dot area by image area segmentation, thus improving the segmentation precision. However, the third technique does not disclose adaptive segmentation according to the number of changes and changing amount, and adaptive application of process strengths. That is, application of the third technique alone cannot execute adaptive processes according to the number of changes or changing amount. Hence, switching of the processes occurs, which deteriorates a printed image.

None of the first to third techniques disclose any "example that uses a plurality of interacting correction processes although these processes have different purposes". Therefore, none of these techniques discloses "adaptive application of process strengths of the plurality of interacting correction processes although these processes have different purposes".

That is, in the "example that uses a plurality of interacting correction processes although these processes have different purposes", application of the first and second techniques cannot cope with the "interacting" part, thus deterioration of a printed image occurs undesirably in specific combinations. Upon application of the third technique, the number of times of switching of correction processes increases with increasing number of correction processes, thus the number of places of occurrence of image deterioration on a printed image increases unwantedly.

SUMMARY OF THE INVENTION

It is an object of the present invention to provide an image correction process that suppresses image deterioration in a printed image.

In order to achieve the above object, an image correction processing apparatus in one embodiment of the present invention comprises an area setting unit adapted to set an area comprising a plurality of pixels including an interest pixel, a changing times calculating unit adapted to calculate a number of changes of values associated with image signals based on the image signals in the area, a changing amount calculating unit adapted to calculate a changing amount of values associated with image signals based on the image signals in the area, a first correction strength setting unit adapted to adaptively set a first correction strength for at least the interest pixel in the area based on the number of changes and the changing amount, a first correction unit adapted to execute image correction for a pixel, for which the first correction strength is set, by the first correction strength, a second correction strength setting unit adapted to adaptively set a second correction strength for at least the interest pixel in the area based on the number of changes and the changing amount, and a second correction unit adapted to execute image correction for a pixel, for which the first correction strength is set, by the second correction strength.

In order to achieve the above object, an image correction processing apparatus in another embodiment of the present invention comprises an area setting unit adapted to set at least one area comprising a plurality of pixels including an interest pixel, a calculating unit adapted to calculate one of a number of changes and a changing amount of values associated with image signals based on the image signals in the area, a first correction strength setting unit adapted to adaptively set a first correction strength for at least the interest pixel in the area based on one of the number of changes and the changing amount, a first correction unit adapted to execute image correction for a pixel, for which the first correction strength is set, by the first correction strength, a second correction strength setting unit adapted to adaptively set a second correction strength for at least the interest pixel in the area based on one of the number of changes and the changing amount; and a second correction unit adapted to execute image correction for a pixel, for which the first correction strength is set, by the second correction strength.

In order to achieve the above object, a method of controlling an image correction processing apparatus in still another embodiment of the present invention comprises an area setting step of setting an area comprising a plurality of pixels including an interest pixel, a changing times calculating step of calculating a number of changes of values associated with image signals based on the image signals in the area, a changing amount calculating step of calculating a changing amount of values associated with image signals based on the image signals in the area, a first correction strength setting step of adaptively setting a first correction strength for at least the interest pixel in the area based on the number of changes and the changing amount, a first correction step of executing image correction for a pixel, for which the first correction strength is set, by the first correction strength, a second correction strength setting step of adaptively setting a second correction strength for at least the interest pixel in the area based on the number of changes and the changing amount; and a second correction step of executing image correction for a pixel, for which the first correction strength is set, by the second correction strength.

In order to achieve the above object, a method of controlling an image correction processing apparatus in still another embodiment of the present invention comprises an area setting step of setting at least one area comprising a plurality of pixels including an interest pixel, a calculating step of calculating one of a number of changes and a changing amount of values associated with image signals based on the image signals in the area, a first correction strength setting step of adaptively setting a first correction strength for at least the interest pixel in the area based on one of the number of changes and the changing amount, a first correction step of executing image correction for a pixel, for which the first correction strength is set, by the first correction strength, a second correction strength setting step of adaptively setting a second correction strength for at least the interest pixel in the area based on one of the number of changes and the changing amount, and a second correction step of executing image correction for a pixel, for which the first correction strength is set, by the second correction strength.

In order to achieve the above object, still another embodiment of the present invention provides a computer-executable program which describes a method of controlling an image correction processing apparatus of the embodiment.

In order to achieve the above object, still another embodiment of the present invention provides a computer-readable storage medium that stores a program which describes a method of controlling an image correction processing apparatus of the embodiment.

According to the present invention, an image correction process that suppresses image deterioration in a printed image can be provided.

Further features of the present invention will become apparent from the following description of exemplary embodiments with reference to the attached drawings.

BRIEF DESCRIPTION OF THE DRAWINGS

FIGS. 4A to 4C are explanatory views of a process unit used in the embodiments of the present invention;

FIGS. 6A and 6B are explanatory views of a scan range of an image sensing element used in the embodiments of the present invention;

FIG. 7 is an operation flowchart of the correction strength setting according to the first embodiment of the present invention;

FIG. 10 is an explanatory view of an L difference used in the first embodiment of the present invention;

FIGS. 12A to 12C are graphs for explaining changing times correction used in the first embodiment of the present invention;

FIGS. 13A to 13D are graphs for explaining an edge strength setting used in the first embodiment of the present invention;

FIGS. 15A and 15B are explanatory views of edge enhancing filter coefficients used in the first embodiment of the present invention;

FIGS. 23A and 23B are explanatory views of smoothing filter coefficients used in the second embodiment of the present invention;

FIGS. 29A to 29C are graphs for explaining a blacking strength setting used in the fourth embodiment of the present invention;

FIG. 40 is a suited moiré reduction process strength chart with respect to the changing amount and the number of changes used in the second modification in the third embodiment of the present invention.

DESCRIPTION OF THE EMBODIMENTS

Embodiments of the present invention will be described hereinafter.

<MFP>

Figure 1A:
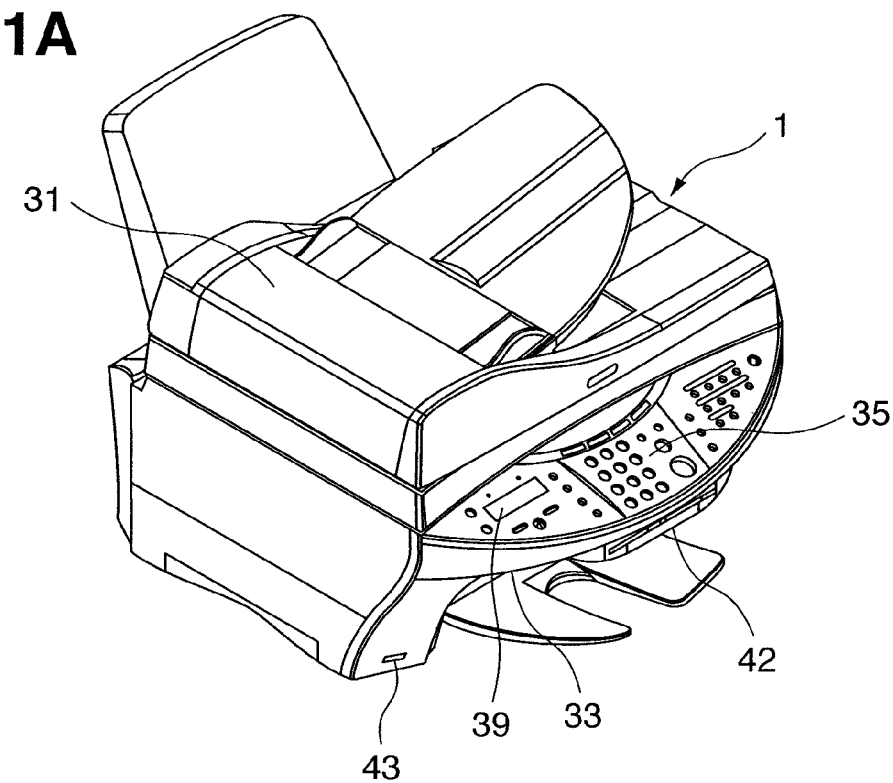
FIGS. 1A and 1B are perspective views for explaining an MFP to which embodiments of the present invention are applicable.
Figure 1B:
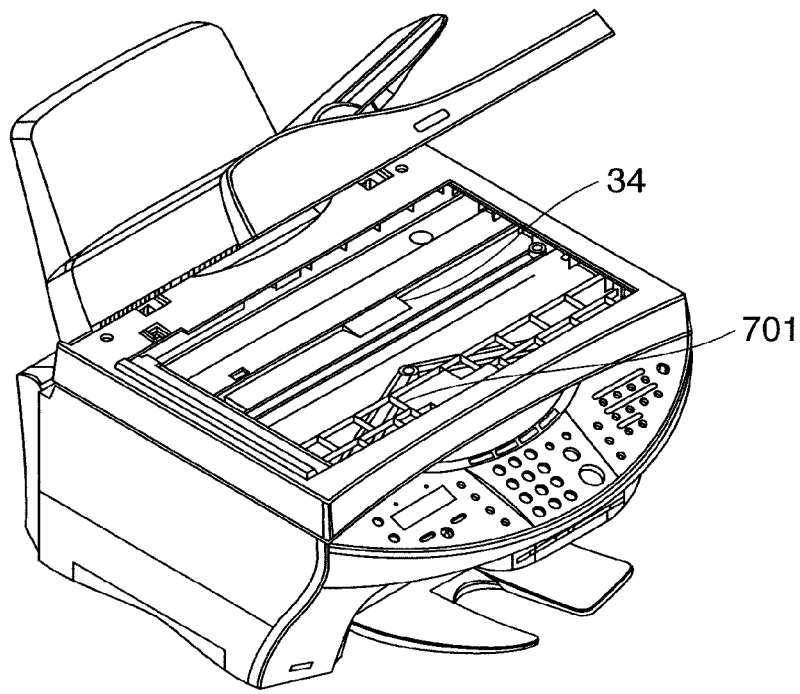

FIGS. 1A and 1B are schematic perspective views of a multi-functional peripheral apparatus (to be also referred to as MFP hereinafter) 1 according to the embodiments of the present invention. This MFP 1 has a function of printing data received from a host computer (to be also referred to as PC hereinafter) as a normal PC printer, and a function as a scanner. Furthermore, functions of the MFP 1 alone include a copy function of printing an image scanned by the scanner, a function of printing image data directly read out from a storage medium such as a memory card or the like, or a function of printing image data received from a digital camera or the like.

Referring to FIGS. 1A and 1B, the MFP 1 comprises a scanning device 34 such as a flatbed scanner or the like, a printing device 33 of an ink-jet system, electrophotography system, or the like, and an operation panel 35 which comprises a display panel 39, various key switches, and the like. The MFP 1 comprises a USB port (not shown) used to communicate with the PC on its back surface, so as to make communications with the PC. Furthermore, the MFP 1 comprises a card slot 42 used to read out data from various memory cards, a camera port 43 used to make data communications with a digital camera, an auto document feeder (to be also referred to as ADF hereinafter) 31 used to automatically set a document on a document table, and the like.

Figure 2:
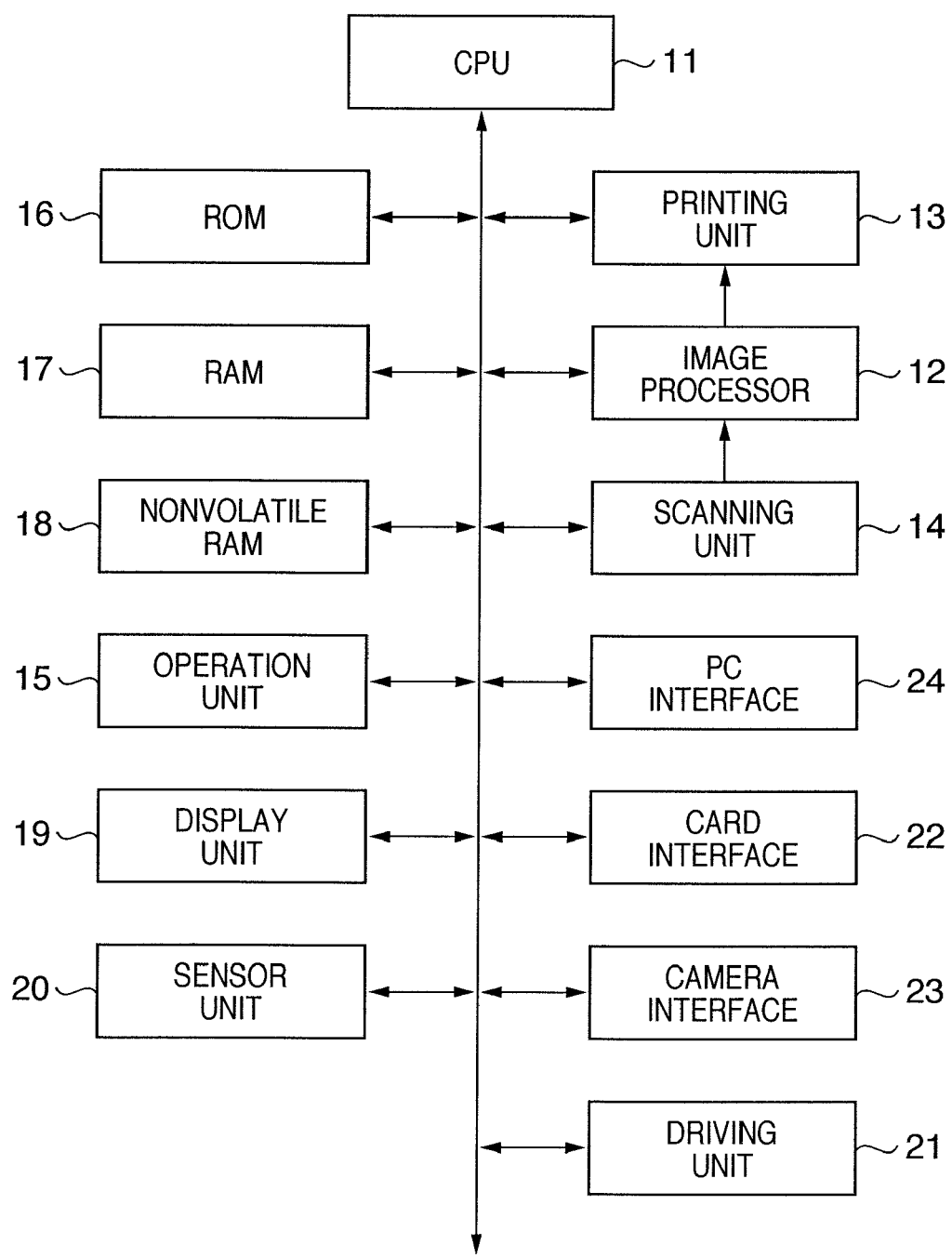
FIG. 2 is a block diagram for explaining control of the MFP to which the embodiments of the present invention are applicable.

FIG. 2 is a functional block diagram of the MFP 1 shown in FIGS. 1A and 1B. Referring to FIG. 2, a CPU 11 controls various functions of the MFP 1, and executes programs of various processes stored in a ROM 16 in accordance with operations at an operation unit 15 corresponding to the operation panel 35 in FIG. 1A. A scanning unit 14, which comprises a CCD, corresponds to the scanning device 34 in FIG. 1B, scans a document image, and outputs analog luminance data of red (R), green (G), and blue (B) The scanning unit 14 may comprise a contact image sensor (CIS) in place of the CCD. When the MFP 1 comprises the ADF 31 shown in FIG. 1A, the scanning unit 14 can successively scan documents.

A card interface 22 also corresponds to the card slot 42 in FIG. 1A, and reads image data, which is captured by, e.g., a digital still camera (to be also referred to as DSC hereinafter) and is stored in a memory card or the like, in accordance with a predetermined operation at the operation unit 15. Note that the color space of image data read via the card interface 22 is converted by an image processor 12 from that (e.g., YCbCr) of the DSC into a standard RGB color space (e.g., NTSC-RGB or sRGB) if necessary. The read image data undergoes various processes, if necessary, such as resolution conversion into the effective number of pixels and the like required for applications based on its header information. Also, a camera interface 23 corresponds to the camera port 43 in FIG. 1A, and reads image data by directly connecting a DSC.

The image processor 12 executes image processes such as image analysis, calculations of conversion characteristics, conversion from luminance signals (RGB) into density signals (CMYK), scaling, gamma conversion, error diffusion, and the like, which will be described later. The data that has undergone these processes is stored in a RAM 17. When corrected data stored in the RAM 17 reaches a predetermined data size required to be printed by a printing unit 13 that corresponds to the printing device 33 in FIG. 1A, the printing unit 13 executes a print operation.

A nonvolatile RAM 18 comprises, e.g., a battery backed-up SRAM or the like, and stores data unique to the image processes and the like. The operation unit 15 corresponds to the operation panel 35. The operation unit 15 has a photo direct print start key which allows the user to select image data stored in a storage medium and to start printing, a key used to print a document, a key used to scan a document, a copy start key in a monochrome copy mode or color copy mode, and the like. Furthermore, the operation unit 15 has a mode key used to designate a mode such as a copy resolution, image quality, and the like, a stop key used to stop a copy operation, a numerical keypad used to input a copy count, a registration key, and the like. The CPU 11 detects the pressing states of these keys and controls respective units according to the detected states.

A display unit 19 corresponds to the display panel 39 in FIG. 1A, comprises a dot matrix type liquid crystal display unit (to be also referred to as an LCD hereinafter) and an LCD driver, and makes various displays under the control of the CPU 11. Also, the display unit 19 displays thumbnails of image data recorded in a storage medium. The printing unit 13 corresponds to the printing device 33 in FIG. 1A, and comprises an ink-jet unit 701 of an ink-jet system, general-purpose IC, and the like. The printing unit 13 reads out print data stored in the RAM 17 and prints it out as a hard copy under the control of the CPU 11.

A driving unit 21 includes stepping motors for driving feed and discharge rollers, gears for transmitting the driving forces of the stepping motors, a driver circuit for controlling the stepping motors, and the like in the operations of the scanning unit 14 and printing unit 13.

A sensor unit 20 includes a print sheet width sensor, print sheet presence sensor, document width sensor, document presence sensor, print medium detection sensor, and the like. The CPU 11 detects the states of a document and print sheet based on information obtained from this sensor unit 20.

A PC interface 24 is an interface between the PC and MFP 1. The MFP executes a print operation, scan operation, and the like in accordance with requests from the PC via the PC interface 24.

In a copy operation, the MFP processes image data, which is scanned by the scanning device 34, and prints the processed data by the printing device 33.

Upon instruction of a copy operation via the operation unit 15, the scanning unit 14 scans an image of a document placed on the document table. The scanned data is sent to the image processor 12, which applies image processes to be described later to the scanned data. The processed data is sent to the printing unit 13 and is printed.

<Image Processes>

Figure 3:
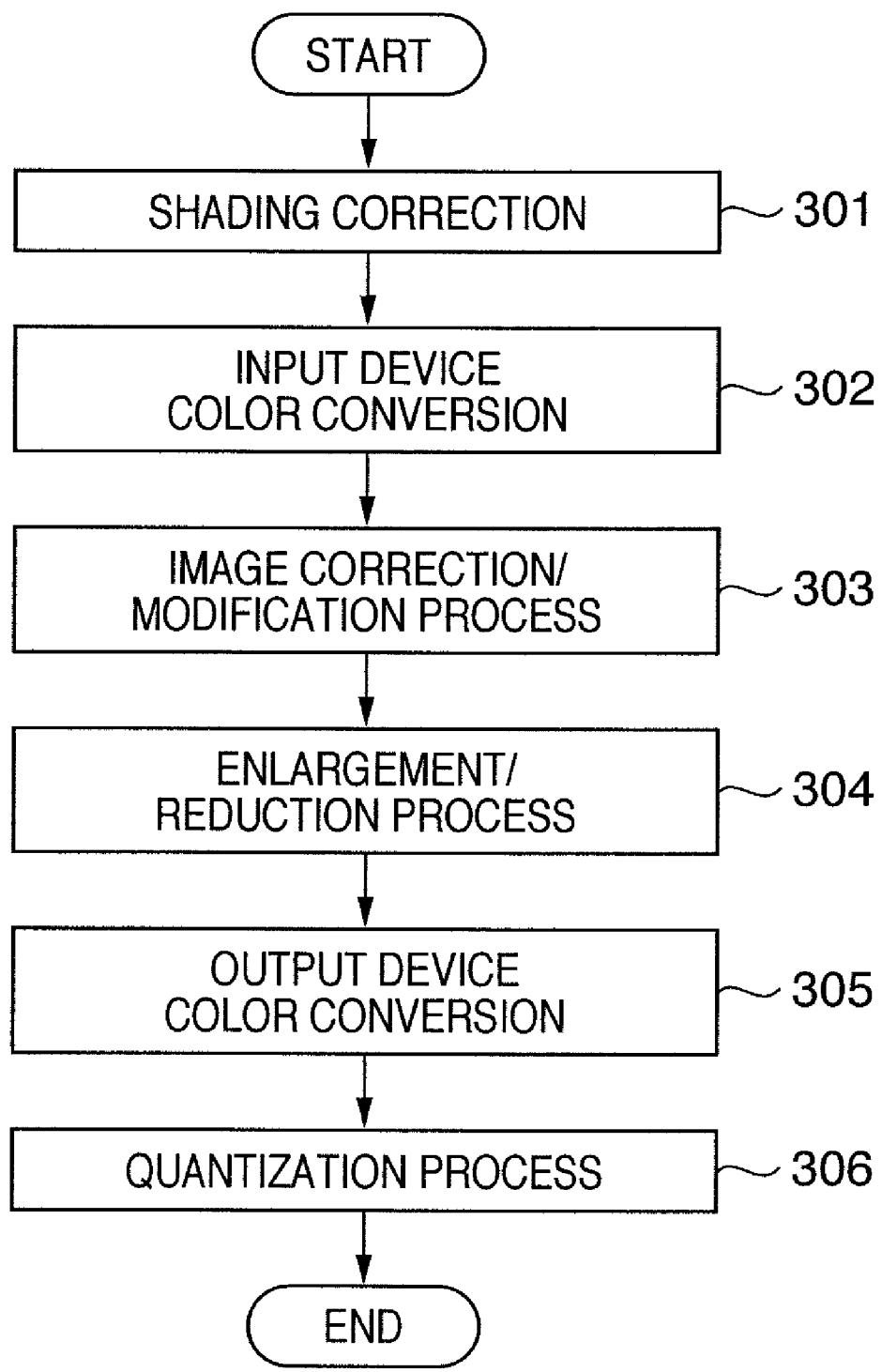
FIG. 3 is an operation flowchart of image processes of the MFP to which the embodiments of the present invention are applicable.

FIG. 3 is a flowchart of the operations of image processes executed by the MFP 1 in the copy mode. Respective steps will be described below, but a detailed description of processing methods which are not the gist of the present invention will not be given.

In step 301, shading correction, for correcting variations of the CCD as the image sensing element, is applied to image data, which is scanned by the scanning unit 14 of the MFP 1 and is A/D-converted. In step 302, input device color conversion of that image data is then executed. This process converts device-dependent image data into data of a standard color space such as sRGB standardized by IEC (International Electrotechnical Commission), Adobe RGB propounded by Adobe Systems, or the like. The conversion method in this case includes an arithmetic method using a 3×3 or 3×9 matrix, a lookup table method which determines values based on a table that describes conversion rules, and the like.

In step 303, an image correction/modification process of the converted image data is executed. The processing contents in this step include an edge enhancing process that corrects blurring as a result of scanning, a text modification process that improves legibility of text, a process for removing bleed-through that has occurred due to scanning upon light irradiation, and the like. It is desirable to execute the processes as characteristic features of the present invention in this step.

In step 304, an enlargement/reduction process is executed. This process converts image data to a desired scale when the user designates a zoom scale, a layout copy mode that lays out two document images on one sheet, or the like. As the conversion method, methods such as a bi-cubic method, nearest neighbor method, and the like are generally used. In step 305, an output device color conversion process for converting image data on the standard color space into output device-dependent data is executed. In this embodiment, the MFP 1 comprises the printing device 33 of the ink-jet system, and a conversion process into image data of ink colors such as cyan, magenta, yellow, black, and the like is executed. This conversion process can use the same method as in step 302.

Furthermore, in step 306 a quantization process as conversion into the number of printable levels is executed. For example, in case of binary expression, i.e., ON/OFF of ink dots, image data may be binarized by a quantization method such as error diffusion or the like. As a result, the image data can be converted into an image data format that the printing device 33 can print, and ends the processes in this flowchart. The printing device 33 then executes a print operation based on this image data, thus forming an image.

<Image Process Unit>

FIG. 4A is a view for explaining a process unit used upon execution of processes as characteristic features of the present invention (to be referred to as image correction processes).

A case will be explained first wherein the process unit is a pixel unit. Assuming that a pixel indicated by "○" in FIG. 4A is an interest pixel, an area (7×7 area) defined by 7×7 pixels including the interest pixel is set, as indicated by the bold line in FIG. 4A. A correction strength for the interest pixel is set using image data in the 7×7 area set in this way, thus correcting the interest pixel. After correction of the interest pixel, a pixel that neighbors the interest pixel is set as the next interest pixel, as indicated by "x" in FIG. 4B, and a 7×7 area is set to have the pixel indicated by "x" as the interest pixel, so as to similarly execute a correction process. After that, the interest pixel is similarly shifted pixel by pixel in turn and a new 7×7 area is set in each case, thus correcting all pixels to be corrected.

A case will be explained below wherein the process unit is an area unit. A 7×7 area is set for a pixel indicated by "○" in FIG. 4A, and a correction strength to be set for "○" is applied to a plurality of pixels, e.g., all pixels, in the 7×7 area. As the next process unit, a 7×7 area is set for a pixel indicated by "Δ" in FIG. 4C. In this way, the process unit is shifted, so that the 7×7 area for "○" neighbors the 7×7 area for "△". However, the pixel unit is preferably used as the process unit so as to set the correction strength at higher accuracy. In the embodiments to be described hereinafter the pixel unit will be described as the process unit.

Figure 5:
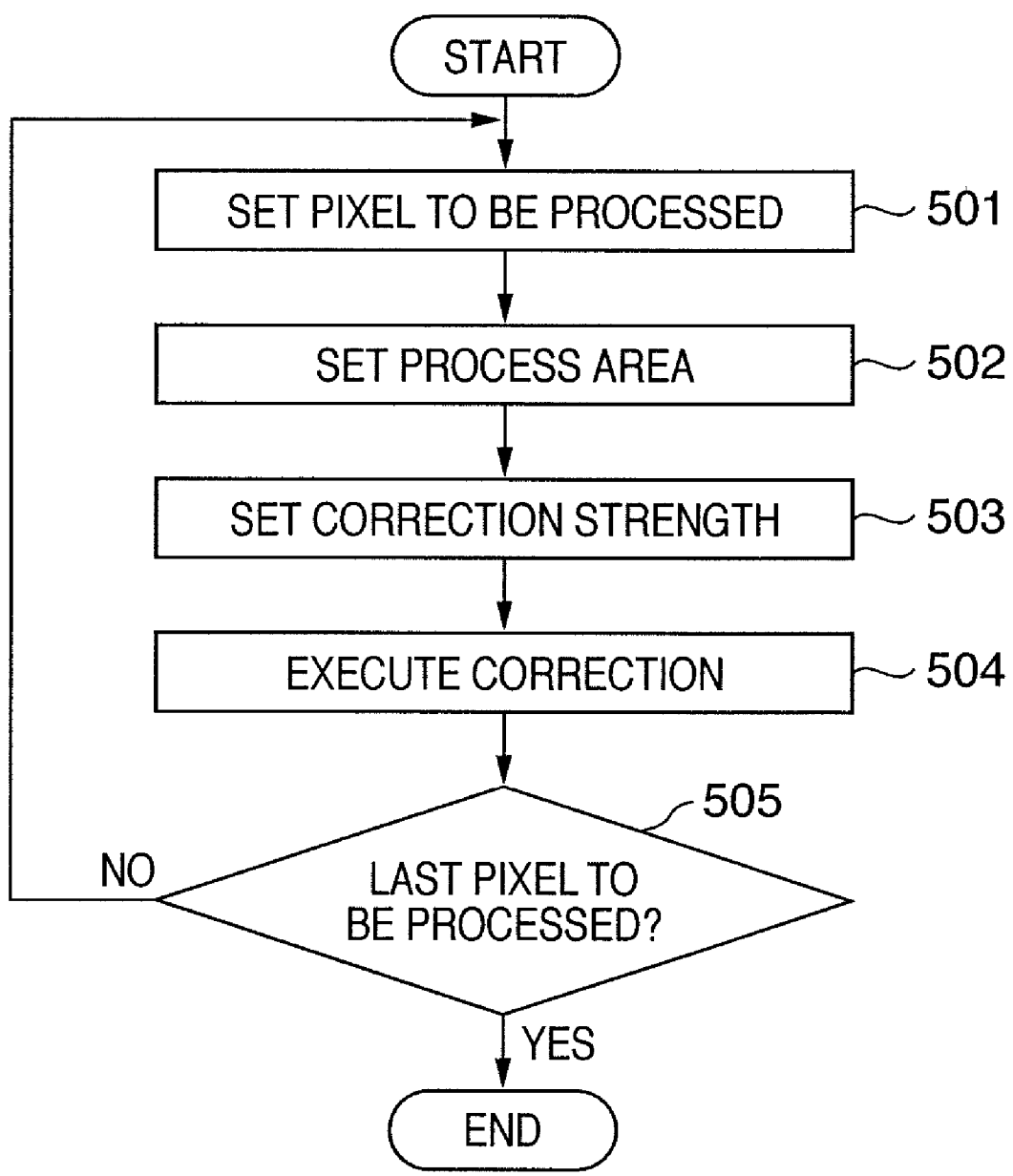
FIG. 5 is a flowchart of the operation for shifting the process unit used in the embodiments of the present invention.

FIG. 5 is a flowchart for explaining the operation for shifting the process unit. Step 501 is a setting process of a process target (pixel to be processed). After the start of the process, the first pixel to be processed is set. If the process returns from step 505 to step 501, the next pixel to be processed is set.

In step 502, a process area is set. The process area is an area configured by a plurality of pixels (7×7 area) including the pixel to be processed, as described above.

In step 503, a correction strength is set. That is, a correction strength for the pixel to be processed, is set. In step 504, the pixel to be processed is corrected using the correction strength set in step 503. In step 505, it is determined whether or not the processed pixel is the last pixel to be processed, i.e., it is checked if the processed pixel to be processed is the last one. If the processed pixel is not the last one (NO), the process returns to step 501. If the processed pixel is the last one (YES), this process ends.

In the embodiments to be described hereinafter, the 7×7 area will be described as the process area. This is because the pixel range of a document to be scanned by one pixel of the image sensing element (CCD or CIS) used in the scanning device 34 described using FIG. 1B and the scanning unit 14 described using FIG. 2 is designed to include six pixels or less. Although the pixel range to be scanned is designed to include six pixels or less, reflected light from a document that enters the image sensing element is influenced in various way due to float of a document from the document table, unevenness of a document, and the like. For this reason, one pixel of the image sensing element may scan a range exceeding six pixels. The embodiments to be described hereinafter show a plurality of graphs used to explain image signals obtained by scanning a document. However, these image signals are not always obtained from reflected light within six pixels or less. FIGS. 6A and 6B simply illustrate the range of reflected light that comes from a document and enters one pixel of the image sensing element.

As shown in FIG. 6A, the image sensing element used in this embodiment is designed so that reflected light within six pixels from a 7-pixel range of a document enters one pixel of the image sensing element (as described above, reflected light that exceeds six pixels may enter in some cases). That is, reflected light from one pixel on a document influences seven pixels of the image sensing element. This causes edge blurring described in the paragraphs of the related art, and deteriorates sharpness. One of objects of the embodiments to be described hereinafter is to reduce blurring. For example, in the second embodiment to be described later, an edge is enhanced by replacing an interest pixel by a replacement candidate pixel. Therefore, by selecting a replacement candidate from a pixel area less influenced by a document pixel corresponding to the interest pixel, the edge enhancing effect can be improved. For this reason, in order to assure a minimum area which is influenced by one pixel of a document image as the process area, the 7×7 area is set as the process area.

However, in order to improve the edge enhancing effect more, it is effective to set an area exceeding 7×7 pixels as a reference area. Also, when one pixel of the image sensing element is designed to receive reflected light from a 3-pixel range of a document, as shown in FIG. 6B, the process area may be set as small as a 3×3 area. In this manner, the reference area can be set as suitable in accordance with the performance of the image sensing element such as the number of pixels of the image sensing element influenced by one pixel of a document image, the spot size, the number of blurred pixels, Modulation Transfer Function (MTF), and the like.

Definitions and limitations of terms used in the description of the embodiments of the present invention will be described below.

In the embodiments to be described hereinafter, the number of changes will be described as the number of sign changes (the number of zero-crossing points) in luminance changes in an interest area. However, the present invention is not limited to such specific definition. That is, the number of changes is defined as a value that expresses the frequency of occurrence of changes in value associated with image signals such as the number of zero-crossing points or spatial frequency of the primary derivatives of values associated with image signals in the interest area, the number of black-white changes after binarization, and the like.

In the embodiments to be described hereinafter, a changing amount will be described as the absolute value (edge amount) of the luminance difference with respect to an interest pixel. However, the present invention is not limited to such specific definition. That is, the changing amount is defined as a value that expresses the difference (magnitude) of changes such as the absolute value of the primary derivative of a value related to an image signal of an interest pixel or the like, or as a value that representatively expresses the difference (magnitude) of changes of values related to image signals in an interest area.

In the embodiments to be described hereinafter, a changing acceleration will be described as a value obtained by further calculating a difference from the differences of luminance values in the interest area. However, the present invention is not limited to such specific definition. That is, the changing acceleration is defined as a value that expresses the acceleration of changes such as the quadratic derivative of values associated with image signals in the interest area and the like.

In the embodiments to be described hereinafter, a saturation will be explained as a maximum absolute value of image signal differences of respective colors of an interest pixel or area. However, the present invention is not limited to such specific definition. The saturation is defined as a value that expresses the distance from the luminance axis.

As will be described in the embodiments to be described hereinafter, adaptively setting a correction strength is defined such that different correction strengths are set for each value in at least some value areas of those which the defined number of changes times, changing amount, changing acceleration, and saturation can assume. Details of the embodiments will be described hereinafter. Note that a range that an image signal can assume is 0 to 225 will be exemplified. However, the range of an image signal is not limited to this, and may be set to fit the image processes of an MFP to be used.

First Embodiment

Assume that the first embodiment sets an edge strength as the correction strength, and executes an edge enhancing filter process as the correction process. That is, an edge enhancing amount of an edge enhancing filter (to be described later) is corrected by an edge strength, which is adaptively set based on the number of changes and changing amount. The edge strength setting and application of the set edge strength will be described below.

FIG. 7 is a flowchart of the correction strength setting process according to the first embodiment. The correction strength setting will be described below along the steps of the flowchart.

In step 701 after the start of the process, a process region setting process is executed. That is, a process area is set, i.e., a 7×7 area including seven pixels in the horizontal direction and seven pixels in the vertical direction to have the interest pixel as the center in an image configured by RGB multi-valued image signals. Then a 7×7 process area is generated of luminance L by calculating luminance L from respective pixel values of the process area by:

$$L=(R+2\times G+B)/4 \quad (1)$$

Figure 8A:
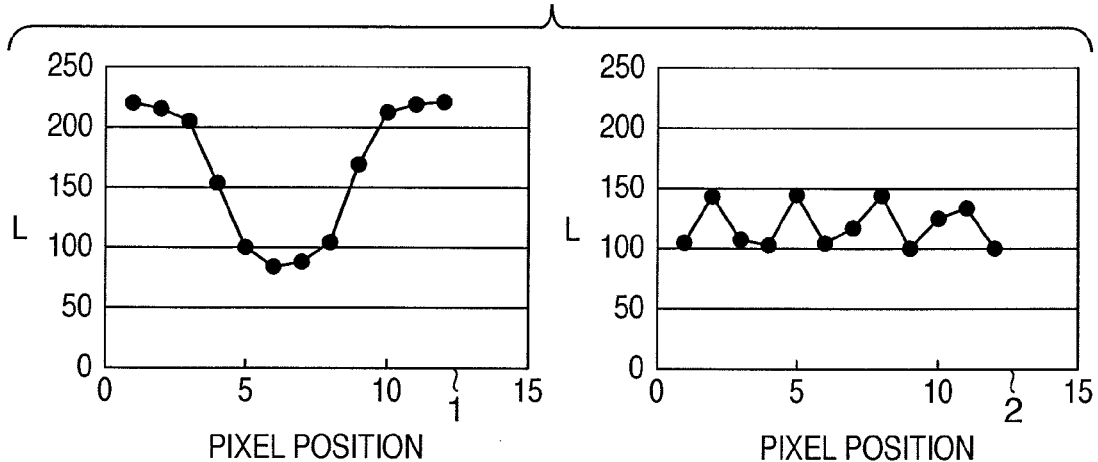
FIGS. 8A to 8C are graphs for explaining the luminance, primary derivative, and quadratic derivative used in the first embodiment of the present invention.

Note that the first embodiment uses luminance L given by equation (1), but may adapt other luminance values. For example, L* of a uniform color space L*a*b* may be used as luminance, or Y of a YCbCr color space may be used as luminance. Graph 1 of FIG. 8A shows luminance values L upon scanning a black vertical line in a white background in the horizontal direction. Graph 2 of FIG. 8A shows luminance values L upon scanning halftone dots, which line up in the horizontal direction in a white background, in the horizontal direction.

Figure 9:
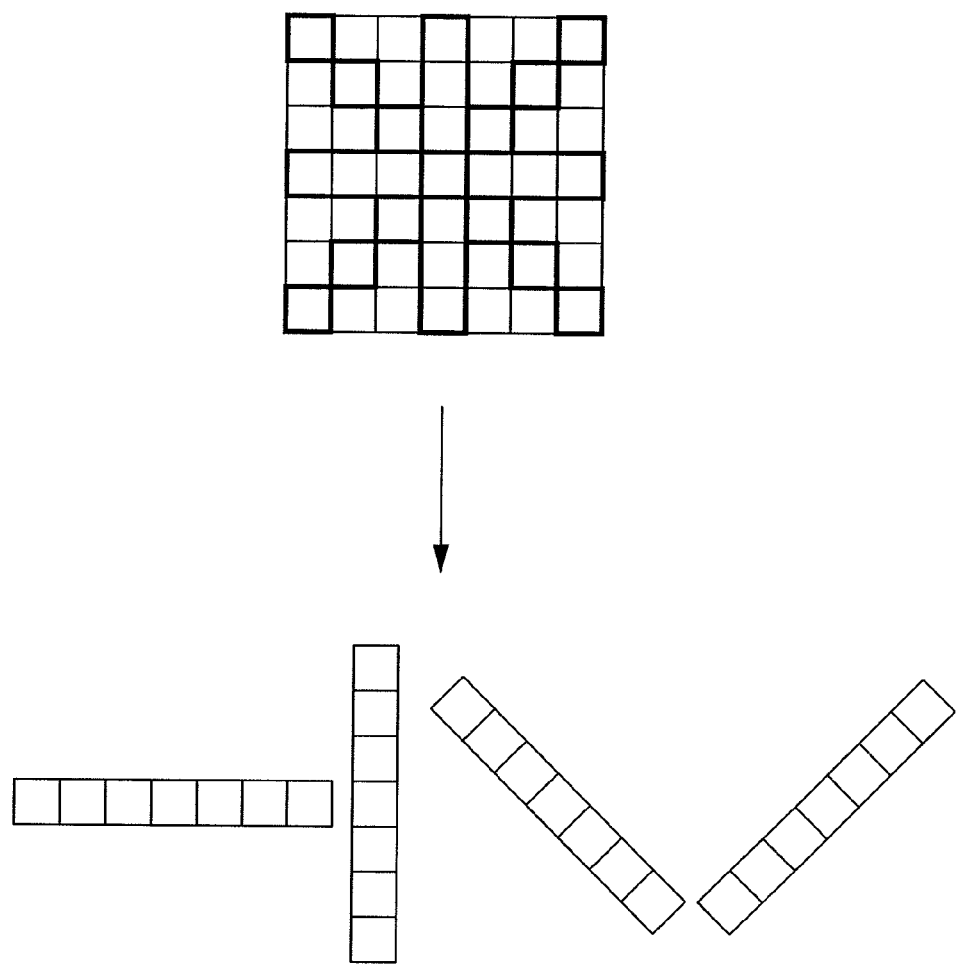
FIG. 9 is an explanatory view of four-direction extraction used in the first embodiment of the present invention.

In step 702, a four-direction extraction process is executed. That is, from the process area of L generated in step 701, respective seven pixels are extracted in each of a total of four directions, i.e., one horizontal direction, one vertical direction, and two oblique directions, as shown in FIG. 9.

In step 703, an L difference calculation process is executed. That is, differences Grd is calculated of luminance values L of five pixels in each direction from those in the four directions extracted in step 702, as shown in FIG. 10, and using:

$$Grd(i)=L(i+1)-L(i-1) \quad (2)$$

where L(i) is the luminance value of pixel (i), L(i−1) is that of a pixel before pixel L(i), and L(i+1) is that of a pixel after pixel L(i).

Note that the L difference calculation method is not limited to such specific method. For example, differences between neighboring pixels may be calculated, or differences between pixels further separated from those before and after a given pixel described above may be calculated.

Figure 8B:
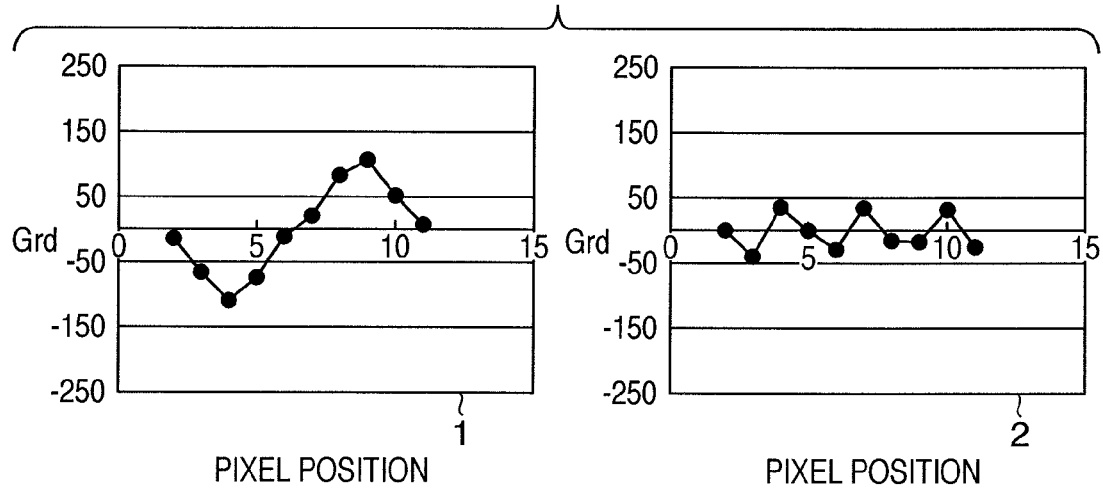

Graphs 1 and 2 of FIG. 8B show the differences Grd calculated by applying equation (2) to the luminance values L in graphs 1 and 2 of FIG. 8A.

In step 704, an edge direction determination process is executed. That is, difference Grd absolute values are calculated in the four directions at the position of the interest pixel in the differences Grd in the four directions calculated in step 703. A direction is determined that shows a maximum difference Grd absolute value of those in the four directions as an edge direction of the interest pixel.

In step 705, a changing amount calculation process is executed. In this step, as a changing amount (edge amount) of the interest pixel, a maximum absolute value is calculated from five pixels of the differences Grd of the edge direction calculated in step 703 in the edge direction determined in step 704. An edge is stronger with increasing changing amount, and is close to flat with decreasing changing amount.

Figure 11A:
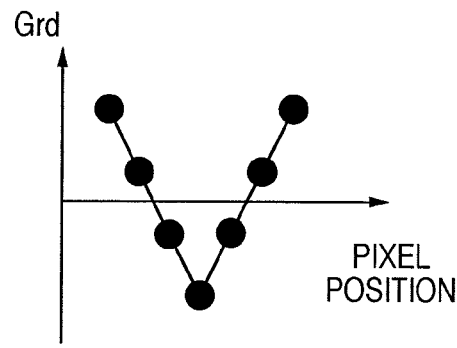
FIGS. 11A to 11D are graphs for explaining the number of changes used in the first embodiment of the present invention.
Figure 11B:
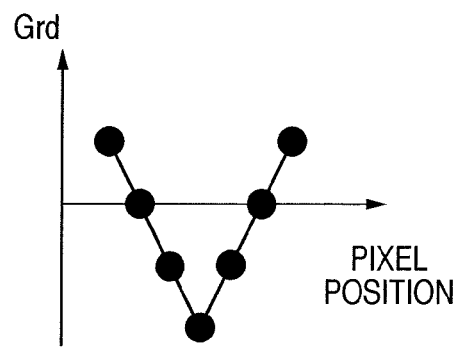

Furthermore, in step 706 a changing times calculation process is executed. In this step, the number of changes is calculated as a total of those in the four directions from the differences Grd in the four directions calculated in step 703. As the number of changes, the number of changes of the sign of the difference Grd from + to − or vice versa is calculated, as shown in FIG. 11A. Furthermore, as the number of changes (the number of zero-crossing points) of the interest pixel, the number of changes of the sign of Grd from + to 0 and then to − at the next pixel, or from − to 0 and then to + at the next pixel is calculated, as shown in FIG. 11B.

Figure 11C:
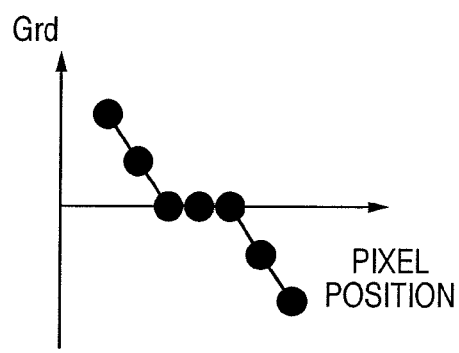
Figure 11D:
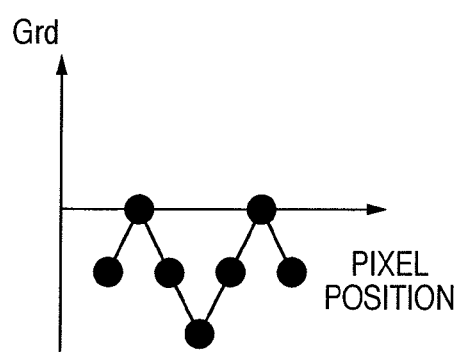

Note that the first embodiment does not count, as the number of changes, a case in which the sign changes to sandwich zeros of a plurality of pixels, as shown in FIG. 11C, or a case in which the difference Grd becomes zero but its sign does not change, as shown in FIG. 11D. When the differences Grd assume zero at the plurality of pixels or when the differences Grd become zero but their sign does not change, a bold line is likely to be determined. As will be described in step 708 and in step 1403 in FIG. 14 to be described later, a strength that is different from that for a fine line in FIG. 11A or 11B, can advantageously be set for the bold line.

Figure 8C:
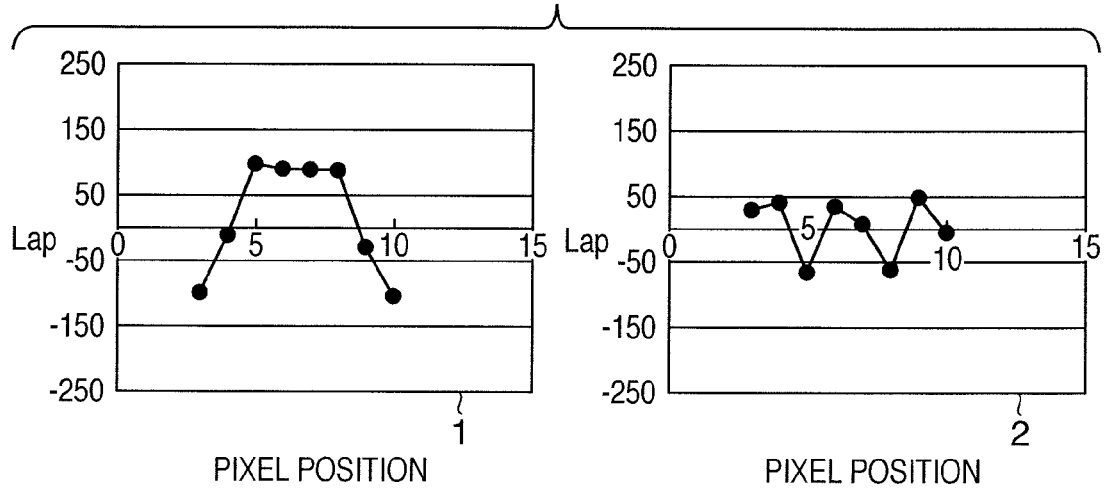

As shown in FIGS. 8A to 8C, a text area tends to have the smaller number of changes than a halftone dot area. However, depending on the density uniformity of a document or shading accuracy, a text area may have a lot of changes with small amplitudes in differences Grd, as shown in FIG. 12A. In such case, the number of changes increases like a halftone dot area, and if a correction strength setting process (to be described later) is executed, an edge strength close to that of the halftone dot area is undesirably set. Hence, when the changing amount calculated in step 705 is relatively large, i.e., when it exceeds a set threshold, if small differences Grd are smoothed to zero, it becomes possible to set an edge strength with higher accuracy. More specifically, the changing amount calculated in step 705 is compared with a threshold (edge threshold), and if the edge amount exceeds the edge threshold, a smoothing threshold is set, as shown in FIG. 12B. In case of difference Grd absolute values equal to or smaller than the smoothing threshold, the number of changes is calculated by regarding that difference Grd as 0, as shown in FIG. 12C. In this manner, the number of changes times of the text area can be suppressed, and a high accuracy of edge strength setting is available.

Referring back to the process in FIG. 7, in step 707 an edge strength Fz1 setting process is executed based on the number of changes. That is, an edge strength Fz1 is adaptively set in accordance with the number of changes calculated in step 706. FIG. 13A is a graph for explaining the edge strength Fz1 setting in step 707: the abscissa plots the number of changes, and the ordinate plots the edge strength Fz1. In case of the number of changes which is smaller than a first threshold and with which a text area is more likely to be determined, the edge strength Fz1 is set to be 1 to enhance the edge. In case of the number of changes which is larger than a second threshold and with which a lot of lines that readily causes moiré is more likely to be determined, the edge strength Fz1 is set to be 0 so as not to enhance moiré. In case of the number of changes falling within a range between the first and second thresholds (both inclusive), switching of the processes must be obscured. For this purpose, a different edge strength Fz1 is adaptively set for each number of changes, so that the edge strength Fz1=1 when the number of changes=the first threshold, and the edge strength Fz1=0 when the number of changes=the second threshold. More specifically, the edge strength Fz1 can adaptively be set with reference to FIG. 13A or using:

$$Fz1=(\text{second threshold}-\text{the number of changes})/(\text{second threshold}-\text{first threshold}) \quad (3)$$

Furthermore, in step 708, an edge strength is set based on the number of changes. In this case, an edge strength Fz2 is adaptively set in accordance with the number of changes calculated in step 706. FIG. 13B is a graph for explaining the edge strength Fz2 setting in step 708: the abscissa plots the number of changes, and the ordinate plots the edge strength Fz2. FIG. 13B aims at attaining FIG. 13C when it is combined with FIG. 13A. As described in step 706, when the number of changes is zero, a bold line area is more likely to be determined. When such bold line area undergoes edge enhancement using an edge enhancing filter (to be described later), bordering in which a border part of the bold line area darkens occurs. In order to prevent bordering, in case of the number of changes which is smaller than a third threshold and with which the bold line area is more likely to be determined, as shown in FIG. 13B, the edge strength Fz2 is set to be 0 to suppress edge enhancement. In case of the number of changes which is larger than a fourth threshold and with which a fine line area is more likely to be determined, the edge strength Fz2 is set to be 1 to apply edge enhancement. In case of the number of changes falling within a range between the third and fourth thresholds (both inclusive), a different edge strength Fz2 is adaptively set for each number of changes to obscure switching of the processes, so that the edge strength Fz2=0 when the number of changes=the third threshold, and the edge strength Fz2=1 when the number of changes=the fourth threshold. More specifically, Fz2 can adaptively be set with reference to FIG. 13B or using:

$$Fz2=\text{(the number of changes-third threshold)/(fourth threshold-third threshold)} \quad (4)$$

Fz1×Fz2 can implement the edge strength shown in FIG. 13C. If bordering is required, the edge strength Fz2=1 can be set irrespective of the number of changes.

In step 709, an edge strength setting process is executed based on the changing amount. That is, an edge strength Fe is adaptively set in accordance with the changing amount calculated in step 705. FIG. 13D is a graph for explaining the edge strength Fe setting process in step 709: the abscissa plots the changing amount, and the ordinate plots the edge strength Fe. In case of the changing amount which is smaller than a fifth threshold and with which a flat area is more likely to be determined, the edge strength Fe=0 is set so as not to roughen an image by enhancing small changes. In case of the changing amount which is larger than a sixth threshold and with which an edge area is more likely to be determined, the edge strength Fe=1 is set to apply edge enhancement. In case of the changing amount falling within a range between the fifth and sixth thresholds (both inclusive), a different edge strength Fe is adaptively set for each changing amount to obscure switching of the processes, so that the edge strength Fe=0 when the changing amount=the fifth threshold and the edge strength Fe=1 when the changing amount=the sixth threshold. More specifically, Fe can adaptively be set with reference to FIG. 13D or using:

$$Fe=\text{(changing amount-fifth threshold)/(sixth threshold-fifth threshold)} \quad (5)$$

In this way, the correction strength setting process ends.

Figure 14:
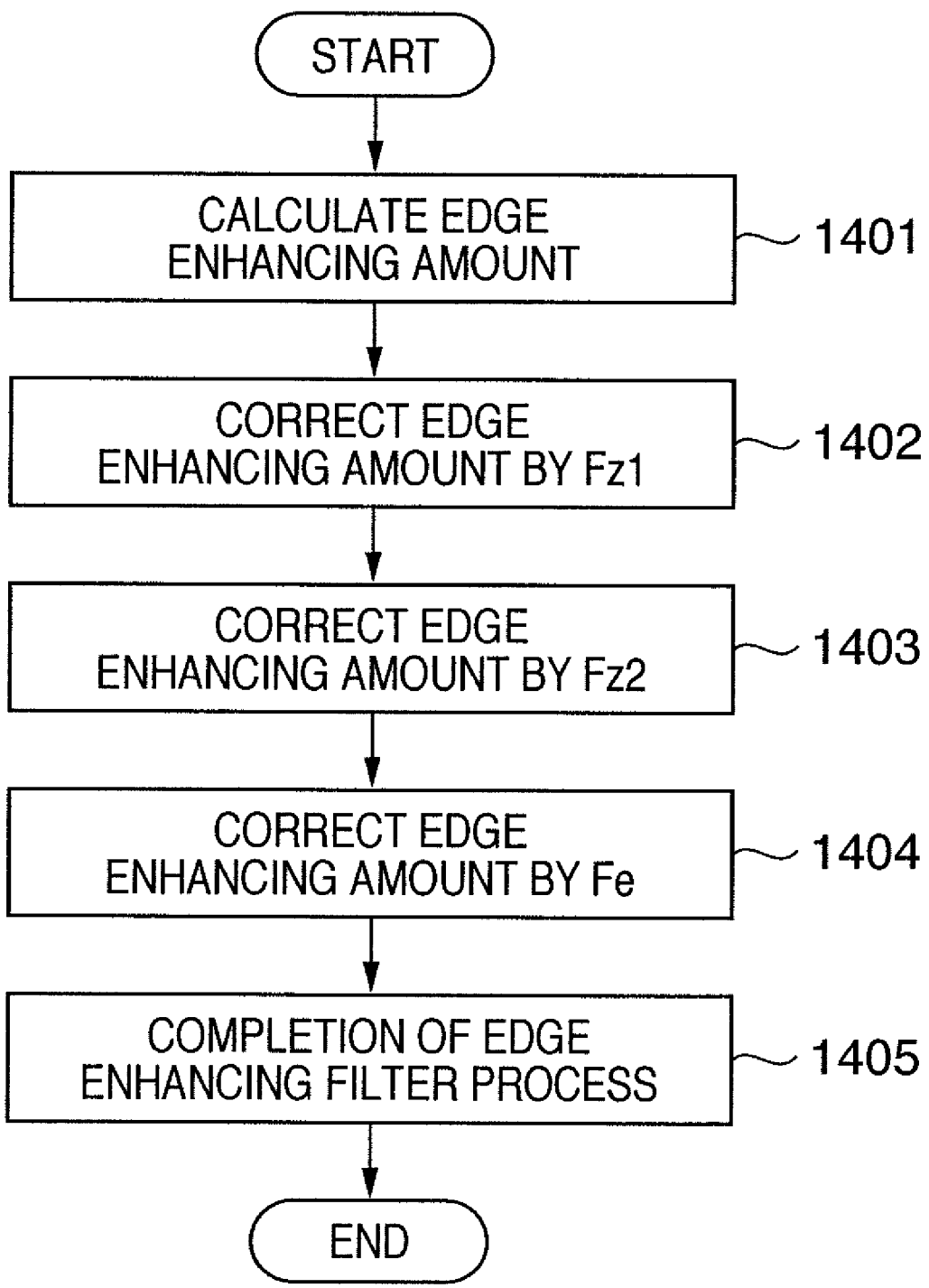
FIG. 14 is an operation flowchart of a correction process according to the first embodiment of the present invention.

FIG. 14 is a flowchart showing the operation of the correction process according to the first embodiment. The correction process will be described below along respective steps of the flowchart.

In step 1401 after the start of the process, an edge enhancing amount calculation process is executed. That is, differences (edge enhancing amounts) is calculated between the interest pixel value upon applying an edge enhancing filter to the 7×7 RGB areas set in step 701 and that before application, for respective colors. The first embodiment will exemplify a case in which a 5×5 edge enhancing filter is applied to have the interest pixel as the center. However, the filter size need only be smaller than the process area size set in step 701, and filter coefficient values may be appropriately set. FIG. 15A shows an example of filter coefficients of a 5×5 edge enhancing filter. Let N0 be an interest pixel value, N1 be an interest pixel value as a result of application of the filter in FIG. 15A, and ΔF be an edge enhancing amount. The edge enhancing amount ΔF ca be calculated by:

$$\Delta F = N1 - N0 \quad (6)$$

When the filter coefficient of the interest pixel is set to be a value obtained by subtracting the filter total value in FIG. 15A from the filter coefficient at the position of the interest pixel in FIG. 15A, as shown in FIG. 15B, the edge enhancing amount ΔF can be calculated by applying FIG. 15B.

The process advances to step 1402, and an edge enhancing amount correction process is executed using the edge strength Fz1. That is, the edge enhancing amount ΔF, which is calculated in step 1401, is corrected using the edge strength Fz1 set in step 707. A corrected edge enhancing amount ΔFz1 is calculated using:

$$\Delta Fz1 = Fz1 \times \Delta F \quad (7)$$

By the process in step 1402, a text area with the small number of changes can undergo relatively strong edge enhancement, and a halftone dot area with the large number of changes can undergo relatively weak edge enhancement. Hence, the sharpness of text can be enhanced, and moiré can be prevented from being enhanced at the same time.

In step 1403, an edge enhancing amount correction process is executed using the edge strength Fz2. That is, the edge enhancing amount ΔFz1, which is calculated in step 1402, is corrected using the edge strength Fz2 set in step 708. A corrected edge enhancing amount ΔFz2 is calculated using:

$$\Delta Fz2 = Fz2 \times \Delta Fz1 \quad (8)$$

When the edge strength Fz2 is set, as shown in FIG. 13B, the process in step 1403 can apply edge enhancement to the bold line area to prevent bordering, and can apply stronger edge enhancement to the fine line area than the bold line area to enhance the sharpness and increase the density of a black character.

Furthermore, the process advances to step 1404, and an edge enhancing amount correction process is executed using the edge strength Fe. That is, the edge enhancing amount ΔFz2, which is calculated in step 1403, is corrected using the edge strength Fe set in step 709. A corrected edge enhancing amount ΔFe is calculated using:

$$\Delta Fe = Fe \times \Delta Fz2 \quad (9)$$

By the process in step 1404, the edge area such as a character can undergo relatively strong edge enhancement, and the flat area such as a background or photograph can undergo relatively weak edge enhancement. As a result, the sharpness of a character can be enhanced, moiré can be prevented from being enhanced, and a photograph can be prevented from being roughened at the same time.

Finally, in step 1405 an edge enhancing filter process completion process is executed. That is, a pixel value Ne is calculated that has undergone the edge enhancing filter process according to the first embodiment by adding the edge enhancing amount ΔFe calculated in step 1404 to the interest pixel value N0, as given by:

$$Ne = N0 + \Delta Fe \quad (10)$$

Note that a process for clipping the pixel value Ne that has undergone the edge enhancing filter process to fall within a desired range may be inserted. In this way, the correction process operation ends.

Figure 16A:
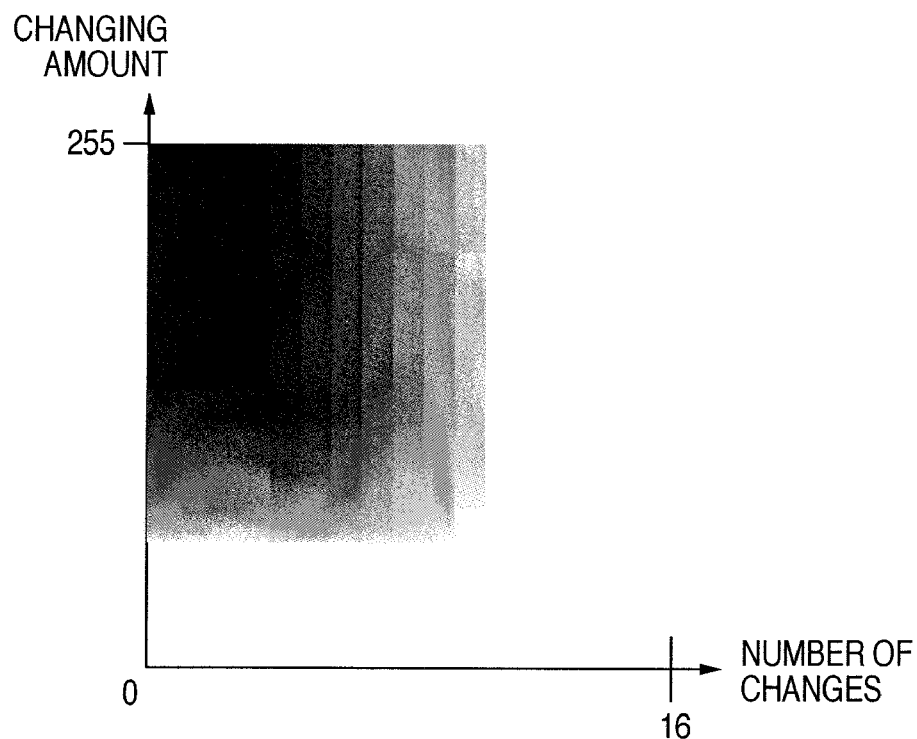
FIGS. 16A and 16B are graphs for explaining the set edge strengths used in the first embodiment of the present invention.
Figure 16B:
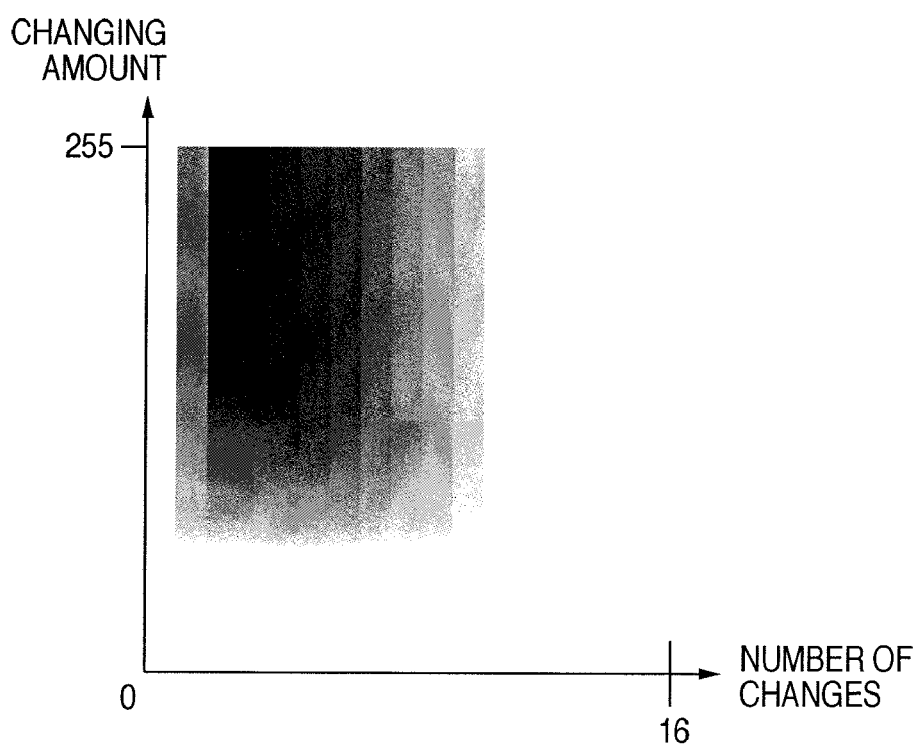

The effects according to the aforementioned first embodiment will be described below. FIGS. 16A and 16B show the adaptive correction strength set by the first embodiment to have the number of changes and changing amount as the coordinate axes. Note that the correction strength shown in FIGS. 16A and 16B is a strength (Fz1×Fz2×Fe) upon applying all of the edge strengths Fz1, Fz2, and Fe. FIG. 16A shows the setting when the bold line area is to be bordered, and FIG. 16B shows the setting when the bold line area is not to be bordered. In FIGS. 16A and 16B, the correction strength becomes stronger with increasing density.

In the prior art, the correction strength cannot be adaptively set in accordance with the number of changes. However, according to the first embodiment, as shown in FIGS. 16A and 16B, the correction strength can be adaptively set in accordance with the number of changes. Since the correction strength can be changed according to not only the changing amount but also the number of changes, bad effects of moiré by edge enhancement to a halftone dot area as the issue of the first technique described in the background section can be reduced. Furthermore, since the correction strength can be adaptively set according to the number of changes, bad effects of switching of the processes due to the number of changes as the issue of the second technique can be reduced. Since the correction strength can be adaptively set according to the number of changes and changing amount, bad effects of switching of the processes due to the number of changes and changing amount as the issue of the third technique can be reduced.

Figure 17A:
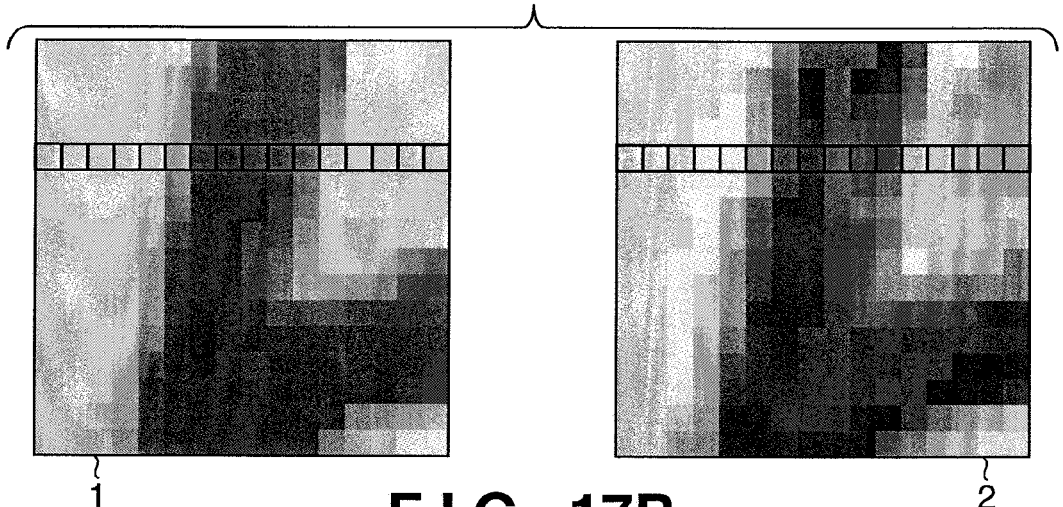
FIGS. 17A to 17C are explanatory views showing images before and after edge enhancement used in the first embodiment of the present invention.
Figure 17B:
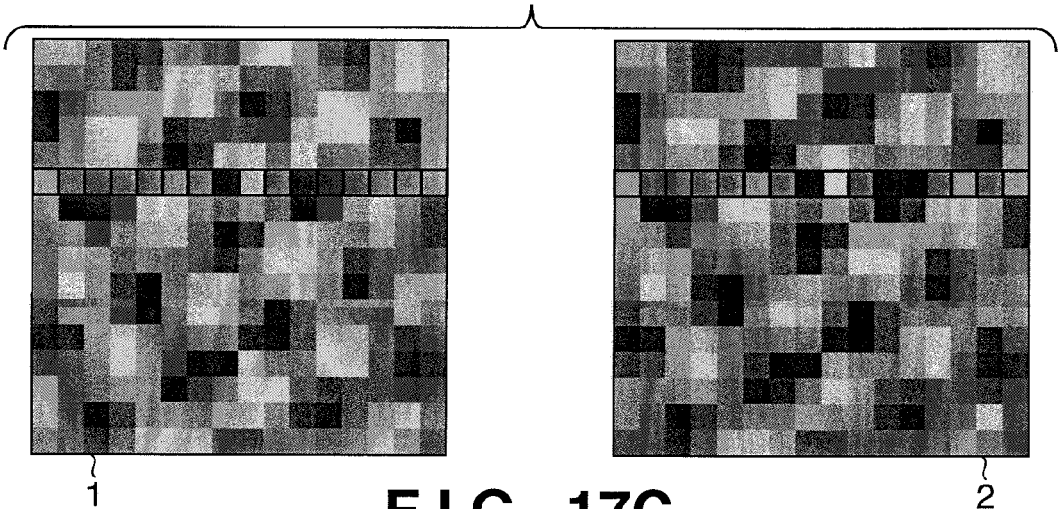
Figure 17C:
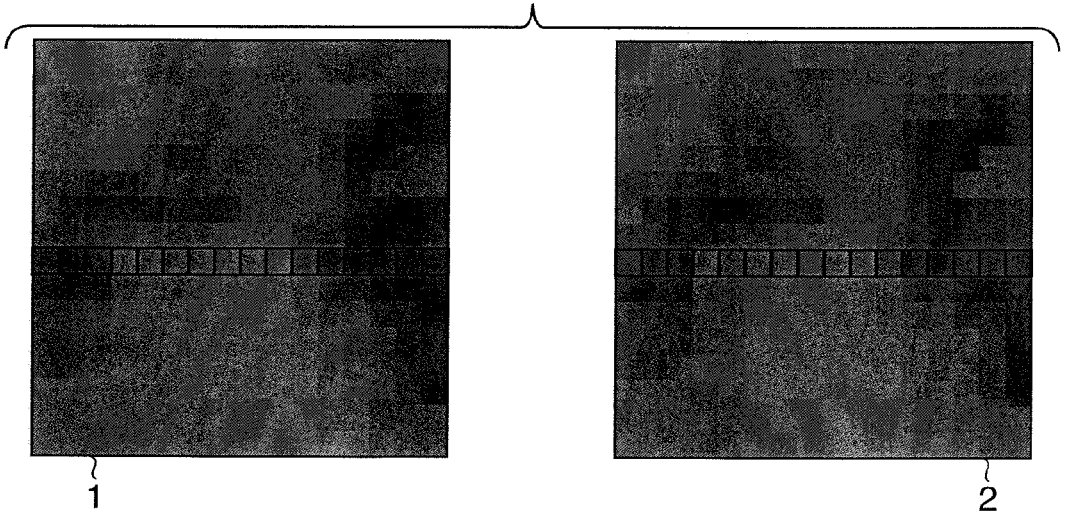
Figure 18A:
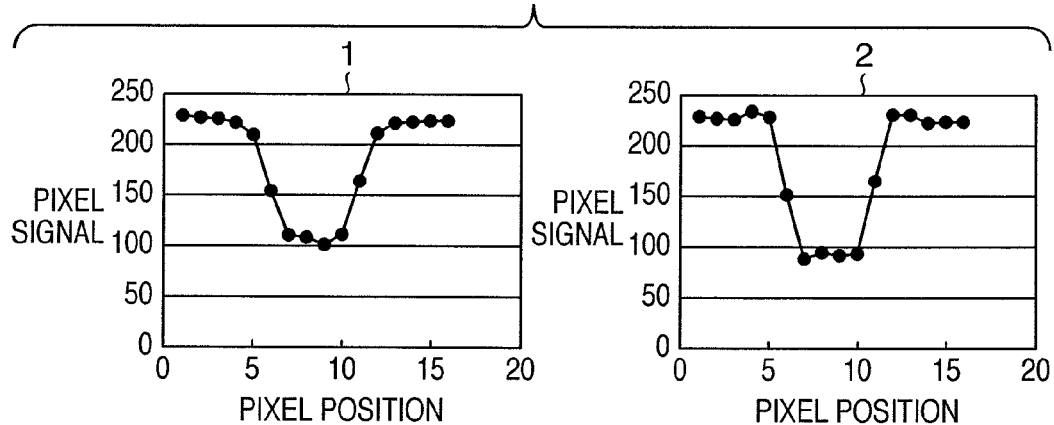
FIGS. 18A to 18C are graphs for explaining image signals before and after edge enhancement used in the first embodiment of the present invention.

FIGS. 17A to 17C show images before and after edge enhancement upon scanning a document at a resolution of 600 dpi. Images 1 and 2 in FIG. 17A correspond to those of a part of a numeric character "5" with a size of 7 pt and show states before and after edge enhancement of the first embodiment respectively. Graphs 1 and 2 in FIG. 18A respectively correspond to images 1 and 2 in FIG. 17A, and show image signals of 16 pixels shown in images 1 and 2 in FIG. 17A.

Figure 18B:
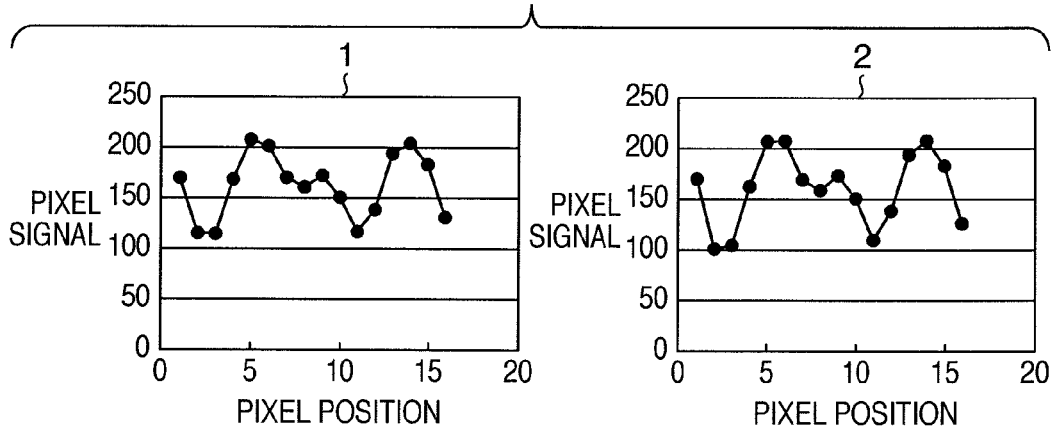

Images 1 and 2 in FIG. 17B correspond to those which express a 50% density using a halftone dot screen with 150 LPI and a screen angle of 30°, and show states before and after edge enhancement of the first embodiment respectively. Graphs 1 and 2 in FIG. 18B respectively correspond to images 1 and 2 in FIG. 17B, and show image signals of 16 pixels shown in images 1 and 2 in FIG. 17B.

Figure 18C:
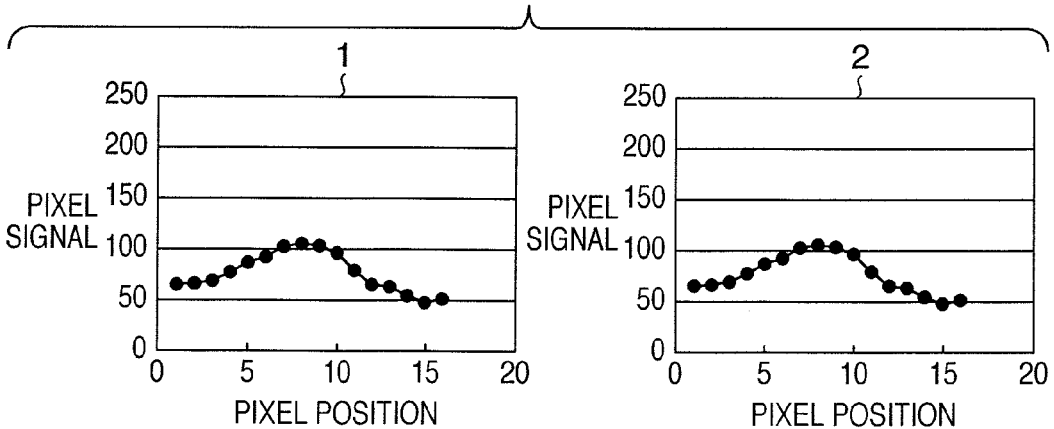

Images 1 and 2 in FIG. 17C correspond to photographs that express a part of the human eye, and show states before and after edge enhancement of the first embodiment respectively. Graphs 1 and 2 in FIG. 18C respectively correspond to images 1 and 2 in FIG. 17C, and show image signals of 16 pixels shown in images 1 and 2 in FIG. 17C.

As shown in FIGS. 17A to 17C and FIGS. 18A to 18C, according to the first embodiment, enhancement of an image signal of the text edge, that of the halftone edge weaker than the text edge, and that of the photograph edge weaker than text edge can be attained at the same time.

Second Embodiment

The first embodiment has exemplified the case in which the edge enhancing process by means of the filter process is executed at the adaptive strength. The second embodiment will exemplify a case in which edge enhancing and smoothing processes are executed at the adaptive strength.

Figure 19:
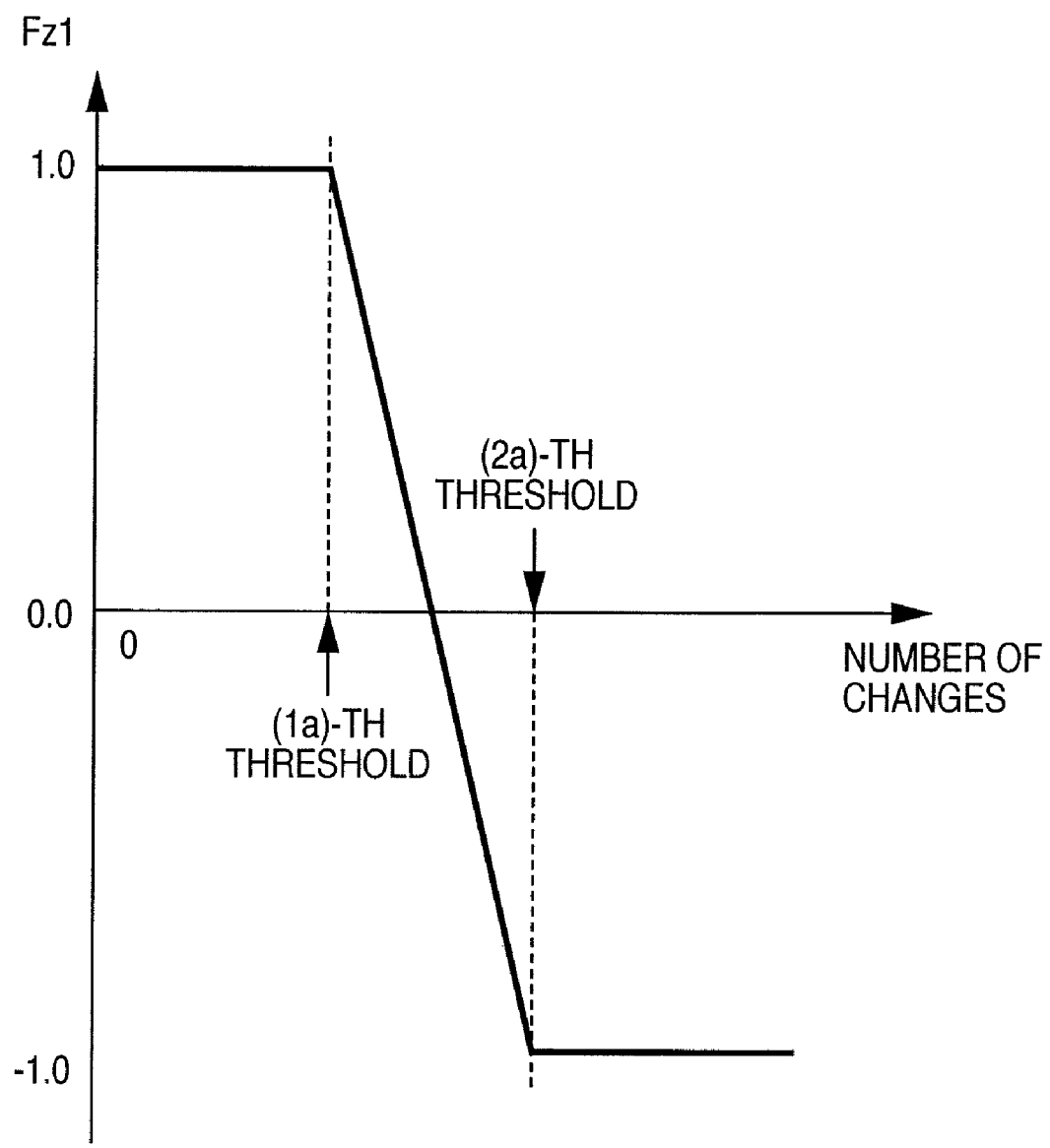
FIG. 19 is a graph for explaining an edge strength setting, which includes smoothing, used in the first embodiment of the present invention.

In step 707 shown in FIG. 7 of the first embodiment, an edge strength Fz1 shown in FIG. 19 is used in place of that shown in FIG. 13A. The edge strength Fz1 in FIG. 19 is characterized by also having a strength of a − sign. If the edge strength is +, Fz1 has an effect of enhancing an edge; if the strength is −, Fz1 has an effect of weakening (smoothing) an edge. By setting a − edge strength for the number of changes with which a halftone dot area is more likely to be determined (that larger than a (2a)-th threshold), as shown in FIG. 19, the halftone dot area can be smoothed. More specifically, the first embodiment avoids enhancement of moiré due to halftone dots, while the second embodiment can reduce moiré.

Figure 20:
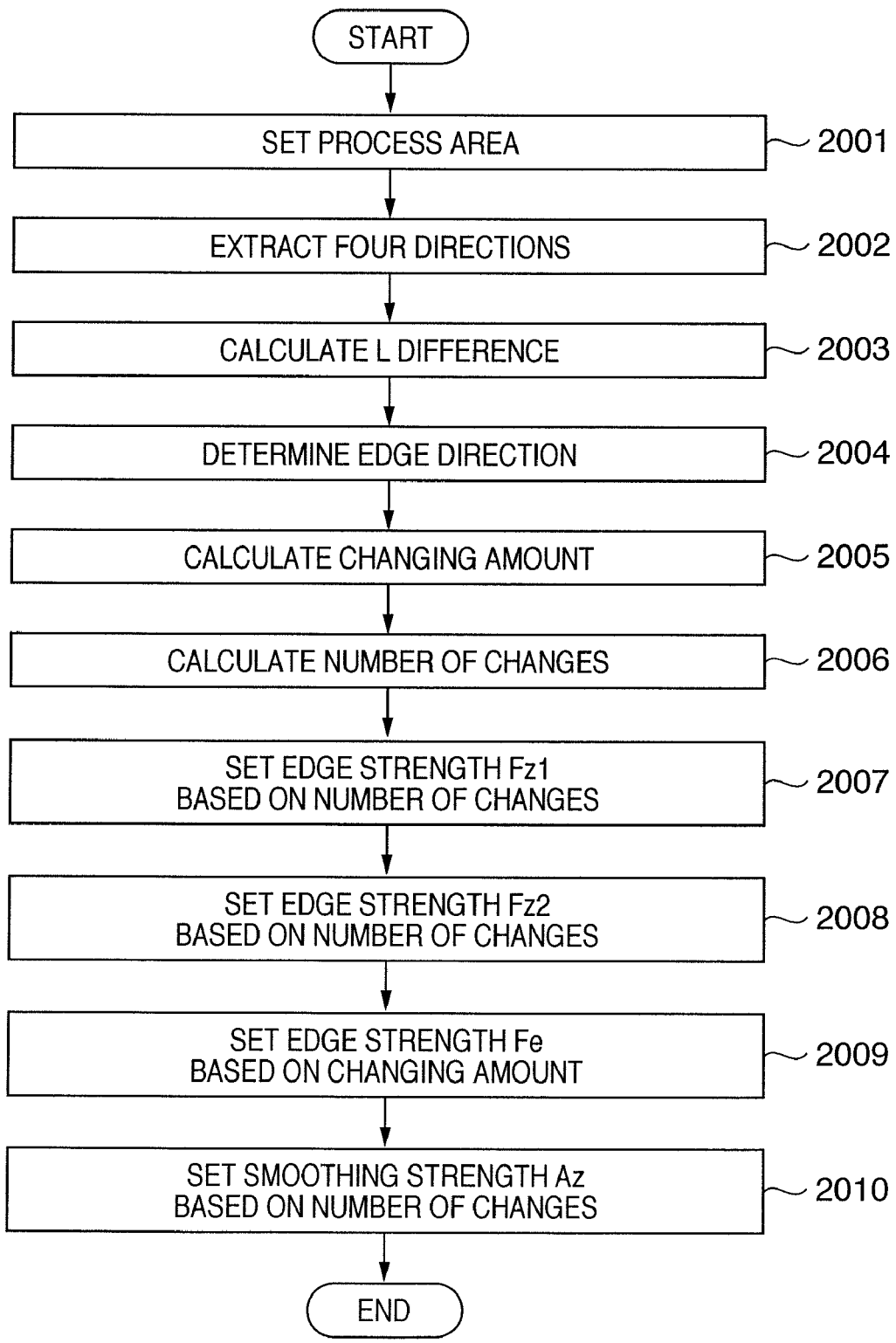
FIG. 20 is an operation flowchart of a correction strength setting according to the second embodiment of the present invention.

Another smoothing example will be described below. FIG. 20 is a flowchart of a correction strength setting process according to the second embodiment. Since steps 2001 to 2009 in the flowchart of FIG. 20 are the same as steps 701 to 709 in the flowchart of FIG. 7 that has already been explained in the first embodiment, a repetitive description thereof will be avoided. Steps different from the first embodiment will be explained.

Figure 21:
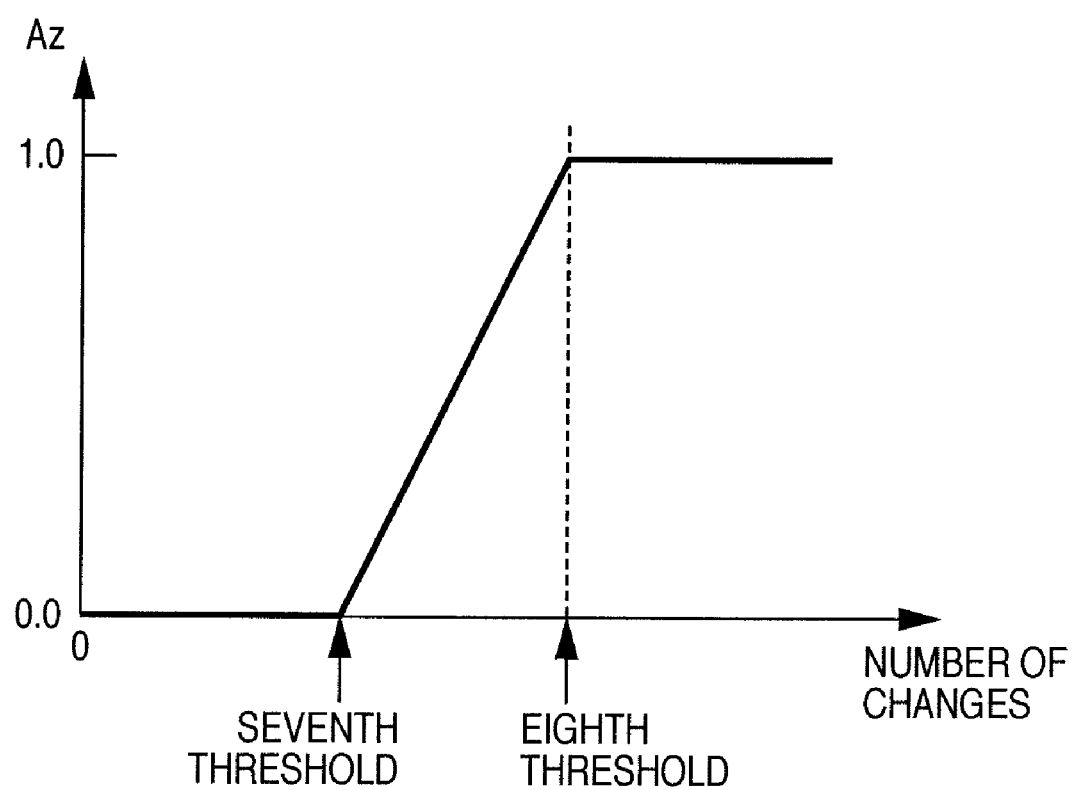
FIG. 21 is a graph for explaining a smoothing strength setting used in the second embodiment of the present invention.

More specifically, in step 2010 a smoothing strength Az is adaptively set in accordance with the number of changes calculated in step 2006. FIG. 21 is a graph for explaining the smoothing strength Az setting process in step 2010: the abscissa plots the number of changes, and the ordinate plots the smoothing strength Az. In case of the number of changes which is smaller than a seventh threshold and with which a text area is more likely to be determined, the smoothing strength Az is set to be zero so as not to apply smoothing. In case of the number of changes which is larger than an eighth threshold and with which a halftone dot area is more likely to be determined, the smoothing strength Az is set to be 1 so as to apply smoothing. In case of the number of changes falling within the range between the seventh and eighth thresholds (both inclusive), the smoothing strength Az is adaptively set for each number of changes to obscure switching of the processes, so that the smoothing strength Az=0 when the number of changes=the seventh threshold and the smoothing strength Az=1 when the number of changes=the eighth threshold. More specifically, Az can adaptively be set with reference to FIGS. 16A and 16B or using:

$$Az = (\text{eighth threshold} - \text{the number of changes})/(\text{eighth threshold} - \text{seventh threshold}) \quad (11)$$

Figure 22:
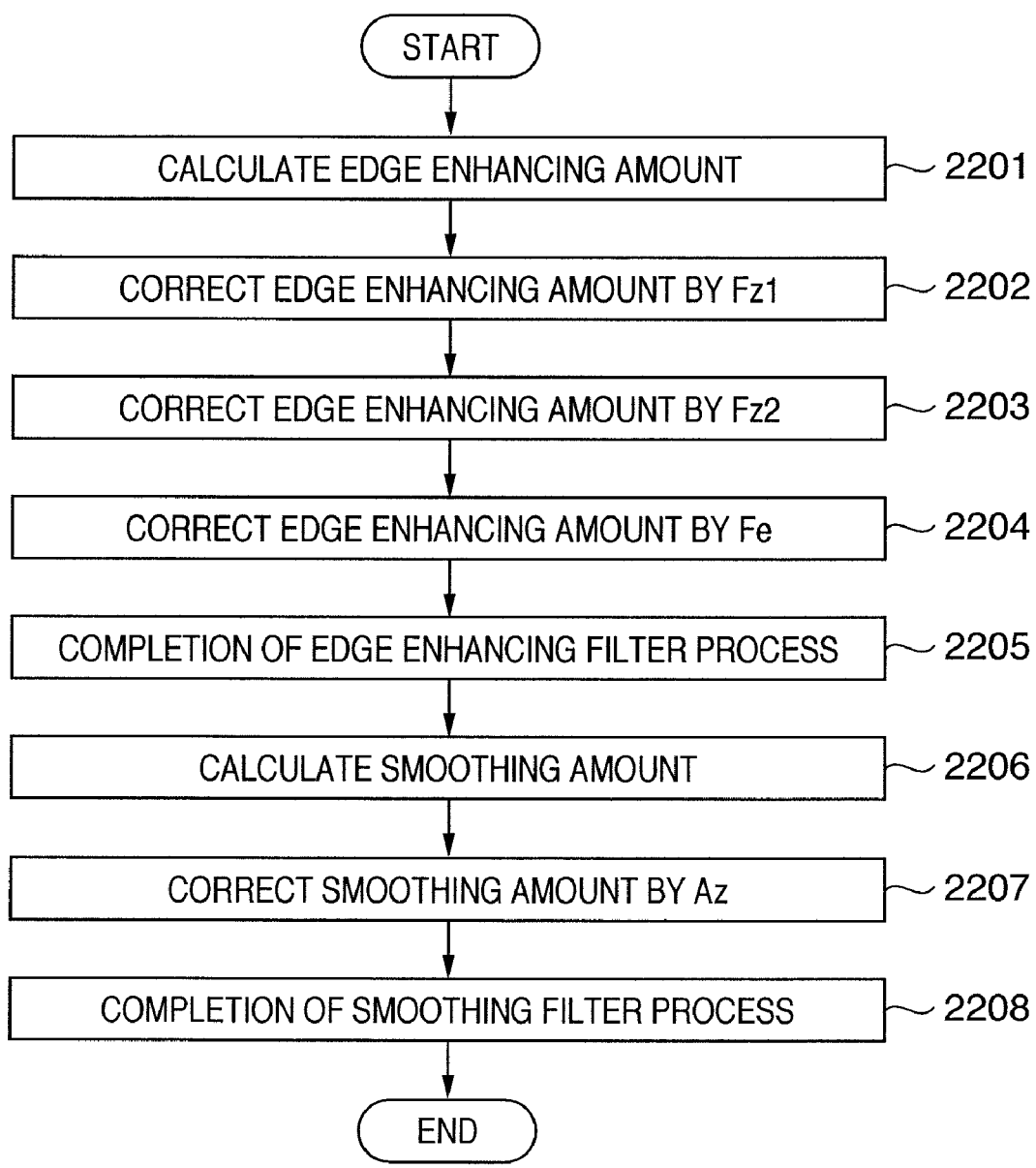
FIG. 22 is an operation flowchart of a correction process according to the second embodiment of the present invention.

FIG. 22 is a flowchart of the correction process according to the second embodiment. Since steps 2201 to 2205 in the flowchart of FIG. 22 are the same as steps 1401 to 1405 in the flowchart of FIG. 14 that has already been explained in the first embodiment, a repetitive description thereof will be avoided. Hence, only steps different from the first embodiment will be described.

Figures 23A, 23B:
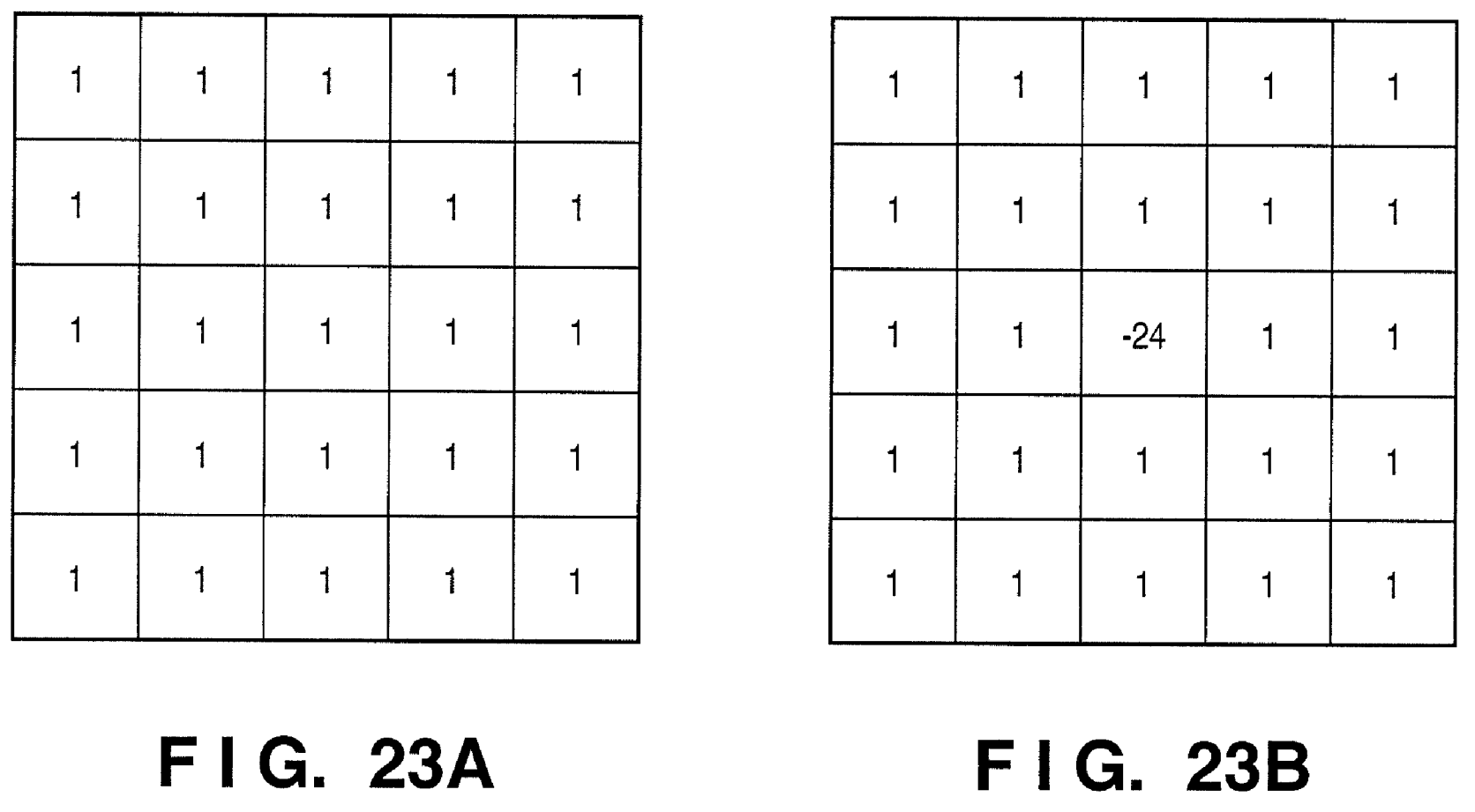

In step 2206, change amounts (smoothing amounts) is calculated between the interest pixel value upon applying a smoothing filter to blocks of the 7×7 RGB areas set in step 2001 and that before application, for respective colors. The second embodiment will exemplify a case in which a 5×5 smoothing filter is applied to have the interest pixel as the center. However, the filter size need only be smaller than the process area size set in step 2001, and filter coefficient values may be appropriately set. FIG. 23A shows an example of filter coefficients of a 5×5 smoothing filter. Let N0 be an interest pixel value, N2 be an interest pixel value as a result of application of the filter in FIG. 23A, and ΔA be a smoothing amount. The smoothing amount ΔA can be calculated using:

$$\Delta A = N2 - N0 \quad (12)$$

When the filter coefficient of the interest pixel is set to be a value obtained by subtracting the filter total value in FIG. 23A from the filter coefficient at the position of the interest pixel in FIG. 23A, as shown in FIG. 23B, the smoothing amount ΔA can be calculated by only applying FIG. 23B.

Furthermore, in step 2207 the smoothing amount ΔA, which is calculated in step 2206, is corrected using the smoothing strength Az set in step 2010. A corrected smoothing amount ΔAz is calculated using:

$$\Delta Az = Az \times \Delta A \quad (13)$$

By the process in step 2207, the text area with the small number of changes undergoes relatively weak smoothing so as not to impair sharpness, and the halftone dot area with the large number of changes undergoes relatively strong smoothing so as to reduce moiré.

Moreover, in step 2208 a pixel value Nf is calculated that has undergone the filter process by adding the smoothing amount ΔAz calculated in step 2207 to the pixel value Ne which is calculated in step 2205 and has undergone the edge enhancing filter process, as given by:

$$Nf=Ne+\Delta Az \quad (14)$$

Note that a process for clipping the pixel value Nf that has undergone the filter process to fall within a desired range may be inserted. The effects of the second embodiment described above will be described below. The first embodiment has the effect of preventing moiré enhancement, since it can suppress edge enhancement for a halftone dot area with the relatively large number of changes. However, when moiré has already occurred before the image correction process, the first embodiment can prevent moiré from being worsened any more, but it cannot reduce moiré.

However, since the second embodiment can strongly apply smoothing to the halftone dot area with the relatively large number of changes, it has an effect of reducing moiré. Also, since the second embodiment can weaken smoothing to be applied to the text area with the small number of changes, it will not impair the sharpness of characters.

Third Embodiment

Figure 24A:
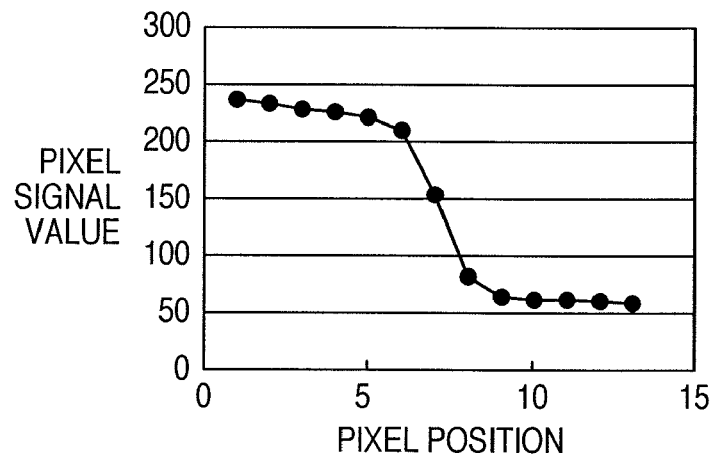
FIGS. 24A to 24C are graphs for explaining edge enhancement used in the second embodiment of the present invention.
Figure 24B:
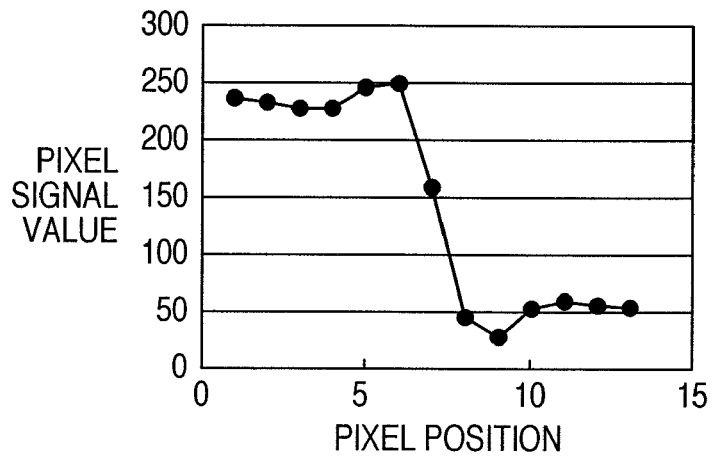

The first embodiment has exemplified the case in which the edge enhancing process by means of the filter process is executed at the adaptive strength. FIG. 24A shows the pixel values of an image signal G obtained by scanning a document, on which a black vertical line is drawn on a white background, from the white background to the black vertical line. When the same values as those in FIG. 24A line up in the vertical direction of an image, if the first embodiment is practiced using the filter shown in FIG. 15A or 15B at the edge strengths Fz1=Fz2=Fe=1, the image signal shown in FIG. 24A is converted into that shown in FIG. 24B. In FIG. 24B, the edge of the image signal is enhanced compared to FIG. 24A, but the image signal in FIG. 24B includes an intermediate value in the edge unlike in FIG. 24C. The third embodiment will exemplify a case in which a replacement process is executed at an adaptive strength to convert an image signal to be close to FIG. 24C in addition to the edge enhancement of the first embodiment, thus further enhancing edge(s).

Figure 25:
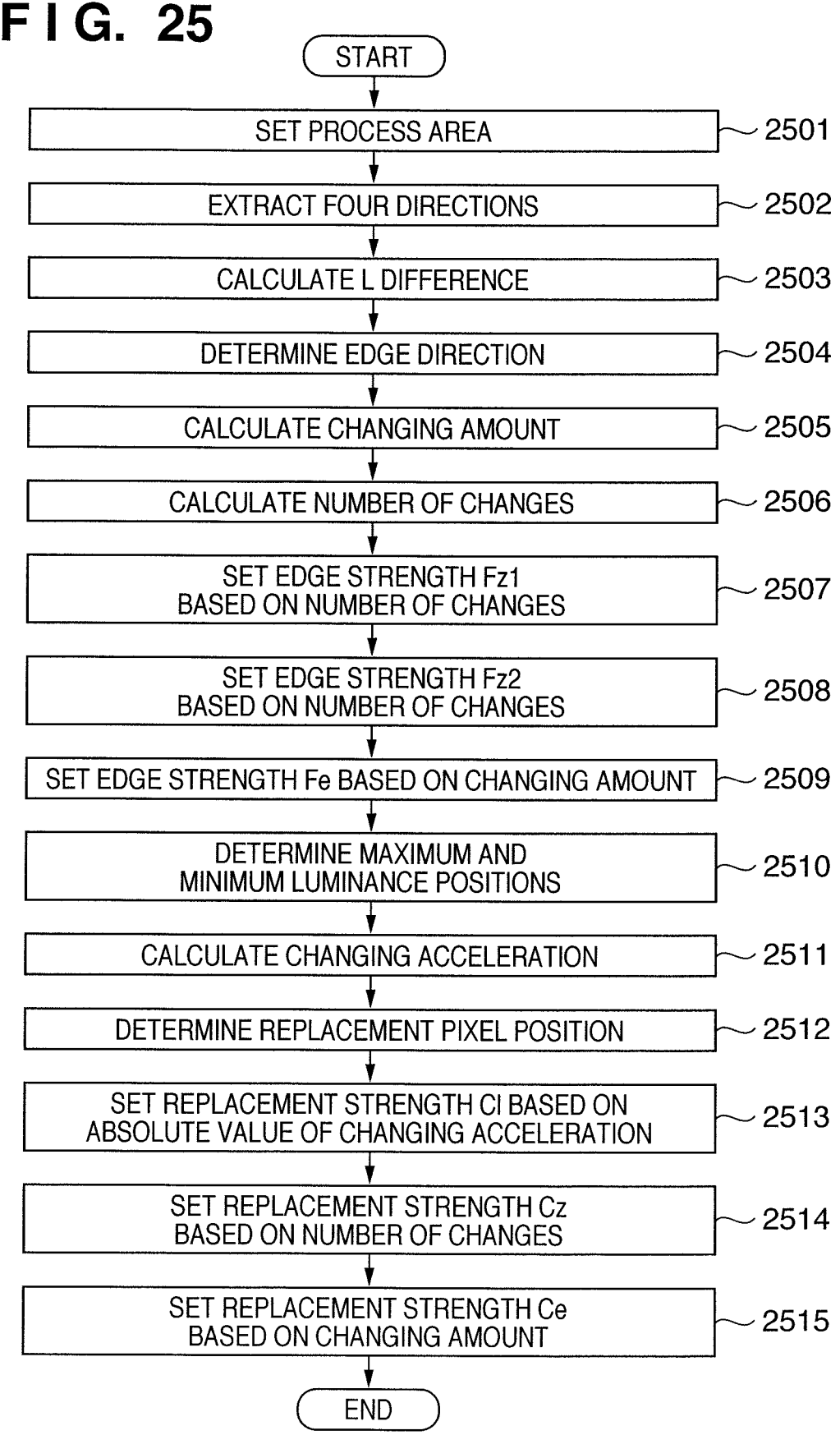
FIG. 25 is an operation flowchart of a correction strength setting according to the third embodiment of the present invention.

FIG. 25 is a flowchart of the correction strength setting process according to the third embodiment. Since steps 2501 to 2509 in the flowchart of FIG. 25 are the same as steps 701 to 709 in the flowchart of FIG. 7, a repetitive description thereof will be avoided. Therefore, only steps different from the first embodiment will be described. Also, the third embodiment may be combined with the second embodiment.

In step 2510, pixel positions with the maximum luminance value L and minimum luminance value L are determined from seven pixels of the luminance values L of the edge direction of the four directions extracted in step 2502 in the edge direction determined in step 2504. The process advances to step 2511, and a changing acceleration Lap is calculated of three successive pixels from the differences Grd of the edge direction calculated in step 2503 in the edge direction determined in step 2504. The method of calculating the changing acceleration Lap is described by:

$$Lap(i)=Grd(i+1)-Grd(i-1) \quad (15)$$

where Grd(i−1) is a pixel before pixel Grd(i), and Grd(i+1) is a pixel after that pixel. Graphs 1 and 2 in FIG. 8C respectively show Lap calculated by applying equation (15) to Grd in graphs 1 and 2 in FIG. 8B.

Note that the calculation method of the changing acceleration Lap is not limited to this. For example, a difference between neighboring Grd values may be calculated.

In step 2512, a replacement pixel position is determined based on the pixel positions with the maximum luminance value L and minimum luminance value L determined in step 2510 and the changing acceleration Lap calculated in step 2511. As shown in FIGS. 8A to 8C, when the sign of the changing acceleration Lap is +, the luminance value L of the interest pixel tends to assume a value, the absolute value of which is closer to the minimum luminance value L than the maximum luminance value L; when the sign of the changing acceleration Lap is −, the luminance value L of the interest pixel tends to assume a value, the absolute value of which is closer to the maximum luminance value L than the minimum luminance value L. Hence, as shown in Table 1 below, a replacement pixel position is determined with respect to the sign of the changing acceleration Lap to replace the pixel position, thus realizing FIG. 24C. In the third embodiment, the replacement pixel position is determined as shown in Table 1. However, handling of the edge center at which the changing acceleration Lap of the interest pixel becomes zero is not limited to Table 1. If the changing acceleration Lap of the interest pixel is zero, that pixel position may be replaced by that of the maximum luminance value L or by that of the minimum luminance value L.

TABLE 1

Relationship between quadratic derivative sign and replacement pixel position

| Lap Sign of Interest Pixel | Total Lap Sign of Previous and Next Pixels | Replacement Pixel Position |
|---|---|---|
| + |   | Minimum L |
| − |   | Maximum L |
| 0 | + | Minimum L |
| 0 | − | Maximum L |
| 0 | 0 | Maximum L |

Figure 24C:
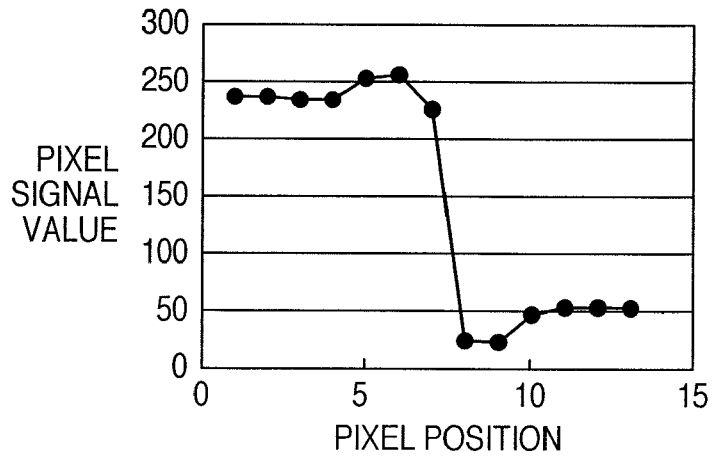
Figure 26A:
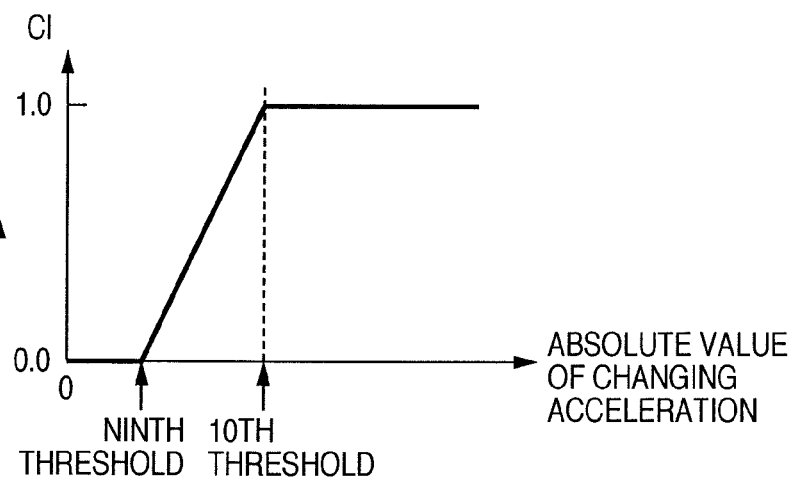
FIGS. 26A to 26C are graphs for explaining a replacement strength setting used in the third embodiment of the present invention.

In step 2513, a replacement strength Cl is adaptively set in accordance with the absolute value of the changing acceleration Lap calculated in step 2511. FIG. 24C can be obtained by setting the replacement strength Cl=1 irrespective of the absolute value of the changing acceleration Lap. However, if the replacement strength Cl=1 is always set, jaggy often stands out. Hence, a replacement example that can suppress jaggy and can enhance an edge more than FIG. 24B will be explained. FIG. 26A is a graph for explaining the replacement strength Cl setting process in step 2513: the abscissa plots the absolute value of the changing acceleration, and the ordinate plots the replacement strength Cl. In case of the changing acceleration which is near the edge center and is smaller than a ninth threshold, the replacement strength Cl is set to be zero so as not to replace the pixel position. The reason why the pixel position near the edge center is not replaced is to obscure generation of jaggy. In case of the absolute value of the changing acceleration which is separated away from the edge center and is larger than a 10th threshold, the replacement strength Cl is set to be 1 to replace the pixel position. In case of the absolute value of the changing acceleration falling within the range between the ninth and 10th thresholds (both inclusive), a different replacement strength Cl is adaptively set for each absolute value of the changing acceleration to obscure switching of the processes, so that the replacement strength Cl=0 when the absolute value of the changing acceleration=the ninth threshold and the replacement strength Cl=1 when the absolute value of the changing acceleration=the 10th threshold. More specifically, Cl can adaptively be set with reference to FIG. 26A or using:

$$Cl = (\text{absolute value of changing acceleration} - \text{ninth threshold})/(10\text{th threshold} - \text{ninth threshold}) \quad (16)$$

Figure 26B:
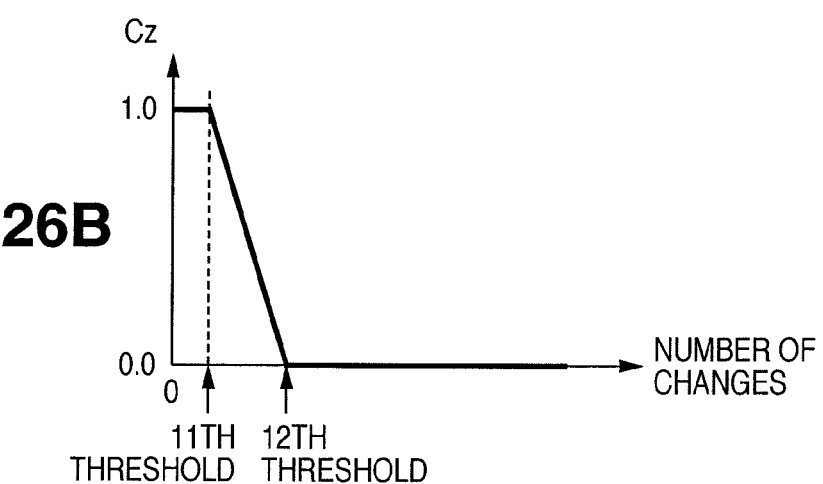

In step 2514, a replacement strength Cz is adaptively set in accordance with the number of changes calculated in step 2506. Cz is adaptively set based on characteristics shown in FIG. 26B using 11th and 12th thresholds, as in step 2507. In case of a bold line area, the number of changes of which is smaller than the 11th threshold, the replacement strength Cz=1 is set. In case of a fine line or halftone dot area, the number of changes of which is larger than the 12th threshold, the replacement strength Cz=0 is set. In case of the number of changes falling within the range between the 11th and 12th thresholds (both inclusive), Cz can adaptively be set using:

$$Cz = (12\text{th threshold} - \text{the number of changes})/(12\text{th threshold} - 11\text{th threshold}) \quad (17)$$

Figure 26C:
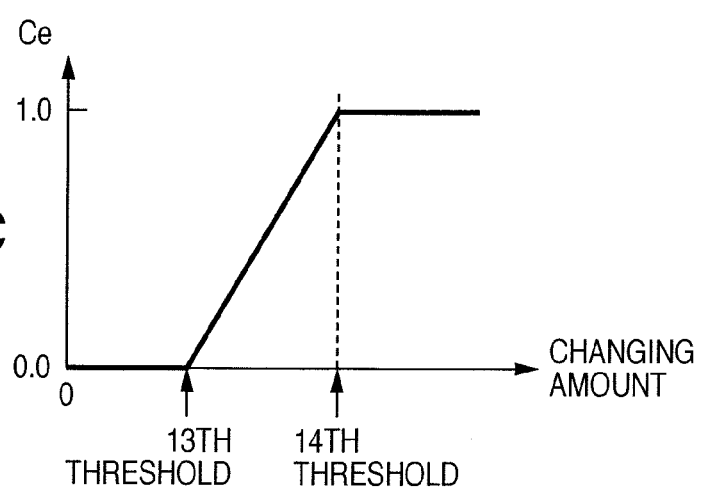

In step 2515, a replacement strength Ce is adaptively set in accordance with the changing amount calculated in step 2505. The replacement strength Ce is adaptively set based on characteristics shown in FIG. 26C using 13th and 14th thresholds as in step 2509. If the changing amount is smaller than the 13th threshold, the replacement strength Ce=0 is set. If the changing amount is larger than the 14th threshold, the replacement strength Ce=1 is set. If the changing amount falls within the range between the 13th and 14th thresholds (both inclusive), Ce can adaptively be set using:

$$Ce = (\text{changing amount} - 13\text{th threshold})/(14\text{th threshold} - 13\text{th threshold}) \quad (18)$$

Figure 27:
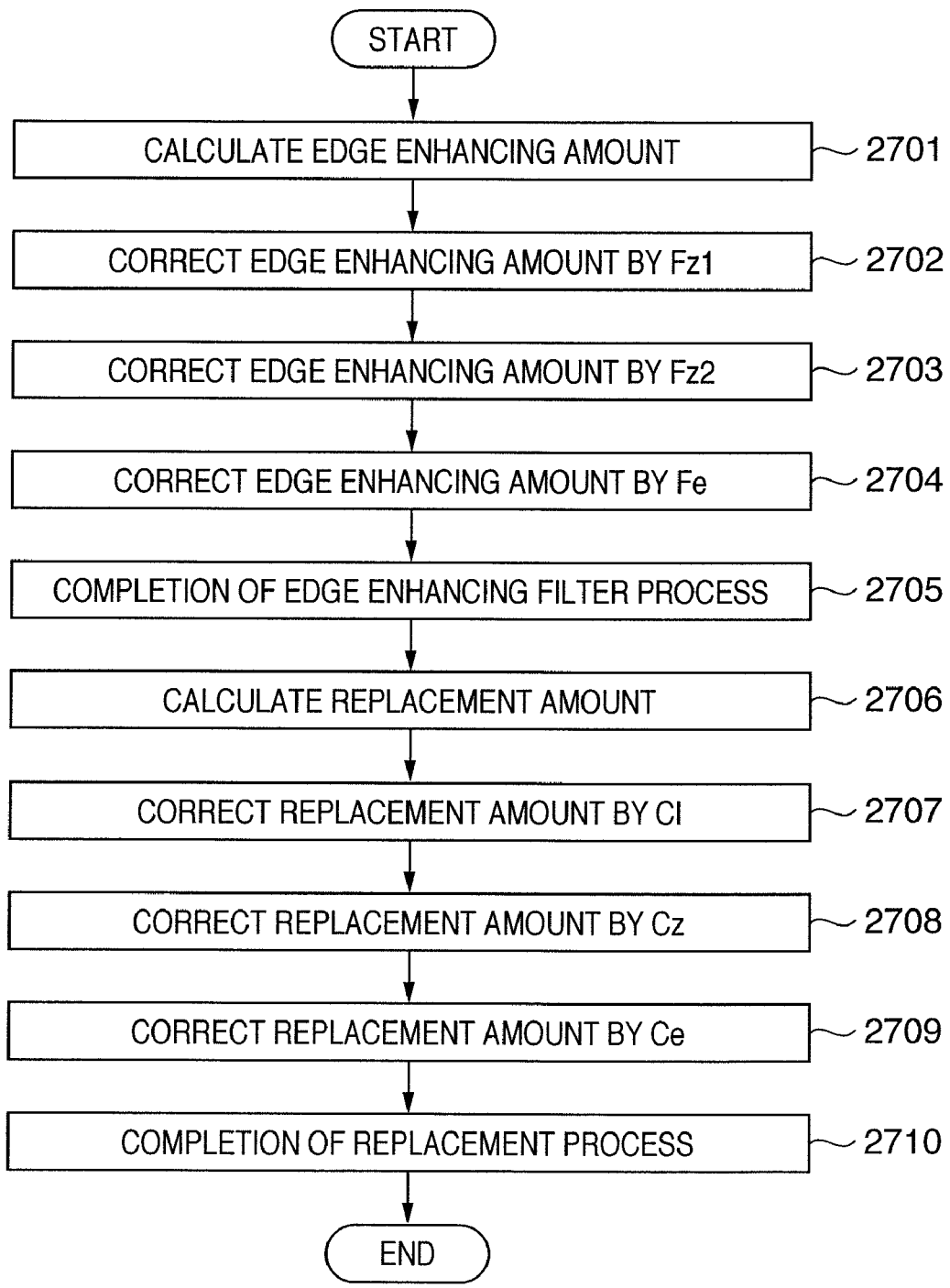
FIG. 27 is an operation flowchart of a correction process according to the third embodiment of the present invention.

FIG. 27 is a flowchart of the correction process according to the third embodiment. Since steps 2701 to 2705 in FIG. 27 are the same as steps 1401 to 1405 in FIG. 14 that have already been explained in the first embodiment, a repetitive description thereof will not be given. Therefore, only steps different from the first embodiment will be explained.

In step 2706, a replacement amount is calculated using the pixel value at the replacement pixel position determined in step 2512. RGB values are extracted at the replacement pixel position determined in step 2512 from the 7×7 RGB areas set in step 2501. Let N0 be the interest pixel value, C0 be the pixel value at the replacement pixel position, and ΔC be the replacement amount. Then, the replacement amount ΔC can be calculated using:

$$\Delta C = C0 - N0 \quad (19)$$

<Correction Process Step 2707: Correct Replacement Amount by Cl>

The replacement amount ΔC, which is calculated in step 2706, is corrected by the replacement strength Cl set in step 2513 shown in FIG. 25. A corrected replacement amount ΔCl is calculated using:

$$\Delta Cl = Cl \times \Delta C \quad (20)$$

By the process in step 2707, the replacement that suppresses generation of jaggy can be applied. The process advances to step 2708, and the replacement amount ΔCl, which is calculated in step 2707, is corrected by the replacement strength Cz set in step 2514 shown in FIG. 25. A corrected replacement amount ΔCz is calculated using:

$$\Delta Cz = Cz \times \Delta Cl \quad (21)$$

Therefore, by the process in step 2708, the replacement that can suppress generation of jaggy can be applied by strengthening the replacement strength for the bold line area, and by weakening that for the fine line area.

In step 2709, the replacement amount ΔCz, which is calculated in step 2708, is corrected by the replacement strength Ce set in step 2515 shown in FIG. 25. A corrected replacement amount ΔCe is calculated using:

$$\Delta Ce = Ce \times \Delta Cz \quad (22)$$

By the process in step 2709, an edge area of a character or the like is relatively strongly replaced to improve sharpness, and a flat area is relatively weakly replaced to prevent roughening.

The process then advances to step 2710, and an interest pixel value Nc is calculated that has undergone edge enhancement by means of filtering and replacement according to the third embodiment by adding the replacement amount ΔCe calculated in step 2709 to the edge enhancing filter value Ne of the interest pixel, as given by:

$$Nc = Ne + \Delta Ce \quad (23)$$

Then the process ends.

Note that a process for clipping the interest pixel value Nc to fall within a desired range may be inserted.

The effects of the aforementioned third embodiment will be described below. Since the edge enhancing process using the replacement process of the third embodiment is executed in addition to that by means of the edge enhancing filter of the first embodiment, an effect of emphasizing the sharpness more than the first embodiment can be obtained. When the bold line area is not to be bordered in the first embodiment, it is weakly edge-enhanced. However, the third embodiment can provide an effect of enhancing an edge more than the first embodiment while preventing bordering. Since a halftone dot area with the relatively large number of changes can be weakly replaced, moiré will not be enhanced. Furthermore, since a photograph area with the relatively small changing amount is weakly replaced, it can be prevented from being roughened.

The third embodiment has explained the example in which the edge enhancing process and replacement process are executed at adaptive strengths. However, the third embodiment is effective not only for combinations of the edge enhancing process and smoothing process, and the edge enhancing process and replacement process, but also for combinations with other embodiments.

<First Modification>

This modification will explain an effect of "adoptively applying the process strengths of a plurality of interacting correction processes although these processes have different purposes".

Figure 32:
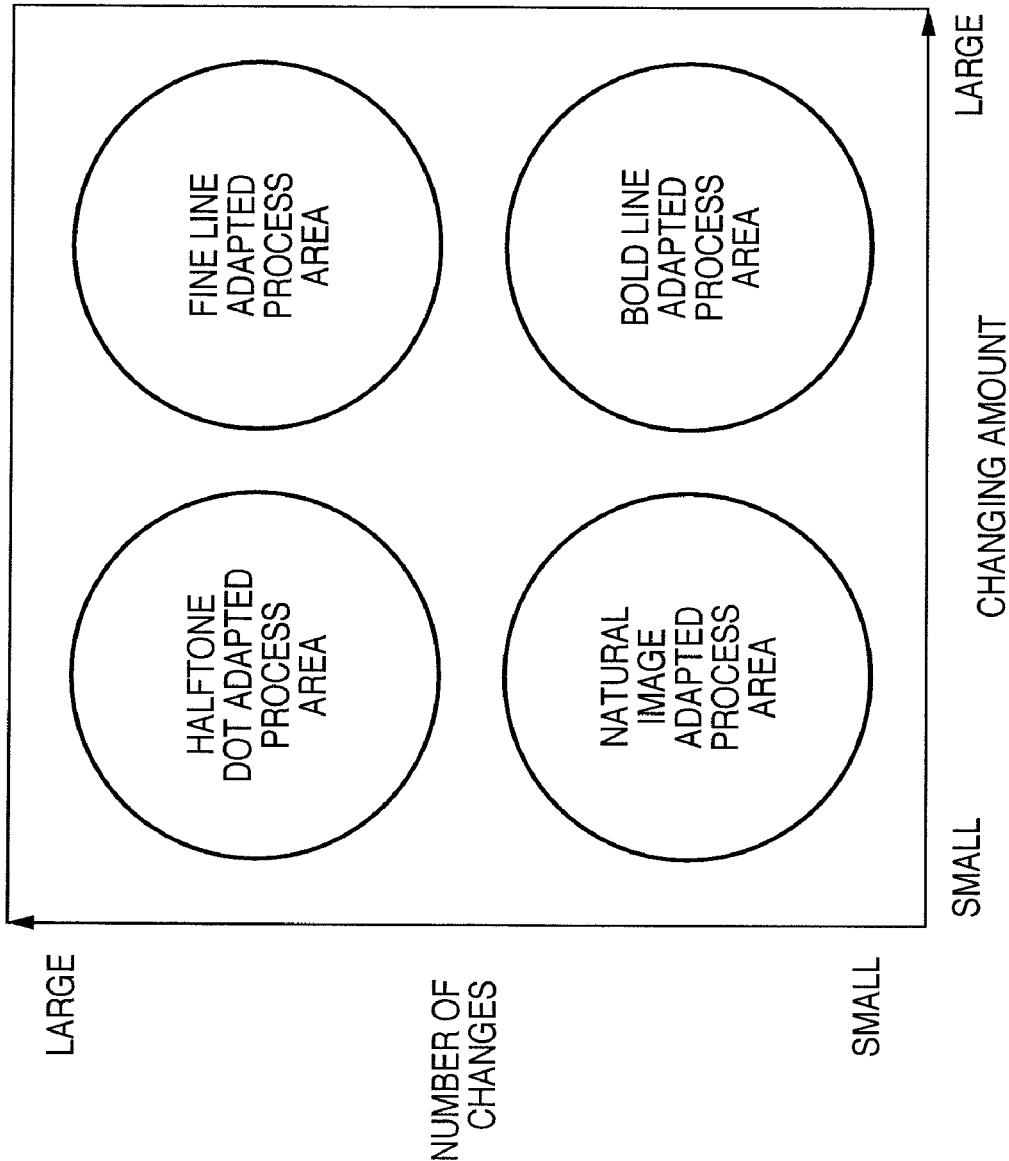
FIG. 32 is an explanatory view of the first modification in the third embodiment of the present invention.

The first modification will be described with reference to FIG. 32. FIG. 32 shows an example of the relationship of "preferred processes" for image areas corresponding to the "changing amount" and "the number of changes" as evaluation values. In FIG. 32, correction process areas are roughly classified into four areas, i.e., a halftone dot adapted process area, natural image adapted process area, fine line adapted process area, and bold line adapted process area. In practice, all areas are not clearly segmented into these four areas, and their adapted processes are not uniformly done. For example, a "halftone adapted process" and "fine line adapted process" are not immediately switched at a given position between the "halftone dot adapted process area" and the "fine line adapted process area". In practice, the "halftone adapted process" and "fine line adapted process" are switched while their degrees are gradually changed. The same applies to the relationship between other process areas.

Table 2 shows an example of "preferred process strengths of a plurality of interacting correction processes although these processes have different purposes" in the first modification. As "the plurality of interacting correction processes although these processes have different purposes", four processes, i.e., a replacement process, edge enhancing process, blacking process, and moiré reduction process will be exemplified.

TABLE 2

|  | Halftone adapted process area | Fine line adapted process area | Natural image adapted process area | Bold line adapted process area |
| --- | --- | --- | --- | --- |
| Replacement process | X | ◯ | X | ◎ |
| Edge enhancing process | X | ◎ | ◯ | ◯ |
| Blacking process | ◯ | ◎ | X | ◎ |
| Moiré reduction process | ◎ | ◯ | X | X |

In Table 2, "double circle" means relatively strong application of a process, "circle" means relatively moderate application of a process, and "cross" means relatively weak application of a process or non-application.

Therefore, as the adapted processes for the halftone dot area, the replacement process and edge enhancing process are relatively weakly applied to avoid enhancement of halftone dots, the blacking process is relatively intermediately applied to reduce color noise generated on black halftone dots, and the moiré reduction process is relatively strongly applied to reduce the bad effect of moiré.

Conversely, as the adapted processes for the natural image area, the processes such as the replacement process, blacking process, and moiré reduction process are relatively weakly applied to hold the resolution information and color information of an original image as much as possible, and only the edge enhancing process is relatively intermediately applied to slightly sharpen an image.

As the adapted processes for the bold line area, the replacement process and blacking process are relatively strongly applied to sharpen the line edge. The edge enhancing process is relatively intermediately applied to reduce occurrence of a "bordering" phenomenon in which the density of only a boundary of the bold line increases, and the moiré reduction process is weakly applied to reduce occurrence of an edge blurring phenomenon as much as possible.

Furthermore, as the adapted processes for the fine line area, the edge enhancing process and blacking process are relatively strongly applied to sharpen the fine line, the replacement process is relatively intermediately applied to reduce generation of jaggy, and the moiré reduction process is weakly applied to reduce occurrence of an edge blurring phenomenon as much as possible.

Figure 33:
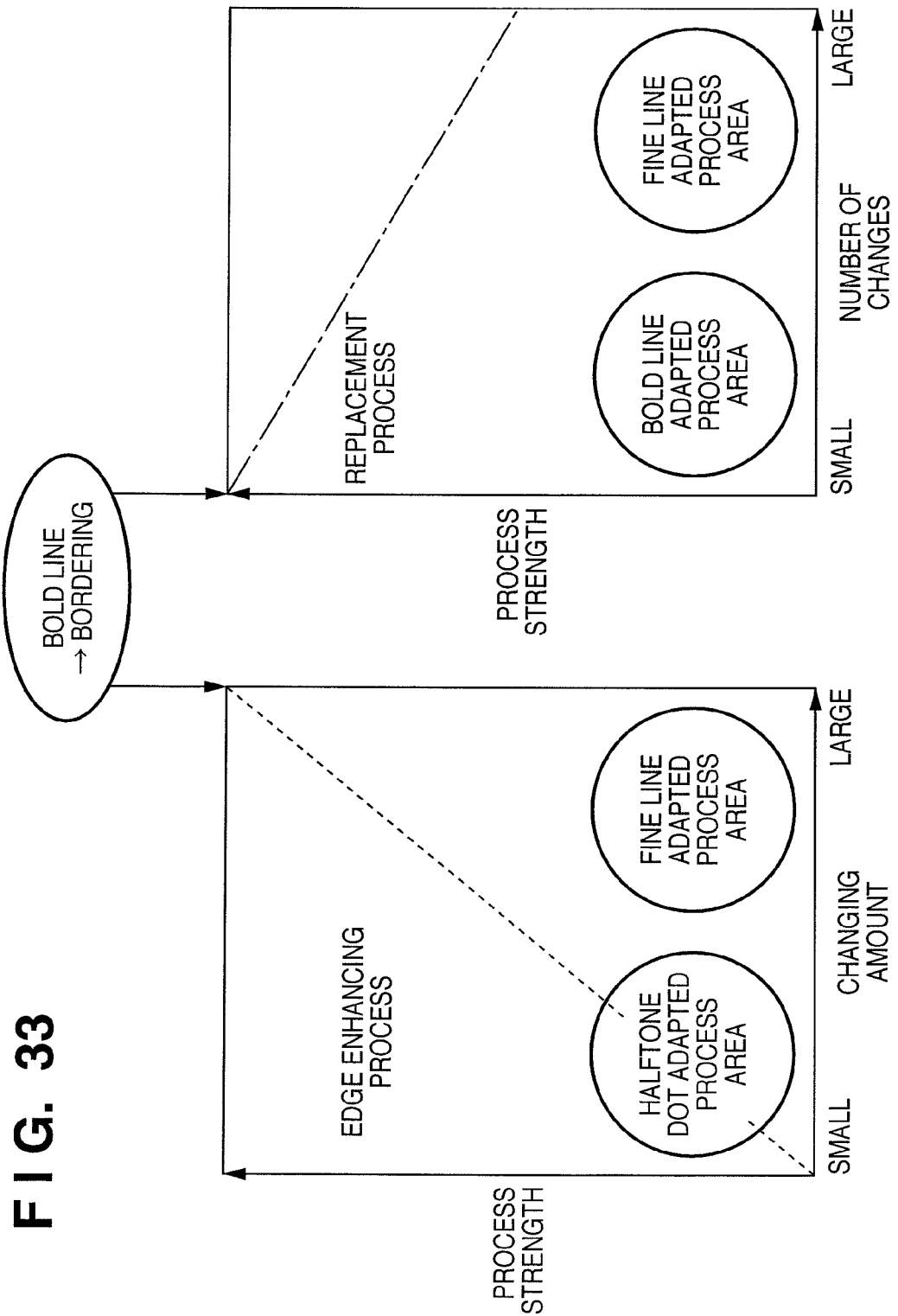
FIG. 33 is an explanatory view of image deterioration by conventional first and second methods used in the explanation of the first modification in the third embodiment of the present invention.

FIG. 33 is a view for explaining "image deterioration" that occurs when the techniques described in Japanese Patent No. 03099354 and Japanese Patent Laid-Open No. 2002-077623 of "Background" section are applied to the above "replacement process" and "edge enhancement".

In FIG. 33, the edge enhancing process is executed based on the changing amount, and the replacement process is executed based on the number of changes. This is because the two different types of correction processes are independently controlled as non-interacting processes.

Then, the edge enhancing process sets a edge enhancing strength suited between the "halftone dot area" and "fine line area" since it is based on the changing amount, and the replacement process sets a replacement process strength suited between the "bold line area" and "fine line area" since it is based on the number of changes. With these settings, the replacement process is intermediately applied and the edge enhancing process is strongly applied to the "fine line area", thus obtaining a good result. However, since the "fine line area" and "bold line area" often have similar changing amounts, both the replacement process and edge enhancing process are consequently strongly applied to the "bold line area", thus causing "image deterioration" due to generation of jaggy.

In this manner, when the process strengths of "the plurality of interacting correction processes although these processes have different purposes" like the "edge enhancing process" and "replacement process" are independently determined, image deterioration occurs in a specific combination. Hence, it is preferable to "adaptively" control "the process strengths of the plurality of interacting correction processes although these processes have different purposes" "based on a common evaluation value in conjunction with each other", as shown in FIG. 34.

Figure 34:
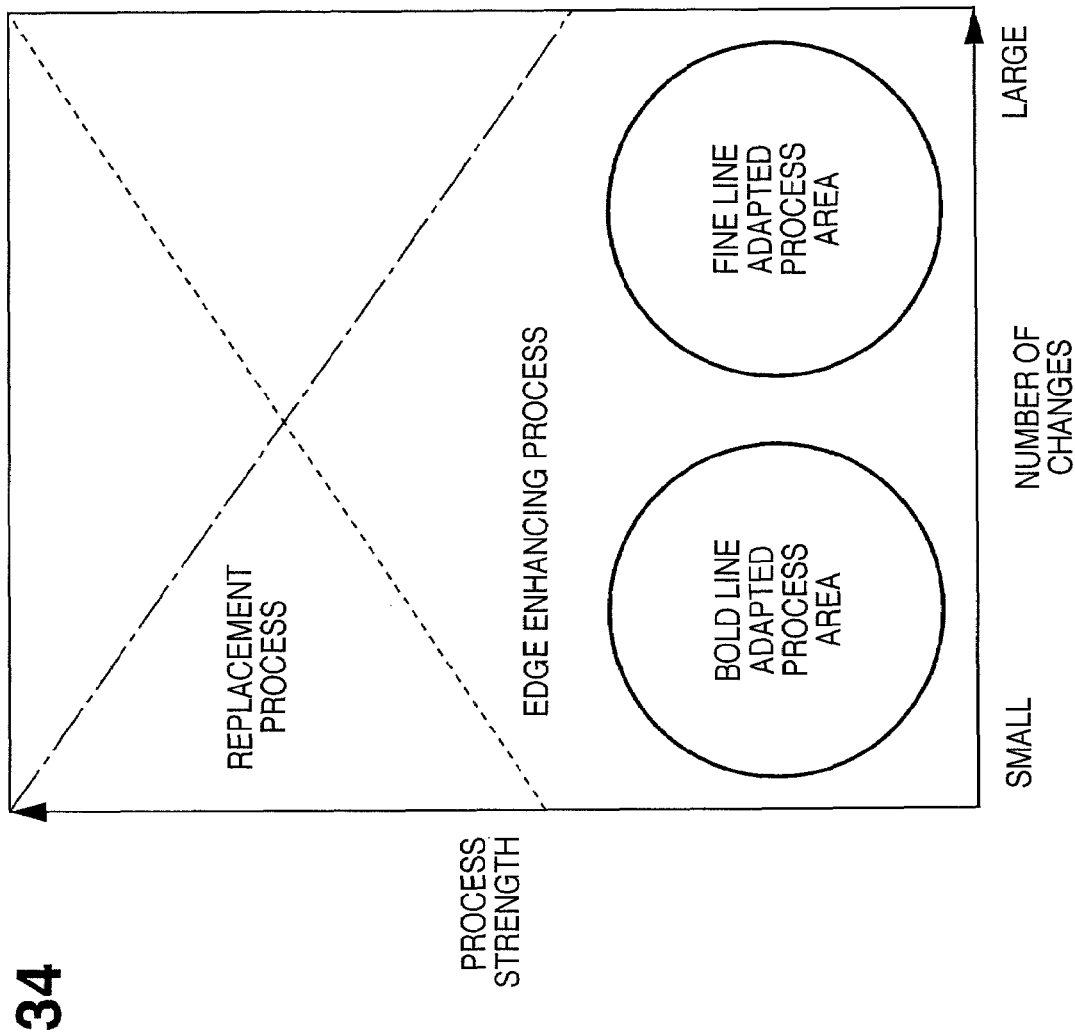
FIG. 34 is an explanatory view of the processing contents of the first modification in the third embodiment of the present invention.

FIG. 34 is a view for explaining the process contents of the first modification. In this modification, "the number of changes" is used as a common evaluation value, and the edge enhancing process and replacement process are executed based on "the number of changes". These two different types of correction processes are controlled as interacting correction processes in conjunction with each other.

The edge enhancing process sets a edge enhancing strength suited between the "bold line area" and "fine line area" based on the number of changes, and the replacement process also sets a replacement process strength suited between the "bold line area" and "fine line area" also based on the number of changes. In this way, the suited process strengths can be realized in such a manner that the strong replacement process and middle edge enhancing process are applied to the "bold line area", and the middle replacement process and strong edge enhancing process are applied to the "fine line area". Furthermore, to an area between the "bold line area" and "fine line area", both the replacement process and edge enhancing process are adaptively applied "between strong to middle strengths", thus obtaining a preferred process result with inconspicuous switching points.

Figure 35:
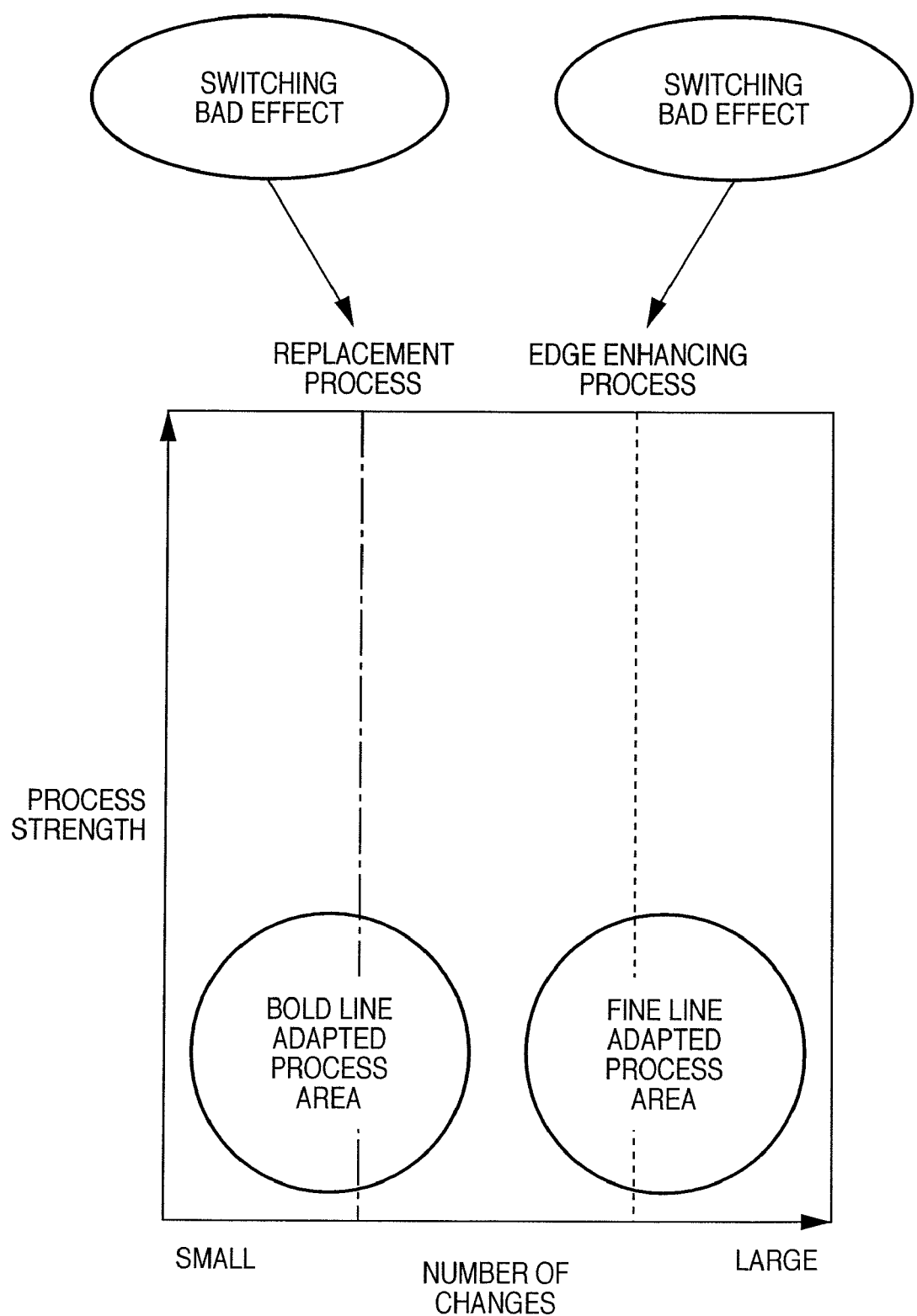
FIG. 35 is an explanatory view of negative effects by a conventional third method used in the explanation of the first modification in the third embodiment of the present invention.

FIG. 35 is a view for explaining image deterioration that occurs when the technique described in patent Japanese Patent No. 03472094 of "Background" section is applied.

FIG. 35 shows an example in which the replacement process and edge enhancing process are switched based on the number of changes like in this first modification. In this case, switching of the processes occurs at switching points (two points in this example; the number of switching points may increase depending on an execution condition), and process switching nonuniformity areas are generated as image bad effects near these switching points.

In the first modification, since both the replacement process and edge enhancing process are adaptively set between "strong to middle strengths" for an area between the "bold line area" and "fine line area", a preferred process result with inconspicuous switching points can be obtained.

<Second Modification>

The second modification will explain an effect of "adoptively applying the process strengths of a plurality of interacting correction processes although these processes have different purposes based on a plurality of common evaluation values".

Figure 36:
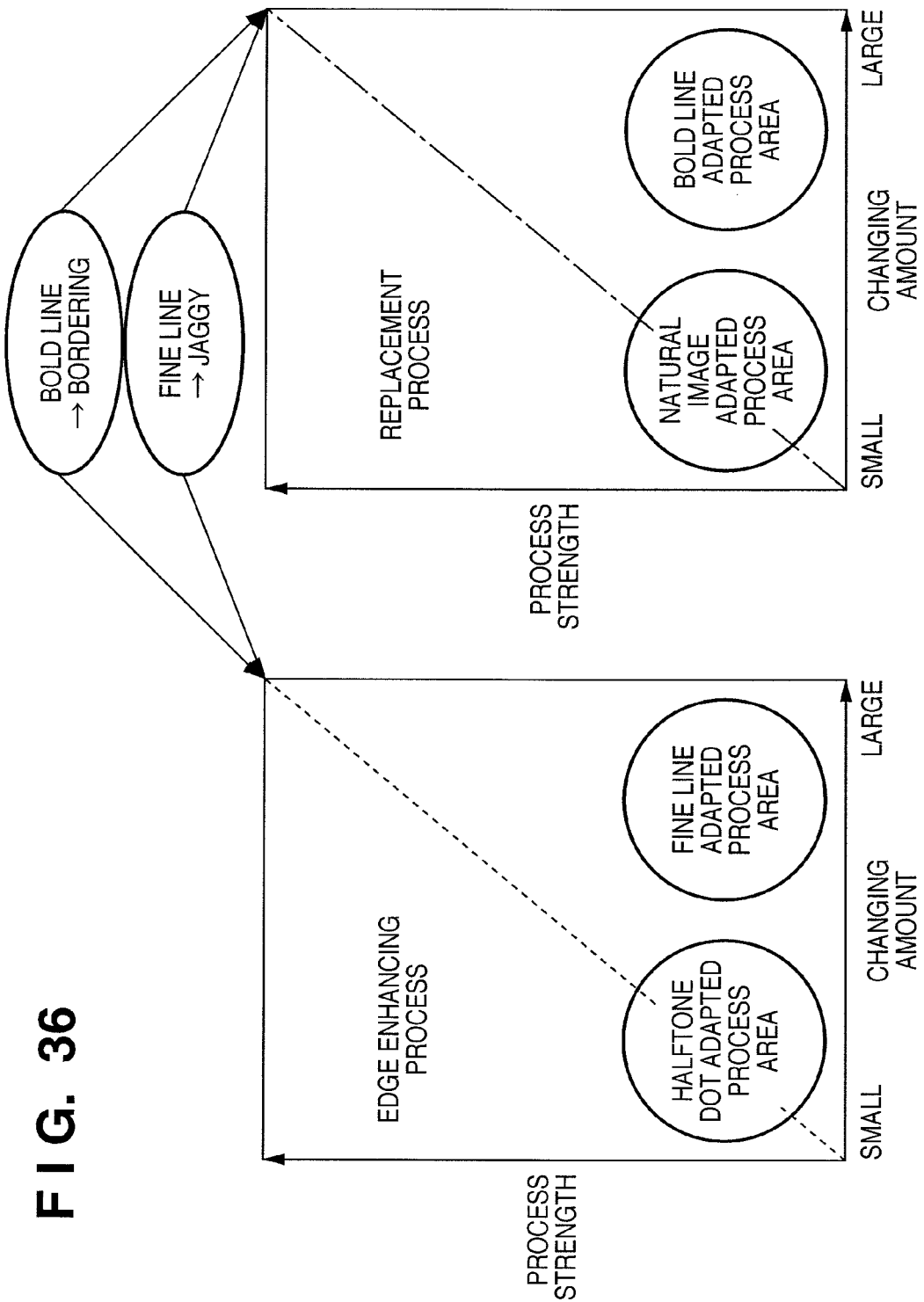
FIG. 36 is an explanatory view of conventional image deterioration used in the explanation of the second modification in the third embodiment of the present invention.

FIG. 36 is an explanatory view of image deterioration in the conventional method. In FIG. 36, the edge enhancing process and replacement process are executed based on a common changing amount, but these two different types of correction processes are independently controlled as non-interacting processes.

The edge enhancing process sets a edge enhancing strength suited between the "halftone dot area" and "fine line area" based on the changing amount, and the replacement process sets a replacement process strength suited between the "natural image area" and "bold line area" based on the changing amount.

In this way, the replacement process and edge enhancing process are strongly applied to the "fine line area" and "bold line area" with the large changing amount to excessively enhance an edge part, thus causing image deterioration due to generation of "bordering" on the bold line area, and that due to generation of "jaggy" on the fine line area.

Figure 37:
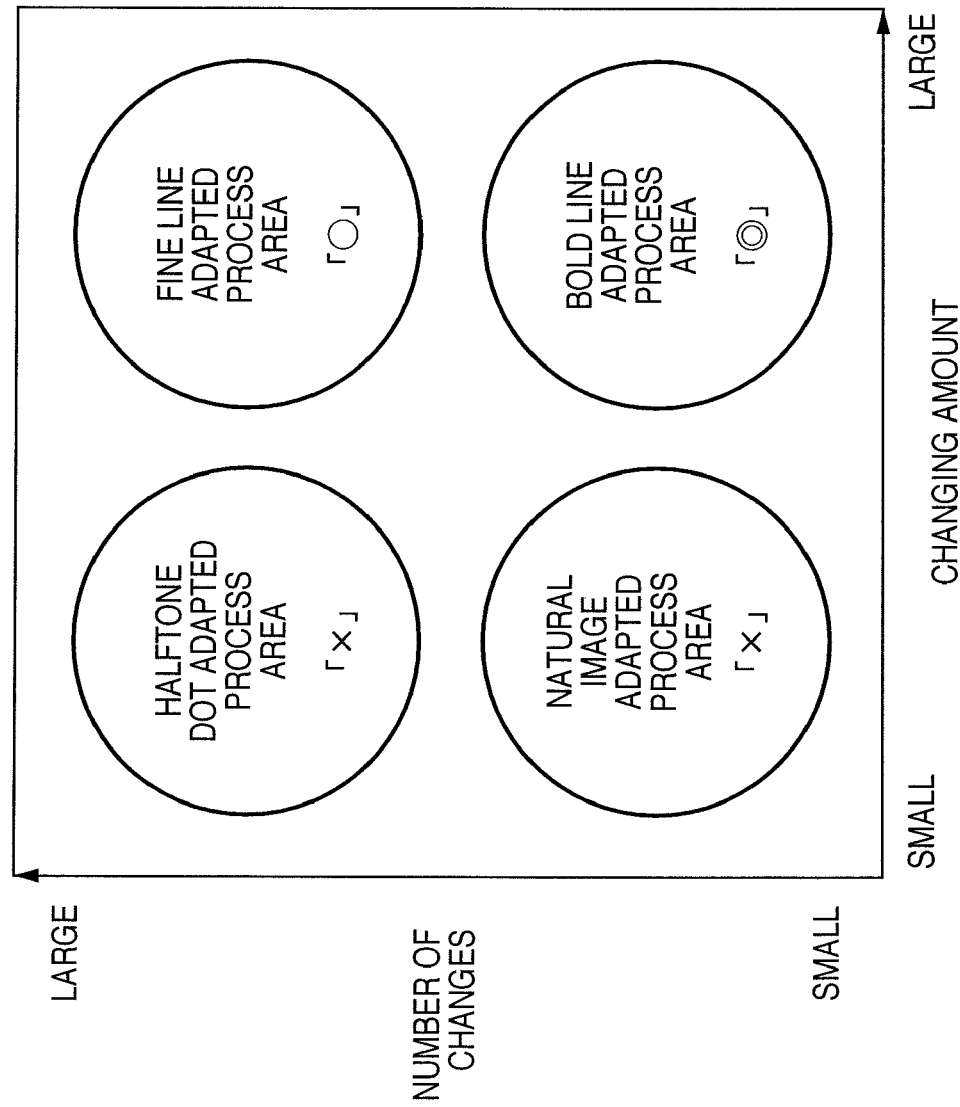
FIG. 37 is a suited replacement process strength chart with respect to the changing amount and the number of changes used in the second modification in the third embodiment of the present invention.

FIGS. 37 to 40 are views for explaining the modification of the present invention that can solve the aforementioned problems. FIG. 37 shows suited replacement process strengths for the changing amount and the number of changes. As has been described previously using FIG. 32, ⊚, ○, and x marks in FIG. 37 respectively indicate relatively strong, middle, and weak or no strengths. The process strengths are not always uniform inside and outside the process areas. For example, the strength adaptively and slowly changes from a x strength to a ○ strength from the "halftone dot area" to the "fine line area".

Figure 38:
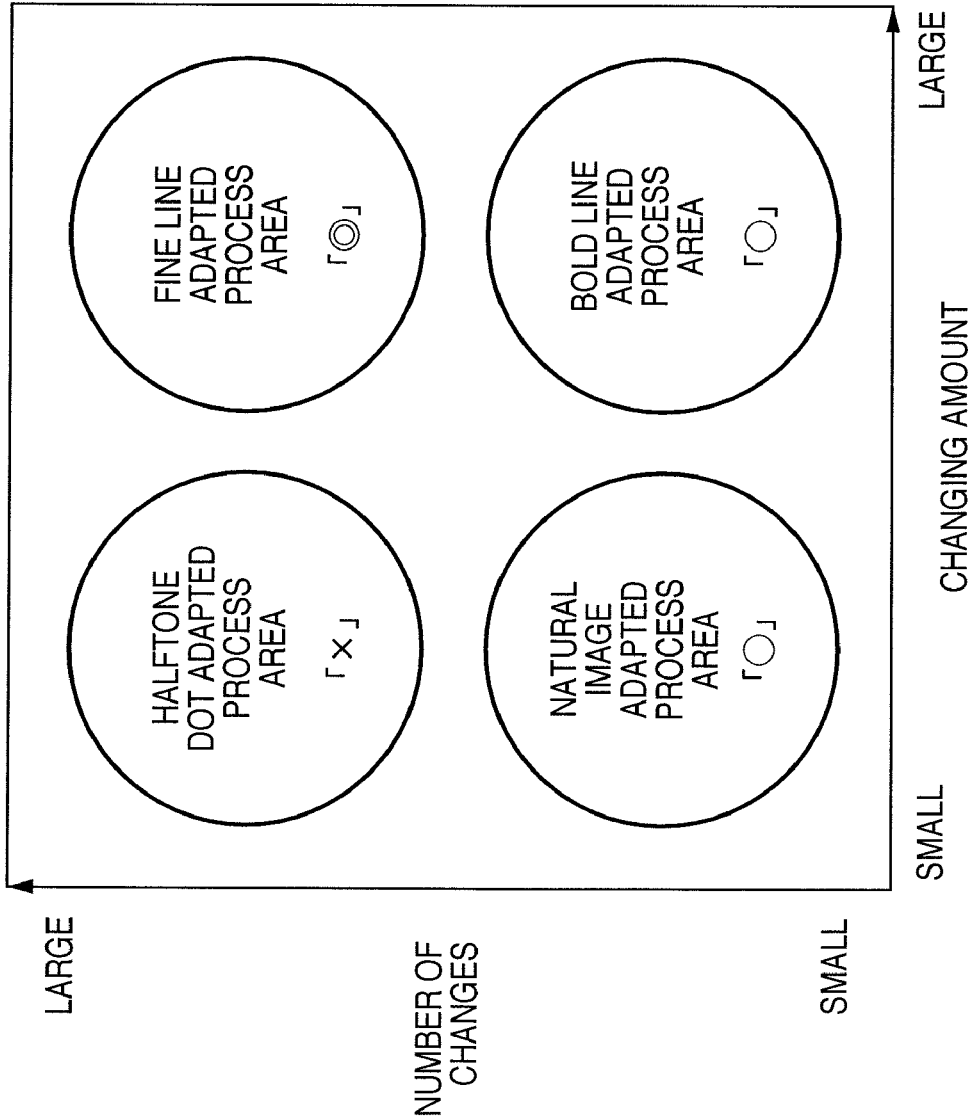
FIG. 38 is a suited edge enhancing process strength chart with respect to the changing amount and the number of changes used in the second modification in the third embodiment of the present invention.
Figure 39:
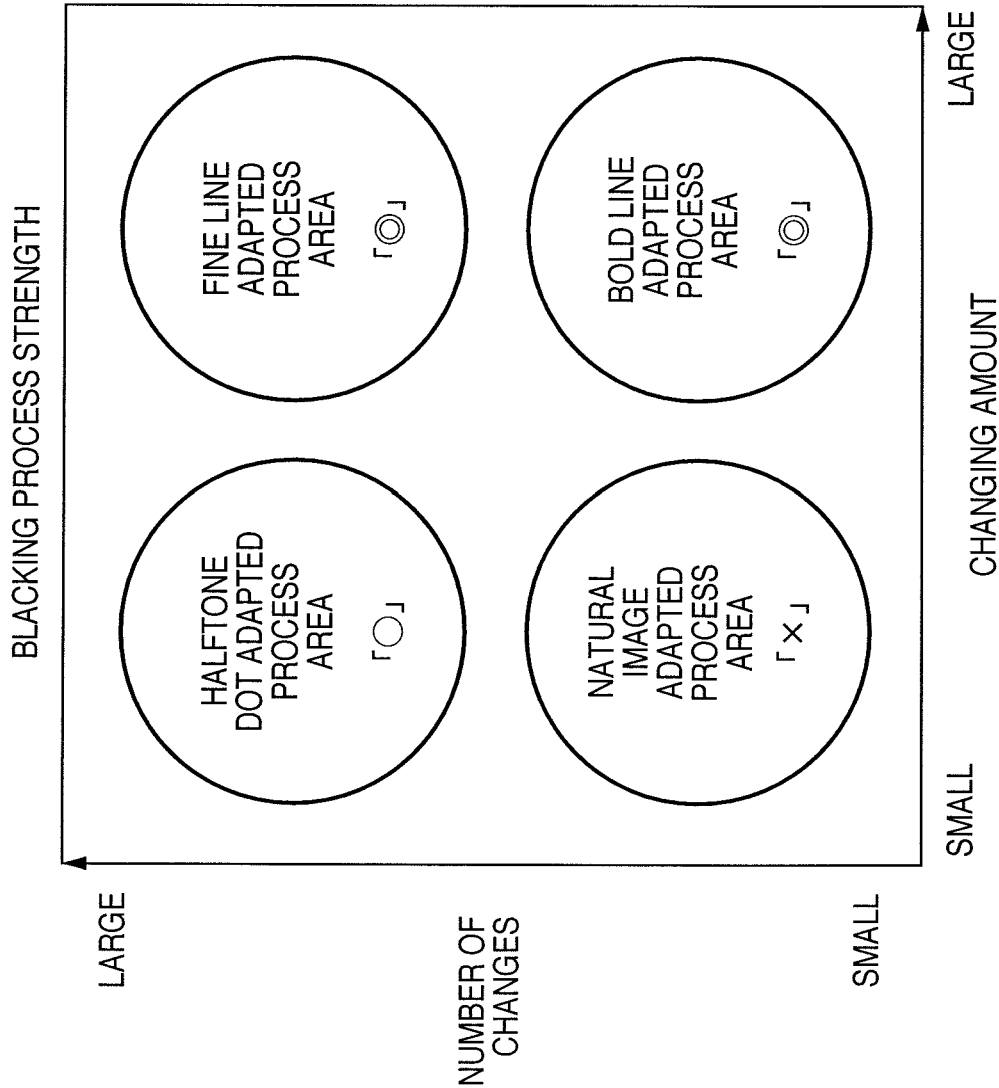
FIG. 39 is a suited blacking process strength chart with respect to the changing amount and the number of changes used in the second modification in the third embodiment of the present invention.

FIG. 38 shows suited edge enhancing process strengths based on the changing amount and the number of changes, FIG. 39 shows suited blacking process strengths based on the changing amount and the number of changes, and FIG. 40 shows moiré reduction process strengths based on the changing amount and the number of changes.

In this way, the following case can be prevented: the suited process strengths can be set for the relationships between the "halftone dot area" and "fine line area" and between the "natural image area" and "bold line area", but the "fine line area" and "bold line area" consequently suffer bad effects. Therefore, the suited process strengths can be set for all of the "halftone dot area", "natural image area", "fine line area", and "bold line area", and their intermediate areas.

As described above, by "adaptively applying the process strengths of a plurality of interacting correction processes although these processes have different purposes based on a plurality of common evaluation values", the image processes that can reduce image bad effects can be executed.

The first and second modifications use two evaluation values, i.e., "the changing amount" and "the number of changes". However, the present invention is not limited to such specific evaluation values and the number of values. Other evaluation values, e.g., an "accumulated value of the changing amount", "changing acceleration", and the like may be used instead, and may be used in combination as the third and fourth evaluation values.

Also, these two modifications use the four adapted areas, i.e., "halftone dot area", "fine line area", "natural image area", and "bold line area". However, these areas are used for descriptive purposes to help understanding. Therefore, the settings of adapted areas are not particularly limited, or the settings of adapted areas are not enforced. The number of adapted areas is not limited to four, and different numbers of areas may be adopted. For example, as for the "halftone dot area", a "high-frequency halftone dot area" and "low-frequency halftone dot area" have different characteristics and different suited correction strengths, and they may be preferably handled as different areas in some cases. Also, as for the "natural image area", the same applies to a "boundary part in a natural image" and "flat part in a natural image". In this way, even when different areas are set, the present invention can be applied, as can be seen from the above description. In fact, how to determine the correction amounts of respective interacting correction processes for combinations of evaluation values is important.

Fourth Embodiment

The first to third embodiments described so far have explained the edge enhancing process that enhances sharpness and the smoothing process that reduces moiré so as to reduce blurring and moiré generated upon scanning a document. However, there is another issue upon scanning a document. Upon scanning a black character, R, G, and B do not always assume the same values. As a result, a black density drop and an increase in saturation occur. Such drawbacks deteriorate the quality of the black character.

The fourth embodiment will explain a process that sets R, G, and B values, which are obtained by scanning black, to be closer to each other. The process that sets R, G, and B values to be closer to each other will be referred to as an achromatic process, and the strength of the achromatic process will be referred to as an achromatic strength hereinafter. In the following description, the achromatic strength is adaptively set as in the first to third embodiments.

Figure 28A:
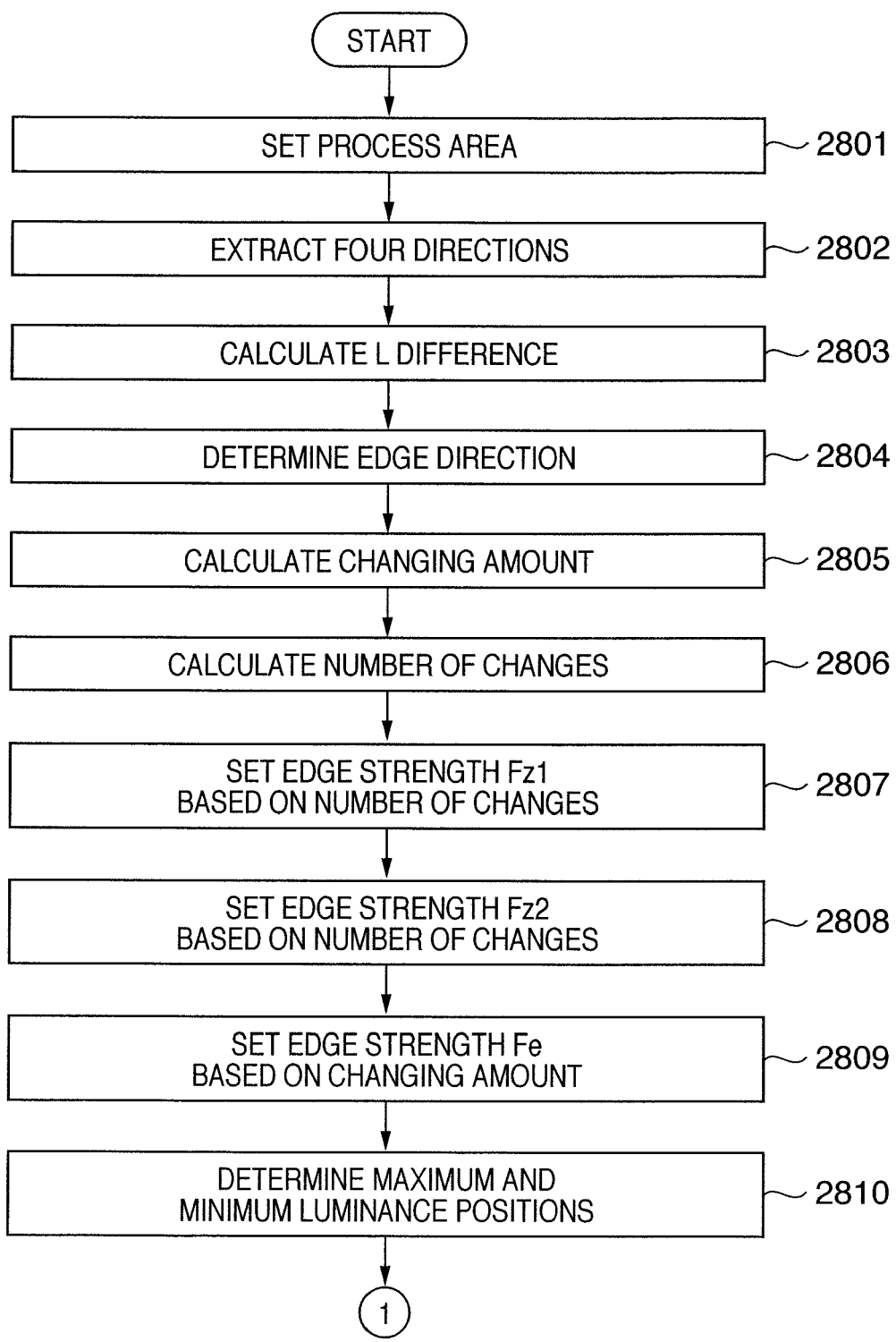
FIGS. 28A and 28B are operation flowcharts of a correction strength setting according to the fourth embodiment of the present invention.
Figure 28B:
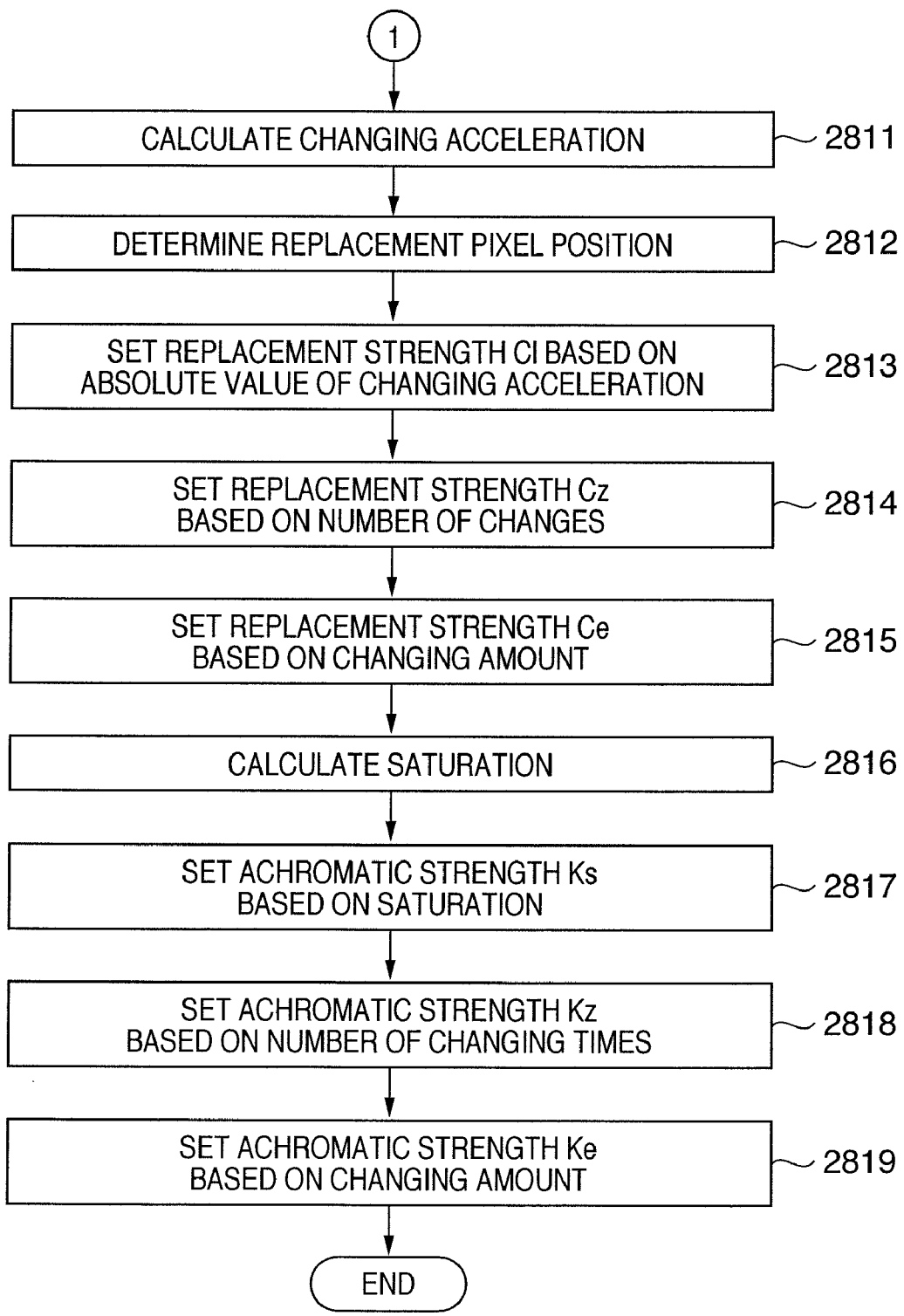

FIGS. 28A and 28B show a flowchart of the correction strength setting process according to the fourth embodiment. Since steps 2801 to 2815 in the flowchart of FIGS. 28A and 28B are the same as steps 2501 to 2515 in the flowchart of FIG. 25 that has already been described in the third embodiment, a repetitive description thereof will be avoided. FIGS. 28A and 28B show the flowchart configured by adding the fourth embodiment to the third embodiment. Alternatively, the flowchart may be configured by adding the fourth embodiment to the first or second embodiment. Therefore, only steps different from the third embodiment will be explained below.

In step 2816, a saturation is calculated for the interest pixel of the 7×7 RGB areas set in step 2801. Color average values of 3×3 areas having the interest pixel as the center are calculated. Let AR, AG, and AB be the average values of R, G, and B. Then, as a saturation, a maximum value of |AR−AG|, |AG−AB|, and |AB−AR| is calculated. Note that the present invention is not limited to such specific saturation calculation method. In this case, the saturation is calculated from the averages of the 3×3 areas, but it may be calculated from areas within the process area size set in step 2801. This embodiment calculates the color space based on RGB. Alternatively, a block may be converted into a luminance color difference space, and the saturation may be calculated as a distance from the luminance axis using color difference components. Furthermore, the saturation may be calculated based on a value obtained after the edge enhancing and smoothing processes using the interest pixel value Nc calculated in the third embodiment.

The process then advances to step 2817, and an achromatic strength Ks is adaptively set in accordance with the saturation calculated in step 2816. FIG. 29A is a graph for explaining the achromatic strength Ks setting process in step 2817: the abscissa plots the saturation, and the ordinate plots the achromatic strength Ks. In case of the saturation which is near the luminance axis and is smaller than a 15th threshold, the achromatic strength Ks is set to be 1 to achromatize the interest pixel. The reason why the pixel near the luminance axis is achromatized is that a document is more likely to be achromatic since that pixel value is close to the luminance axis. In case of the saturation which is separated away from the luminance axis and is larger than a 16th threshold, the achromatic strength Ks is set to be zero so as not to achromatize the pixel. This is because that pixel is more likely to be a color pixel. In case of the saturation falling within the range between the 15th and 16th thresholds (both inclusive), a different achromatic strength Ks is adaptively set for each saturation to obscure switching of the processes, so that the achromatic strength Ks=1 when the saturation=the 15th threshold and the achromatic strength Ks=0 when the saturation=the 16th threshold. More specifically, Ks can adaptively be set with reference to FIG. 29A or using:

$$Ks=(16\text{th threshold}-\text{saturation})/(16\text{th threshold}-15\text{th threshold}) \quad (24)$$

The process advances to step 2818, and an achromatic strength Kz is adaptively set in accordance with the number of changes calculated in step 2806. The achromatic strength Kz is adaptively set based on characteristics shown in FIG. 29B using 17th and 18th thresholds as in step 2507. If the number of changes is smaller than the 17th threshold, the achromatic strength Kz=1 is set. If the number of changes is larger than the 18th threshold, the achromatic strength Kz=0 is set. If the number of changes falls within the range between the 17th and 18th thresholds (both inclusive), Kz can adaptively be set using:

$$Kz=(18\text{th threshold}-\text{the number of changes})/(18\text{th threshold}-17\text{th threshold}) \quad (25)$$

In step 2819, an achromatic strength Ke is adaptively set in accordance with the changing amount calculated in step 2805. The achromatic strength Xe is adaptively set based on characteristics shown in FIG. 29C using 19th and 20th thresholds as in step 2509. If the changing amount is smaller than the 19th threshold, the achromatic strength Ke=0 is set. If the changing amount is larger than the 20th threshold, the achromatic strength Ke=1 is set. If the changing amount falls within the range between the 19th and 20th thresholds (both inclusive), Ke can adaptively be set using:

$$Ke=(\text{changing amounte}-19\text{th threshold})/(20\text{th threshold}-19\text{th threshold}) \quad (26)$$

Figure 30:
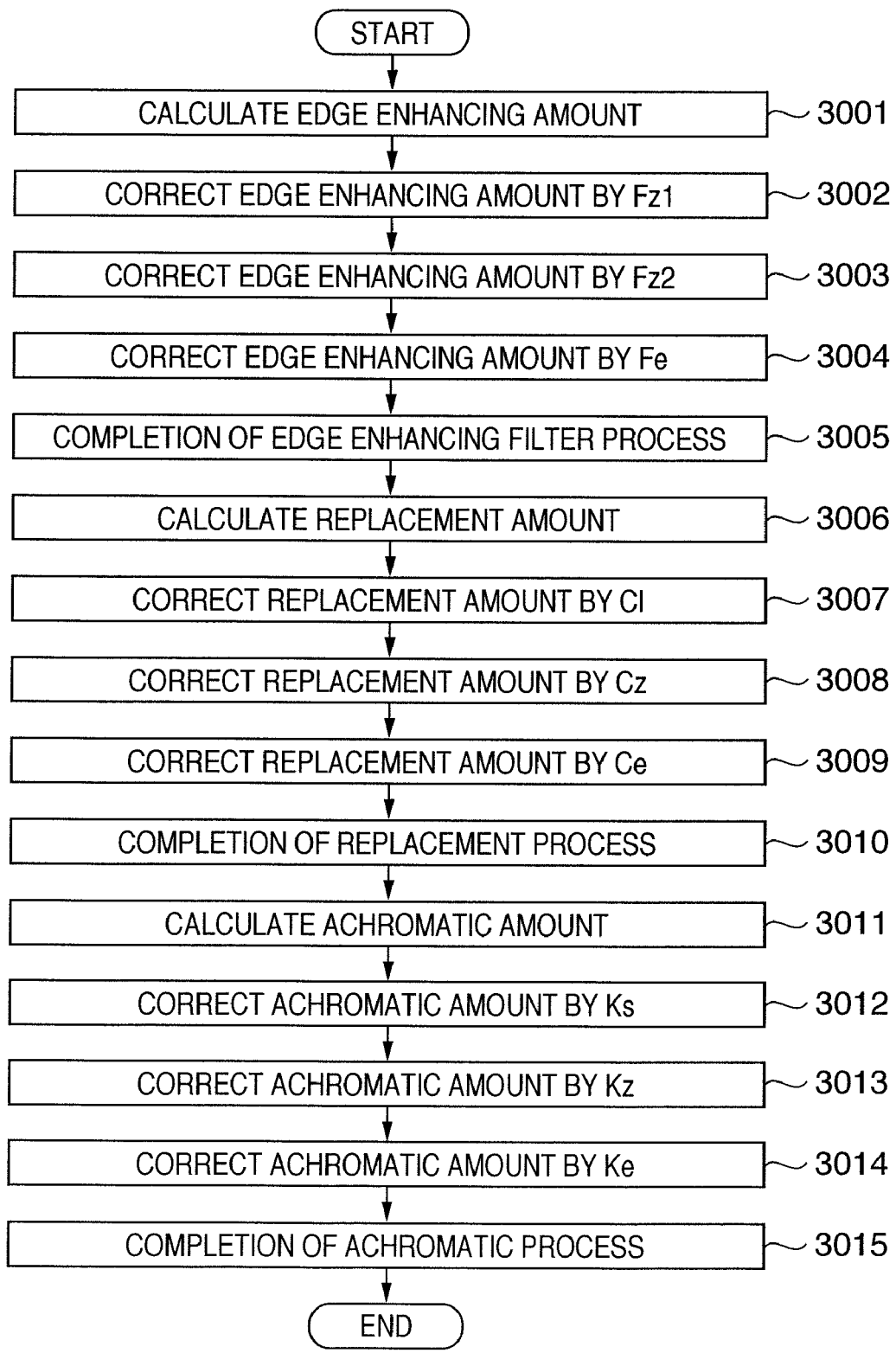
FIG. 30 is an operation flowchart of a correction process according to the fourth embodiment of the present invention.

FIG. 30 is a flowchart of the correction process according to the fourth embodiment. Since steps 3001 to 3010 in the flowchart of FIG. 30 are the same as steps 2701 to 2710 in the flowchart of FIG. 27 that has already been explained in the third embodiment, a repetitive description thereof will be avoided. Hence, only steps different from the third embodiment will be explained.

In step 3011, an achromatic amount ΔK is calculated using the interest pixel value Nc calculated in step 3010 by:

$$\Delta K=NcG-NcP \quad (27)$$

where NcG is an interest pixel value Nc of a G component, and NcP is an interest pixel value Nc of an R or B component.

In step 3012, the achromatic amount ΔK, which is calculated in step 3011, is corrected by the achromatic strength Ks set in step 2817. A corrected achromatic amount ΔKs is calculated using:

$$\Delta Ks=Ks \times \Delta K \quad (28)$$

By the process in step 3012, an image signal near the luminance axis can be closer to the luminance axis.

In step 3013, the achromatic amount ΔKs, which is calculated in step 3012, is corrected by the achromatic strength Kz set in step 2818. A corrected achromatic amount ΔKz is calculated using:

$$\Delta Kz=Kz \times \Delta Ks \quad (29)$$

By the process in step 3013, a relatively strong achromatic process is applied to a text area with the smaller number of changes to blacken a character, and a relatively weak achromatic process is applied to a halftone dot area and photographic areas with the larger number of changes to suppress a change in tint.

In step 3014, the achromatic amount ΔKz, which is calculated in step 3013, is corrected by the achromatic strength Ke set in step 2819. A corrected achromatic strength ΔKe is calculated using:

$$\Delta Ke=Ke \times \Delta Kz \quad (30)$$

By the process in step 3014, a strong achromatic process is applied to an edge area of a character to blacken the character, and a weak achromatic process is applied to an image with a relatively weak edge like a photograph to suppress a change in tint.

Furthermore, the process advances to step 3015, and the achromatic amount ΔKe, which is calculated in step 3014, is added to the interest pixel value Nc edge-enhanced by means of filtering and substation:

$$Nk=Nc+\Delta Ke \quad (31)$$

In this way, an interest pixel value Nk is calculated that has undergone the filter process, replacement process, and achromatic process, thus ending the processing.

Note that a process for clipping the interest pixel value Nk to fall within a desired range may be inserted.

Effects of the fourth embodiment will be described below. The first to third embodiments can provide an effect of enhancing the sharpness. However, these embodiments cannot make the values of image signals of respective colors be close to the same value, and a black character cannot appear to gleam black. Since the fourth embodiment can adaptively achromatize the interest pixel according to the saturation, it can provide an effect with which a black character with a pixel value near the luminance axis has quality to gleam black. Since the achromatic strength can be changed according to the number of changes and changing amount, only a text area may be achromatized, so that tints of the halftone dot and photograph areas are left unchanged.

Other Embodiments

Figure 31:
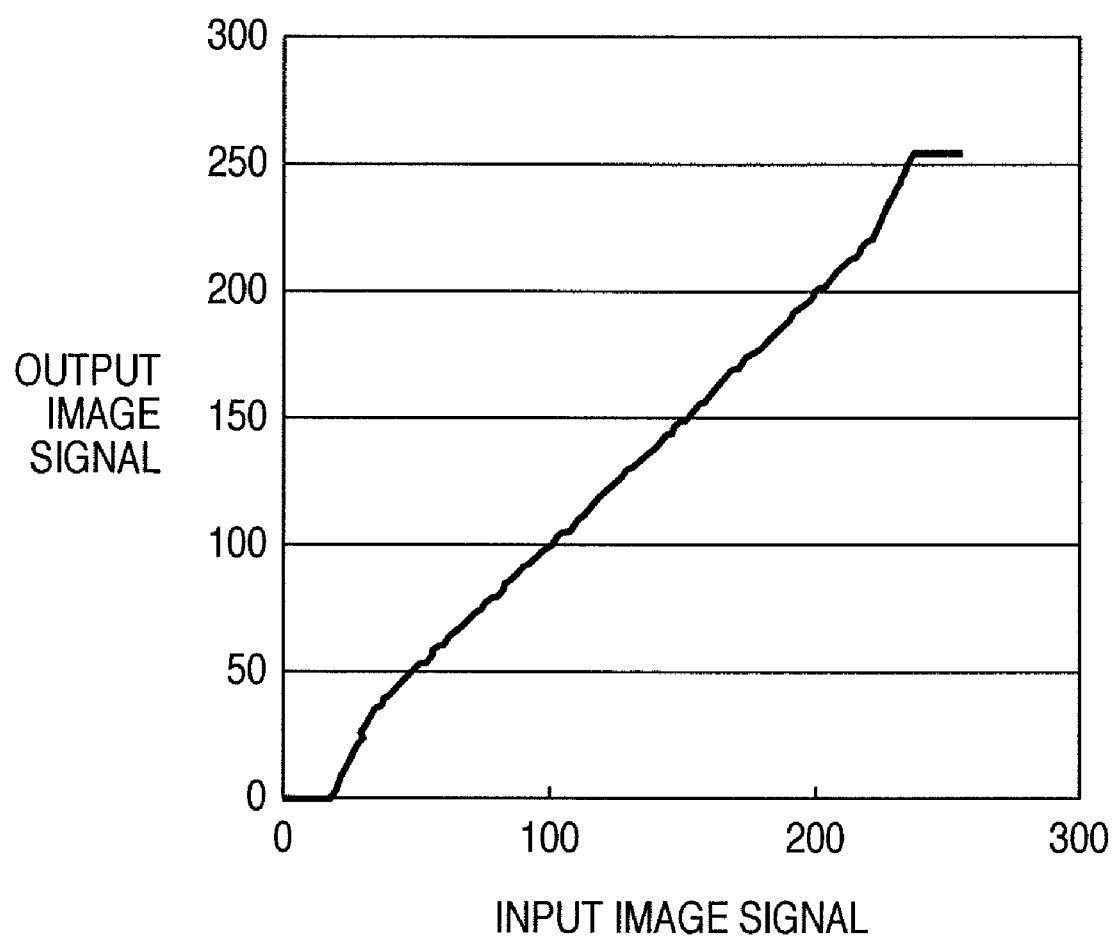
FIG. 31 is a graph for explaining crush in shadow and highlight saturation used in the fourth embodiment of the present invention.

In the description of the first to fourth embodiments, the correction processes such as the edge enhancing process, smoothing process, and achromatic process, and the like are adaptively executed. A case will be exemplified below wherein FIG. 31 is applied to an image signal that has undergone the processes in the first to fourth embodiments. In FIG. 31, the abscissa plots an input image signal value, and the ordinate plots an output image signal value. By calculating an output image signal to have the image signal that has undergone the processes in the first to fourth embodiment as an input image signal, FIG. 31 can be applied. If FIG. 31 expresses that an image signal is darker with decreasing signal value, and is brighter with increasing signal value, an image signal of a black character part can be blackened more, and an image signal of a white background part can be whitened more. With this process, since the contrast between the character part and background part can be increased, the sharpness of the character can be further enhanced. The image signal in FIG. 31 may be defined by RGB image signal components, and FIG. 31 may be applied to respective RGB colors. Or the image signal in FIG. 31 may be a luminance value L, and FIG. 31 may be applied to the luminance value L. When the image signal in FIG. 31 is defined by RGB image signal components, a change in input/output curve may be changed for each color. The present invention is not limited to the input/output curve shown in FIG. 31, and an input/output curve can be set as needed.

The aforementioned first to fourth embodiments adaptively determine the correction strength using the number of changes and changing amount, and also the changing acceleration and saturation. When the correction strength is replaced by an image area, each of the above embodiments can adaptively segment image areas in accordance with the number of changes and changing amount. For example, as the product of Fz and Fe is larger, a pixel which is more likely to belong to a text area can be determined. As the product is smaller, a pixel which is more likely to belong to a halftone dot area or photograph area can be determined. In addition, using the changing acceleration and saturation as well, the proximity to the edge center and that to the luminance axis can also be determined, and image areas can be segmented more finely.

The objects of the present invention are also achieved by supplying a storage medium, which records a program code of a software program that can implement the functions of the aforementioned embodiments to a system or apparatus. That is, the present invention is also implemented when a computer (or a CPU or MPU) of the system or apparatus reads out and executes the program code stored in the storage medium. In this case, the program code read out from the storage medium implements the functions of the aforementioned embodiments, and the storage medium which stores the program code constitutes the present invention.

As the storage medium for supplying the program code, for example, a flexible disk, hard disk, optical disk, magneto-optical disk, CD-ROM, CD-R, magnetic tape, nonvolatile semiconductor memory card, ROM, and the like may be used. When the computer executes the readout program code, the functions of the aforementioned embodiments can be implemented in some cases.

However, the present invention also includes a case wherein the functions of the aforementioned embodiments are implemented by some or all of actual processes executed by an OS (operating system) running on the computer based on an instruction of the program code.

Furthermore, the present invention also includes a case wherein the program code read out from the storage medium is written in a memory of a function expansion board or a function expansion unit, which is inserted in or connected to the computer. After that, the functions of the aforementioned embodiments are implemented by some or all of actual processes executed by a CPU or the like of the function expansion board or function expansion unit based on an instruction of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-188691, filed Jul. 7, 2006, which is hereby incorporated by reference herein in its entirety.

What is claimed is:

1. An image correction processing apparatus comprising:
a computer including a central processing unit having connected thereto:
an area setting unit adapted to set on a target image to be processed an area comprising a plurality of pixels including an interest pixel;
a changing times calculating unit adapted to calculate a number of changes value that expresses a frequency of occurrence of changes in luminance values of pixels in said area;
a changing amount calculating unit adapted to detect, from the pixels in said area, an edge direction of the interest pixel, and to calculate a changing amount value that expresses a magnitude of changes in luminance values of the pixels in said area in the edge direction;
a changing acceleration calculating unit adapted to calculate a changing acceleration value that expresses an acceleration of changes in luminance values of the pixels in said area in the edge direction;
a first setting unit adapted to set, in accordance with the calculated number of changes value and the calculated changing amount value, a first correction strength for enhancing the edge for at least the interest pixel in said area;
a selecting unit adapted to select, on the line extending from the pixel of interest in the edge direction, a replacement pixel for enhancing the edge of the interest pixel whereas the selection is based on the acceleration of changes in luminance values in the edge direction;
a second setting unit adapted to set, in accordance with the calculated number of changes value, the calculated changing amount value, and the calculated changing acceleration value, a second correction strength for correcting the selected replacement pixel;
a first correction unit adapted to correct a luminance value of the interest pixel in accordance with the first correction strength; and
a second correction unit adapted to correct a luminance value of the selected replacement pixel in accordance with the second correction strength.

2. The apparatus according to claim 1, wherein said second setting unit sets a different correction strength for each number of changes value within at least a partial value range of a value range that the number of changes value can assume.

3. The apparatus according to claim 1, wherein said second setting unit sets a different correction strength for each changing amount value within at least a partial value range of a value range that the changing amount value can assume.

4. The apparatus according to claim 1, further comprising:
a comparison unit adapted to compare the number of changes value with a first threshold and a second threshold larger than the first threshold;
a maximum strength setting unit adapted to set, when the number of changes value is smaller than the first threshold, a maximum strength as the correction strength;
a minimum strength setting unit adapted to set, when the number of changes value is larger than the second threshold, a minimum strength as the correction strength; and
a third correction strength setting unit adapted to set, when the number of changes value is not less than the first threshold and not more than the second threshold, a different correction strength for each number of changes value so that the correction strength is set to be a maximum strength when the number of changes value equals the first threshold, and the correction strength is set to be a minimum strength when the number of changes value equals the second threshold.

5. The apparatus according to claim 1, further comprising:
a comparison unit adapted to compare the changing amount value with a third threshold and a fourth threshold larger than the third threshold;
a minimum strength setting unit adapted to set, when the changing amount value is smaller than the third threshold, a minimum strength as the correction strength;
a maximum strength setting unit adapted to set, when the changing amount value is larger than the fourth threshold, a maximum strength as the correction strength; and
a third correction strength setting unit adapted to set, when the changing amount value is not less than the third threshold and not more than the fourth threshold, a different correction strength for each changing amount value so that the correction strength is set to be a minimum strength when the changing amount value equals the third threshold, and the correction strength is set to be a maximum strength when the changing amount value equals the fourth threshold.

6. A method of controlling an image correction processing apparatus, comprising:
an area setting step of setting, on a target image to be processed, an area comprising a plurality of pixels including an interest pixel;
a changing times calculating step of calculating a number of changes value that expresses a frequency of occurrence of changes in luminance values of pixels in said area;
a changing amount calculating step of detecting, from the pixels in said area, an edge direction of the interest pixel, and calculating a changing amount value that expresses a magnitude of changes in luminance values of the pixels in said area in the edge direction;
a changing acceleration calculating step of calculating a changing acceleration value that expresses an acceleration of changes in luminance values of the pixels in said area in the edge direction;
a first setting step of setting, in accordance with the calculated number of changes value and the calculated changing amount value, a first correction strength for enhancing the edge for at least the interest pixel in said area;
a selecting step adapted to select, on the line extending from the pixel of interest in the edge direction, a replacement pixel for enhancing the edge of the interest pixel whereas the selection is based on the acceleration of changes in luminance values in the edge direction;
a second setting step of setting, in accordance with the calculated number of changes value, the calculated changing amount value, and the calculated changing acceleration value, a second correction strength for correcting the selected replacement pixel;
a first correction step of correcting a luminance value of the interest pixel in accordance with the first correction strength; and
a second correction step of correcting a luminance value of the selected replacement pixel in accordance with the second correction strength.

7. A non-transitory computer-readable storage medium storing a computer-executable program which causes a computer to execute a method of controlling an image correction processing apparatus according to claim 6.

* * * * *